US012744944B2

(12) United States Patent
Bronder et al.

(10) Patent No.: US 12,744,944 B2
(45) **Date of Patent: *Sep. 22, 2026**

(54) MACHINE LEARNING NETWORKS FOR HYBRID VIDEO COMPRESSION AND CORRESPONDING DECOMPRESSION

(71) Applicant: Microsoft Technology Licensing, LLC, Redmond, WA (US)

(72) Inventors: Matthew Lawrence Bronder, Bellevue, WA (US); Saswata Mandal, Bellevue, WA (US); Sameer Avinash Nene, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/680,485

(22) Filed: May 31, 2024

(65) Prior Publication Data

US 2025/0373859 A1 Dec. 4, 2025

(51) Int. Cl.
*H04N 19/86* (2014.01)
*H04N 19/132* (2014.01)
(Continued)

(52) U.S. Cl.
CPC ........... *H04N 19/86* (2014.11); *H04N 19/132* (2014.11); *H04N 19/423* (2014.11); *H04N 19/60* (2014.11); *H04N 19/172* (2014.11); *H04N 19/174* (2014.11)

(58) Field of Classification Search
CPC .... H04N 19/86; H04N 19/132; H04N 19/423; H04N 19/60; H04N 19/172; H04N 19/174
See application file for complete search history.

(56) References Cited

U.S. PATENT DOCUMENTS 9,298,453 B2 3/2016 Vangala et al.
10,979,718 B2 4/2021 Chou et al.
(Continued)

FOREIGN PATENT DOCUMENTS

WO WO-2025075787 A1 * 4/2025 ............. G06N 3/045

OTHER PUBLICATIONS

Chan et al., "BasicVSR++: Improving Video Super-Resolution with Enhanced Propagation and Alignment," arXiv:2104.13371v1, 12 pp. (Apr. 27, 2021).
(Continued)

*Primary Examiner* — Hesham K Abouzahra
(74) *Attorney, Agent, or Firm* — Klarquist Sparkman, LLP

(57) ABSTRACT

Innovations in machine learning ("ML") networks used in video processing scenarios are described. For example, an ML refinement network can be used to refine video after a video decoder has reconstructed the video. Using the ML refinement network for post-processing can mitigate compression artifacts introduced during encoding and otherwise improve the quality of the reconstructed video. Or, as another example, an ML encoder network and ML decoder network can be used, in combination with a core video encoder and core video decoder, for hybrid compression and corresponding decompression. In the hybrid compression, the ML encoder network can transform video before encoding in order to boost rate-distortion performance of the core video encoder. In corresponding decompression, the ML decoder network can enhance reconstructed video after decoding, thereby compensating for transformations applied by the ML encoder network, mitigating compression artifacts, and otherwise improving the quality of the reconstructed video.

20 Claims, 18 Drawing Sheets

(51) Int. Cl.

| | |
|---|---|
| ***H04N 19/423*** | (2014.01) |
| ***H04N 19/60*** | (2014.01) |
| *H04N 19/172* | (2014.01) |
| *H04N 19/174* | (2014.01) |

(56) References Cited

U.S. PATENT DOCUMENTS

| | | | |
|---|---|---|---|
| 11,809,998 | B2 | 11/2023 | Mao et al. |
| 11,895,330 | B2 | 2/2024 | Zhang et al. |
| 12,034,916 | B2 | 7/2024 | Zhang et al. |
| 12,501,050 | B2 | 12/2025 | Van Rozendaal et al. |
| 2019/0266436 | A1 | 8/2019 | Prakash et al. |
| 2021/0136370 | A1 | 5/2021 | Tourapis et al. |
| 2022/0405979 | A1 | 12/2022 | Ding et al. |
| 2023/0065183 | A1 | 3/2023 | Zirr et al. |
| 2023/0128106 | A1 | 4/2023 | Otsuka |
| 2023/0274401 | A1 | 8/2023 | Price et al. |
| 2023/0300341 | A1 | 9/2023 | Wu et al. |
| 2023/0377096 | A1 | 11/2023 | Dolgin et al. |
| 2024/0073438 | A1 | 2/2024 | Wu et al. |
| 2024/0386704 | A1 | 11/2024 | Zhang et al. |
| 2025/0373861 | A1 | 12/2025 | Bronder et al. |

OTHER PUBLICATIONS

Liang et al., "Details or Artifacts: A Locally Discriminative Learning Approach to Realistic Image Super-Resolution," IEEE Image and Video Processing, pp. 1-10 (Mar. 2022).

Mittag et al., "LSTM-Based Video Quality Prediction Accounting for Temporal Distortions in Videoconferencing Calls," arXiv:2303.12761v1, 5 pp. (Mar. 2023).

Ronneberger et al., "U-Net: Convolutional Networks for Biomedical Image Segmentation," arXiv:1505.04593v1, 8 pp. (May 18, 2015).

Thomas et al., "A Reduced-Precision Network for Image Reconstruction," ACM Trans. Graph., vol. 39, No. 6, Article 231, 12 pp. (Dec. 2020).

Viola et al., "Rapid Object Detection Using a Boosted Cascade of Simple Features," IEEE Conf. On Computer Vision and Pattern Recognition, pp. I-511-I-518 (Dec. 2001).

Wang et al., "ESRGAN: Enhanced Super-Resolution Generative Adversarial Networks," arXiv:1809.00219v2, 23 pp. (Sep. 2018).

Zhang et al., "Residual Dense Network for Image Super-Resolution," arXiv:1802.08797v2, 10 pp. (Mar. 2018).

Benjak et al., "Learning-Based Scalable Video Coding with Spatial and Temporal Prediction," Int'l Conf. on Visual Communications and Image Processing, 5 pp. (Dec. 2023).

International Search Report and Written Opinion dated Jun. 24, 2025, from International Patent Application No. PCT/US2025/018039, 12 pp.

International Search Report and Written Opinion dated Aug. 4, 2025, from International Patent Application No. PCT/US2025/029453, 17 pp.

Khani et al., "Efficient Video Compression via Content-Adaptive Super-Resolution," IEEE/CVF Int'l Conf. on Computer Vision, pp. 4501-4510 (Oct. 2021).

Liu et al., "Neural Video Coding Using Multiscale Motion Compensation and Spatiotemporal Context Model," IEEE Trans on Circuits and Systems for Video Technology, vol. 31, No. 8, pp. 3182-3196 (Aug. 2021).

Office Action dated Jun. 4, 2025, from U.S. Appl. No. 18/680,438, 54 pp.

Sivaraman et al., "Gemino: Practical and Robust Neural Compression for Video Conferencing," arXiv:2209.10507v1, 18 pp.

Wei et al., "Video Compression based on Jointly Learned Down-Sampling and Super-Resolution Networks," Int'l Conf. on Visual Communications and Image Processing, 5 pp. (Dec. 2021).

Xiang et al., "Learning Spatio-Temporal Downsampling for Effective Video Upscaling," Springer International Publishing, pp. 162-181 (Nov. 2022).

Final Office Action dated Jan. 9, 2026, from U.S. Appl. No. 18/680,438, 50 pp.

Notice of Allowance dated Jun. 12, 2026, from U.S. Appl. No. 18/680,438, 9 pp.

* cited by examiner

FIG. 1a

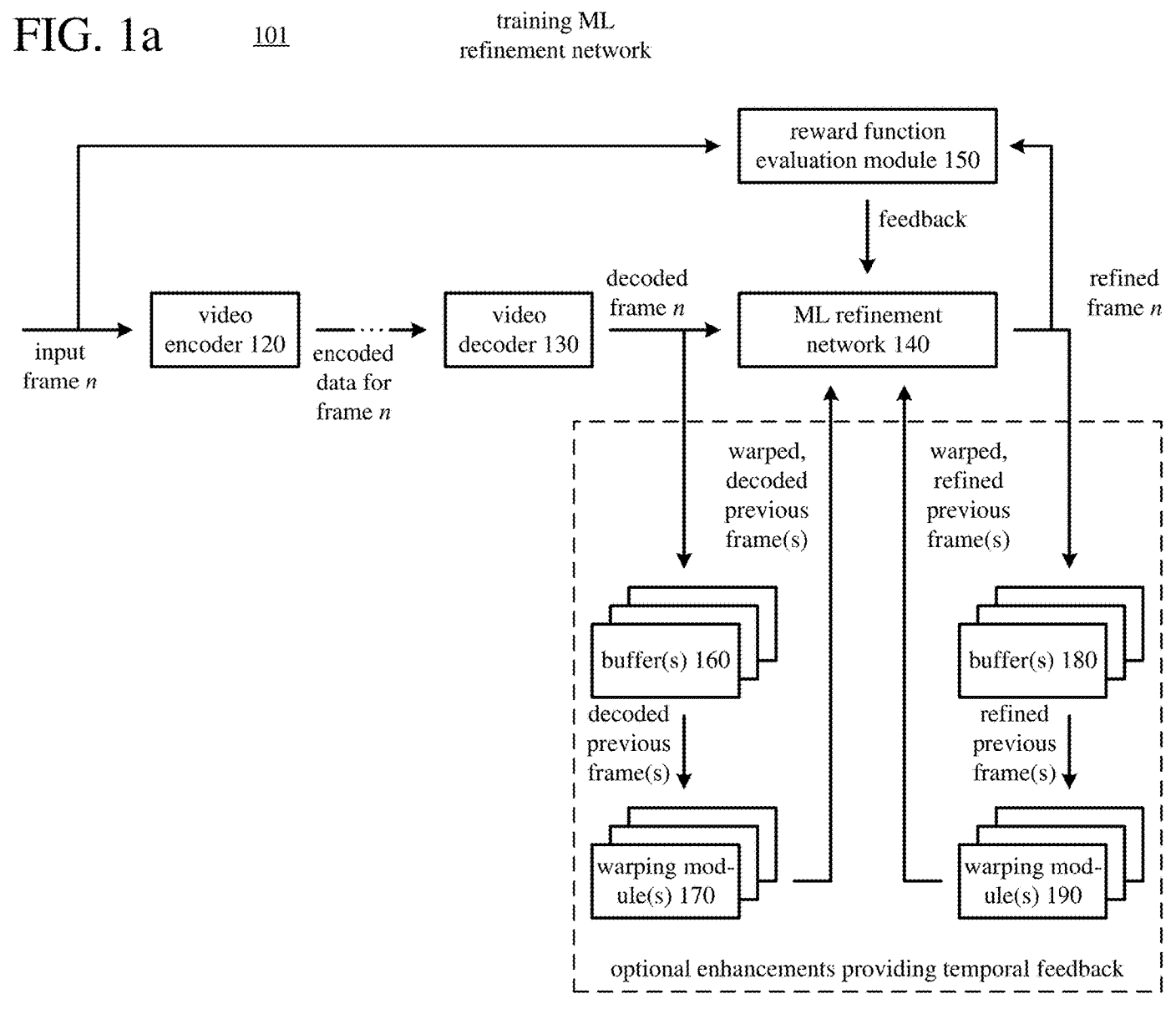

101 training ML refinement network input frame *n* video encoder 120 encoded data for frame *n* video decoder 130 decoded frame *n* reward function evaluation module 150 feedback

ML refinement network 140 refined frame *n* warped, refined previous frame(s)

warped, decoded previous frame(s)

buffer(s) 180 refined previous frame(s)

warping module(s) 190 buffer(s) 160 decoded previous frame(s)

warping module(s) 170 optional enhancements providing temporal feedback

FIG. 1b

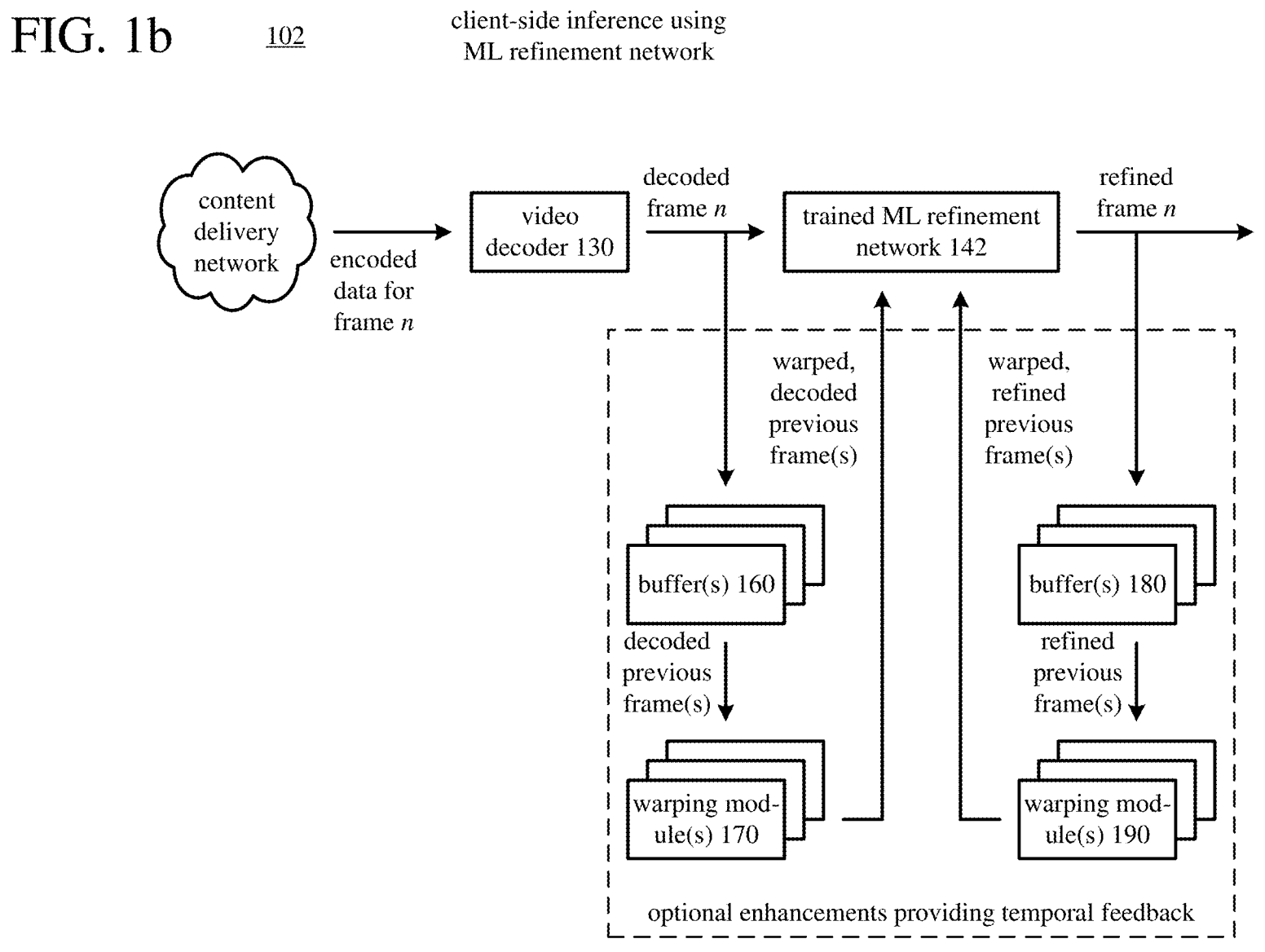

102 client-side inference using ML refinement network content delivery network encoded data for frame *n* video decoder 130 decoded frame *n* trained ML refinement network 142 refined frame *n* buffer(s) 160 decoded previous frame(s)

warping module(s) 170 warped, decoded previous frame(s)

buffer(s) 180 refined previous frame(s)

warping module(s) 190 warped, refined previous frame(s)

optional enhancements providing temporal feedback 201
example ML refinement network
decoded frame n
3 input expansion block 210 29
warped, refined previous frame(s)
concatenation block 220
32 reduction block 230a 32
skip
32 reduction block 230b 64
skip
64 reduction block 230c 96
skip
96 reduction block 230d 128
skip
128 bottleneck block 240 160
160 expansion block 250a 128
128 expansion block 250b 96
96 expansion block 250c 64
64 output block 260 3
refined frame n

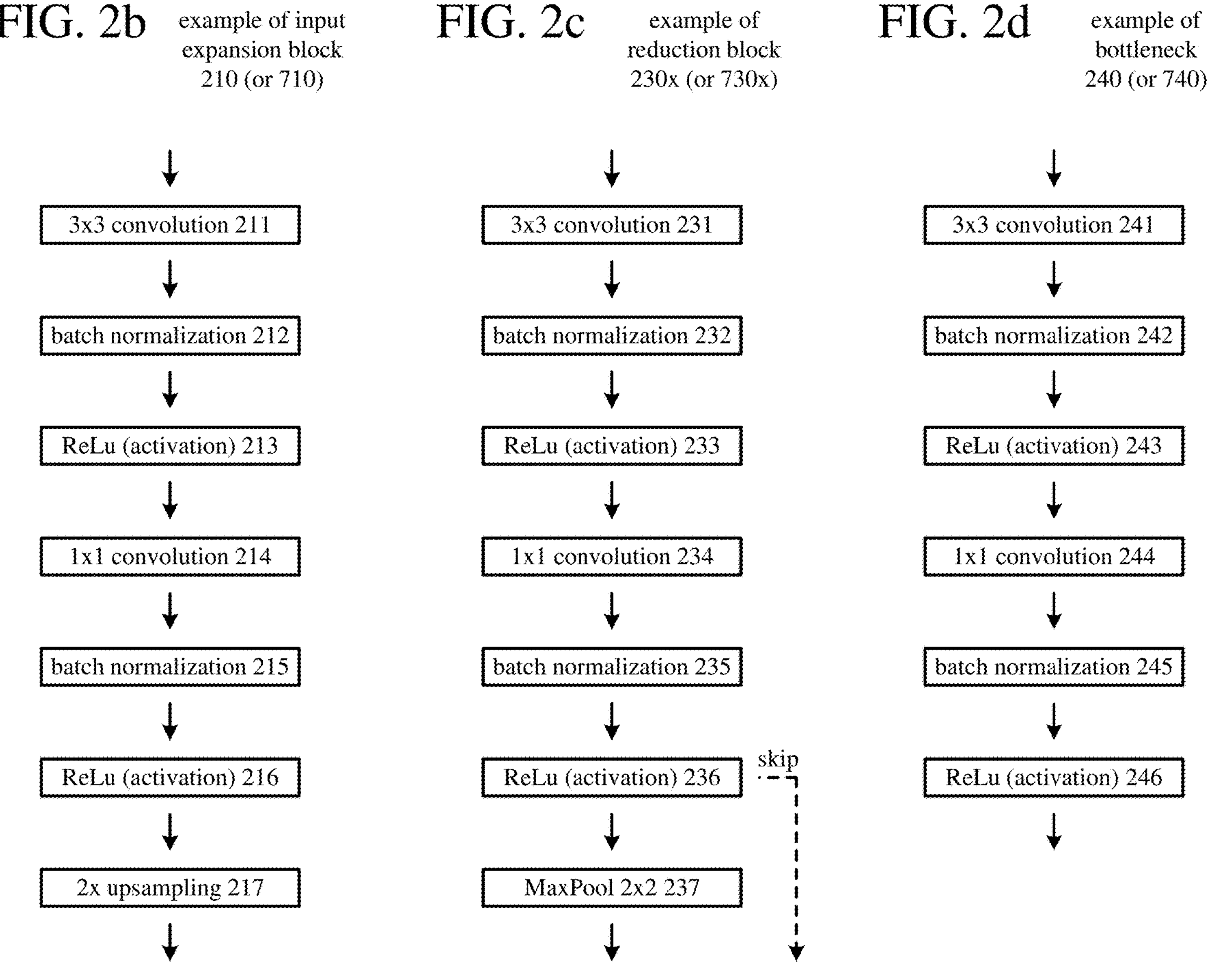
FIG. 2b
example of input expansion block 210 (or 710)
3x3 convolution 211
batch normalization 212
ReLu (activation) 213
1x1 convolution 214
batch normalization 215
ReLu (activation) 216
2x upsampling 217
FIG. 2c
example of reduction block 230x (or 730x)
3x3 convolution 231
batch normalization 232
ReLu (activation) 233
1x1 convolution 234
batch normalization 235
ReLu (activation) 236
skip
MaxPool 2x2 237
FIG. 2d
example of bottleneck 240 (or 740)
3x3 convolution 241
batch normalization 242
ReLu (activation) 243
1x1 convolution 244
batch normalization 245
ReLu (activation) 246

FIG. 2e example of expansion block 250x (or 750x)

skip 2x upsampling 251

1x1 convolution 252 batch normalization 253

Figures 2E, 2F:
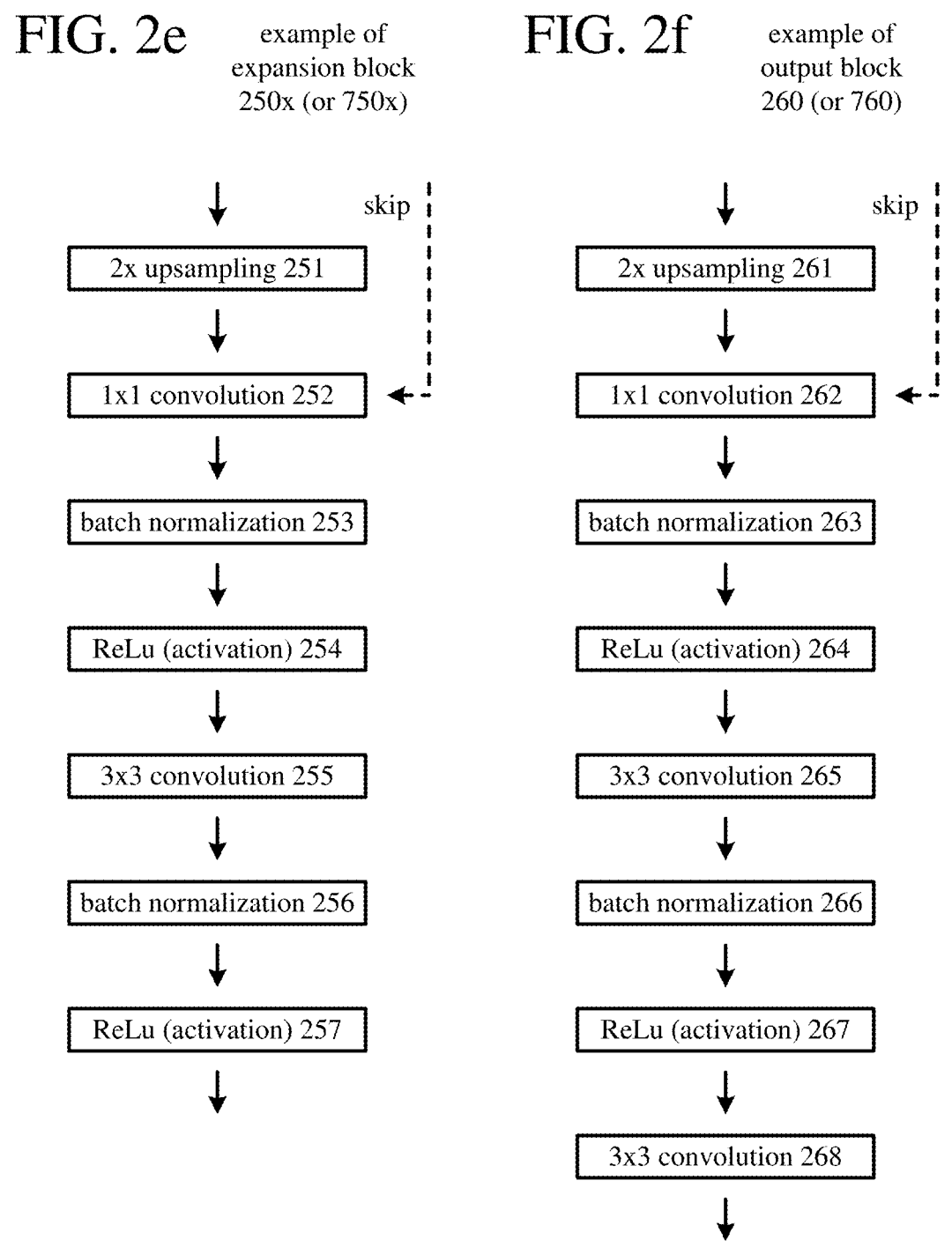

ReLu (activation) 254

3x3 convolution 255 batch normalization 256

ReLu (activation) 257

FIG. 2f example of output block 260 (or 760)

skip 2x upsampling 261

1x1 convolution 262 batch normalization 263

ReLu (activation) 264

3x3 convolution 265 batch normalization 266

ReLu (activation) 267

3x3 convolution 268

FIG. 5a

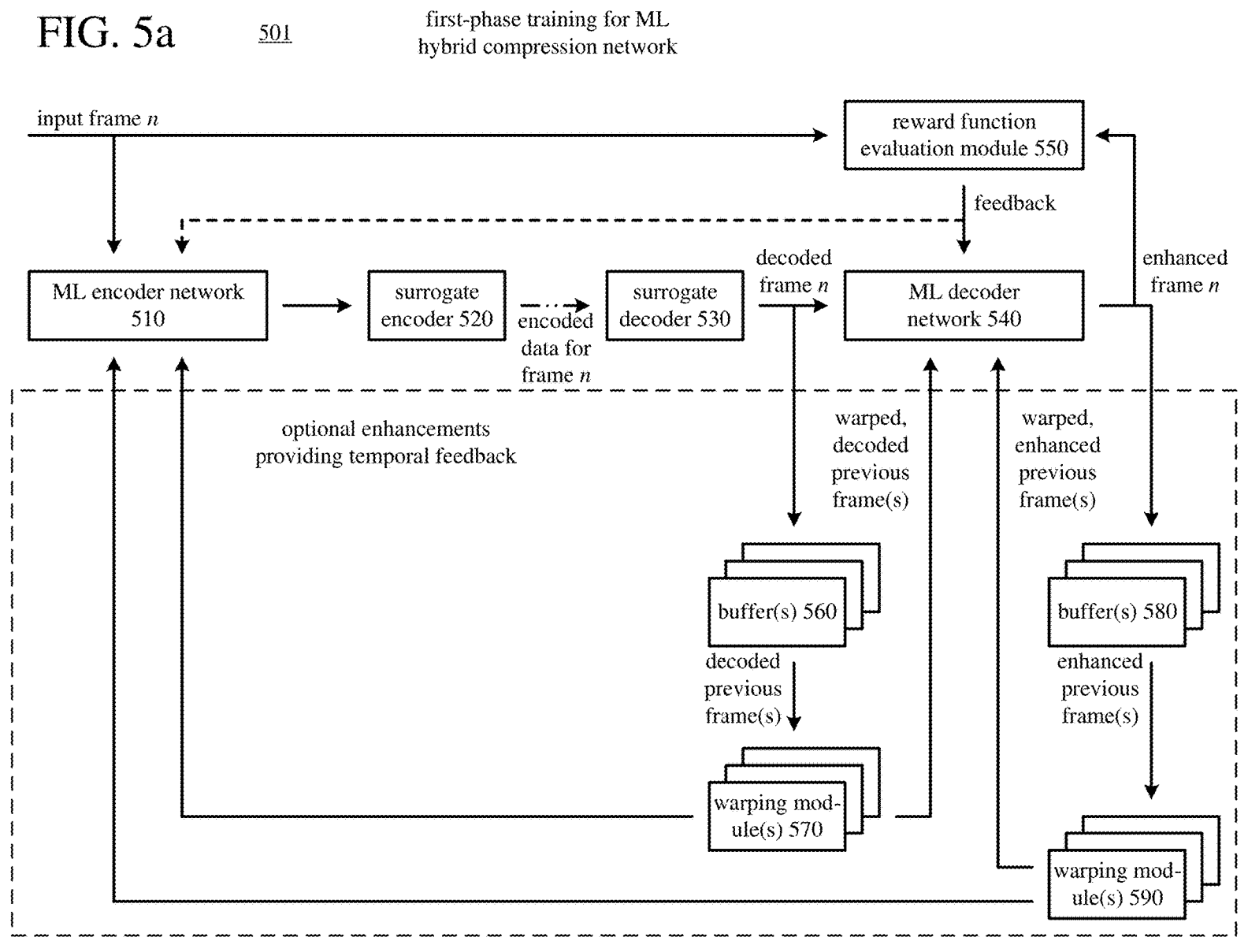

501 first-phase training for ML hybrid compression network input frame $n$ reward function evaluation module 550 feedback

ML encoder network 510 surrogate encoder 520 encoded data for frame $n$ surrogate decoder 530 decoded frame $n$

ML decoder network 540 enhanced frame $n$ optional enhancements providing temporal feedback warped, decoded previous frame(s)

warped, enhanced previous frame(s)

buffer(s) 560 buffer(s) 580 decoded previous frame(s)

enhanced previous frame(s)

warping module(s) 570 warping module(s) 590

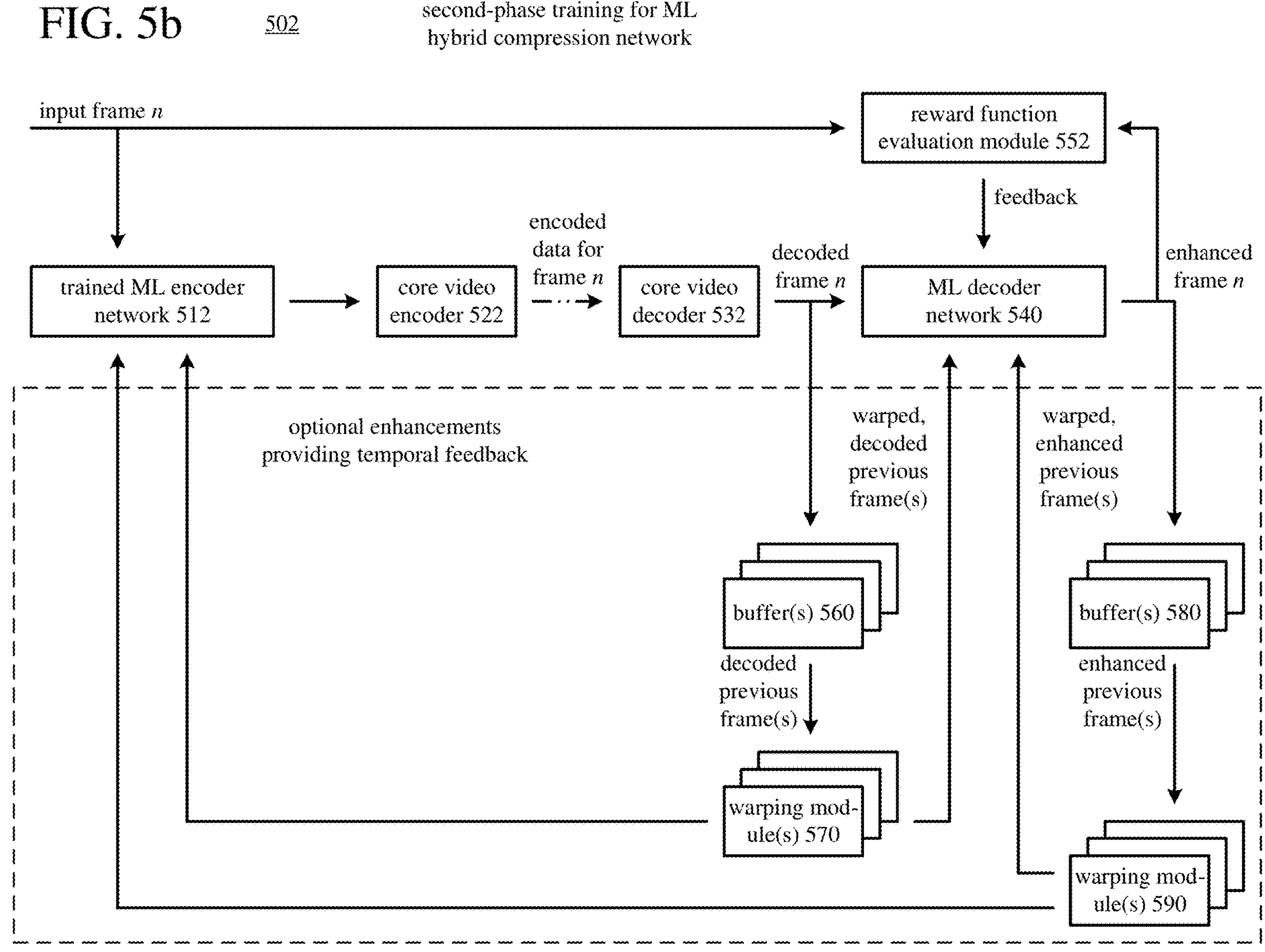
FIG. 5b
502
second-phase training for ML hybrid compression network
input frame n
reward function evaluation module 552
feedback
trained ML encoder network 512
core video encoder 522
encoded data for frame n
core video decoder 532
decoded frame n
ML decoder network 540
enhanced frame n
optional enhancements providing temporal feedback
warped, decoded previous frame(s)
warped, enhanced previous frame(s)
buffer(s) 560
buffer(s) 580
decoded previous frame(s)
enhanced previous frame(s)
warping module(s) 570
warping module(s) 590

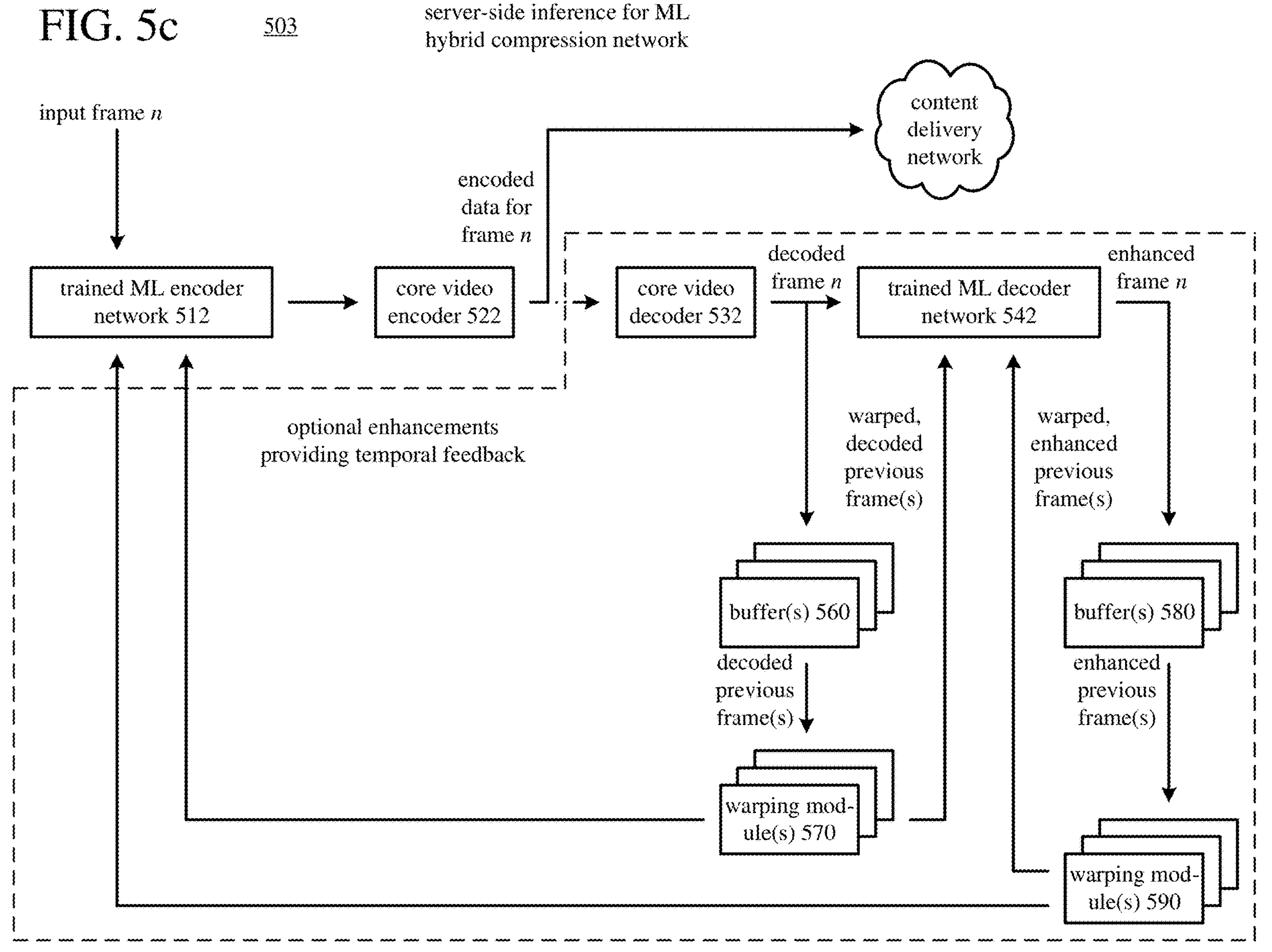
FIG. 5c
503
server-side inference for ML hybrid compression network
input frame n
trained ML encoder network 512
core video encoder 522
encoded data for frame n
content delivery network
core video decoder 532
decoded frame n
trained ML decoder network 542
enhanced frame n
optional enhancements providing temporal feedback
warped, decoded previous frame(s)
warped, enhanced previous frame(s)
buffer(s) 560
buffer(s) 580
decoded previous frame(s)
enhanced previous frame(s)
warping module(s) 570
warping module(s) 590

FIG. 5d

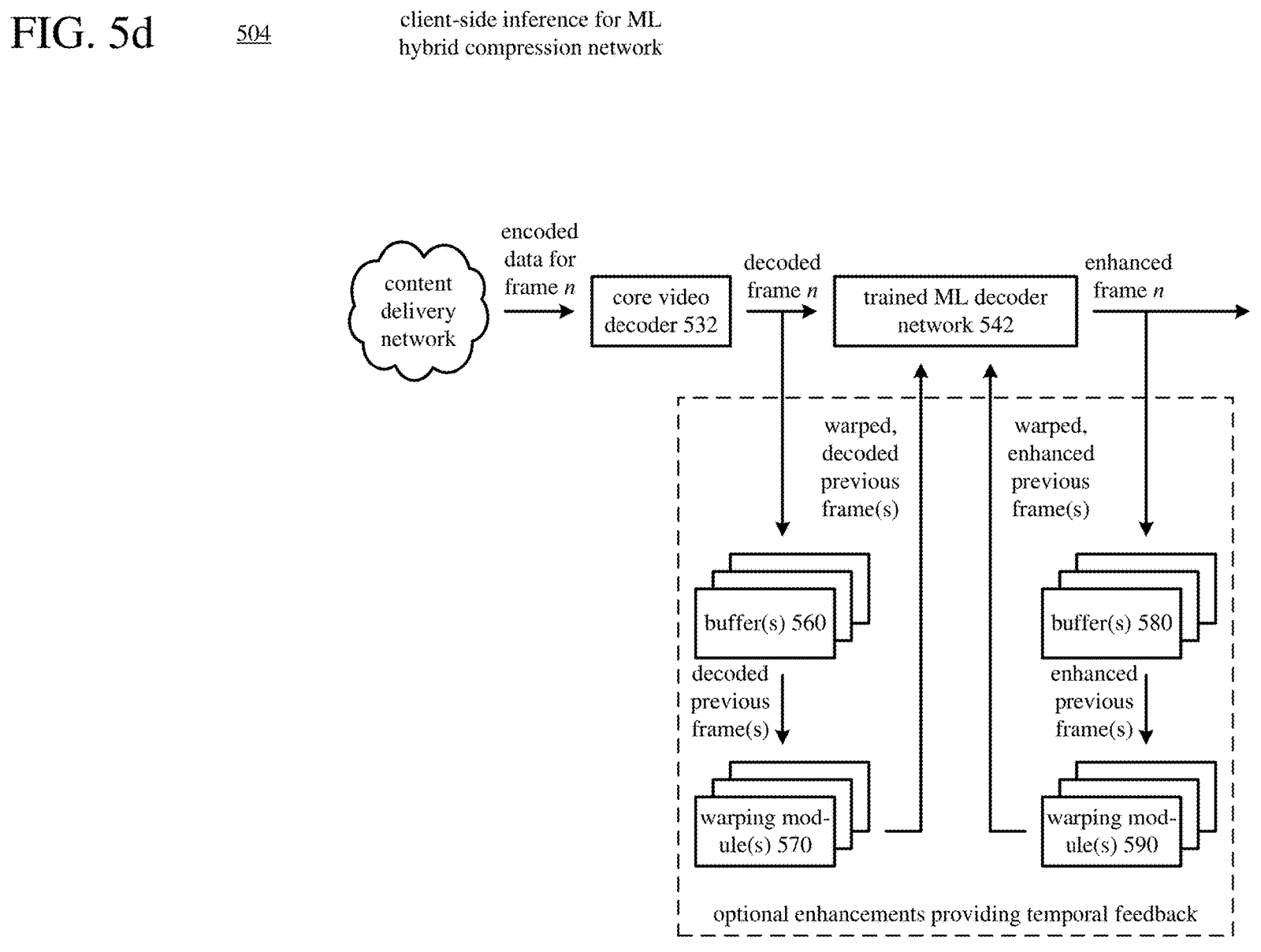

504 client-side inference for ML hybrid compression network content delivery network encoded data for frame *n* core video decoder 532 decoded frame *n* trained ML decoder network 542 enhanced frame *n* warped, decoded previous frame(s)

warped, enhanced previous frame(s)

buffer(s) 560 decoded previous frame(s)

warping module(s) 570 buffer(s) 580 enhanced previous frame(s)

warping module(s) 590 optional enhancements providing temporal feedback 601
input frame n
warped, enhanced previous frame(s)
concatenation block 610
6 input block 620 32
example ML encoder network
32 reduction block 630a 64
skip
64 reduction block 630b 96
skip
96 reduction block 630c 128
skip
128 bottleneck block 640 160
160 expansion block 650a 128
128 expansion block 650b 96
96 output block 660 3
transformed frame n

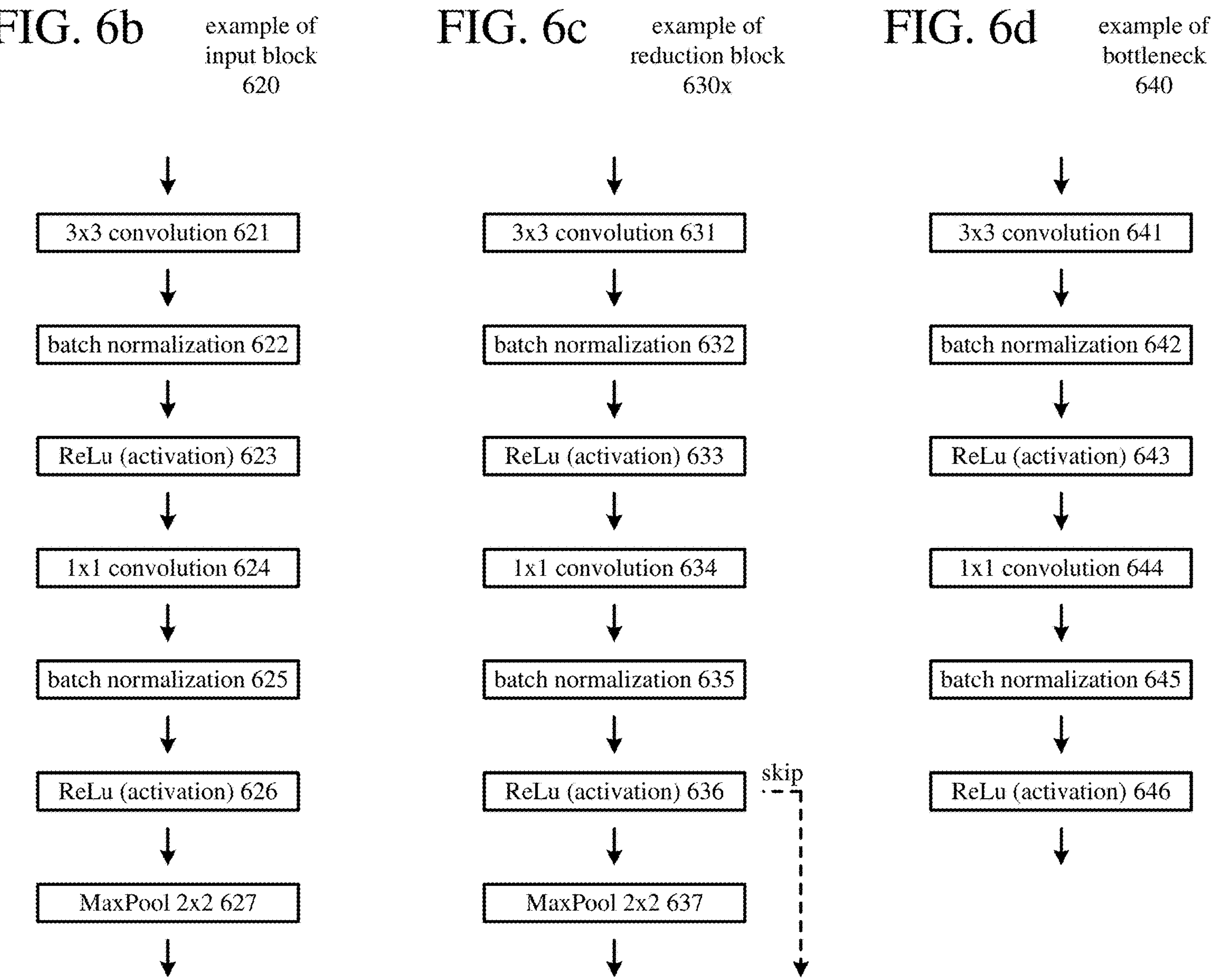
FIG. 6b
example of input block 620
3x3 convolution 621
batch normalization 622
ReLu (activation) 623
1x1 convolution 624
batch normalization 625
ReLu (activation) 626
MaxPool 2x2 627
FIG. 6c
example of reduction block 630x
3x3 convolution 631
batch normalization 632
ReLu (activation) 633
1x1 convolution 634
batch normalization 635
ReLu (activation) 636
skip
MaxPool 2x2 637
FIG. 6d
example of bottleneck 640
3x3 convolution 641
batch normalization 642
ReLu (activation) 643
1x1 convolution 644
batch normalization 645
ReLu (activation) 646

FIG. 6e

FIG. 6f 701
example ML
decoder network
decoded frame n
3 input expansion block 710 29
warped, enhanced
previous frame(s)
concatenation block 720
32 reduction block 730a 32
skip
32 reduction block 730b 64
skip
64 reduction block 730c 96
skip
96 reduction block 730d 128
skip
128 bottleneck block 740 160
160 expansion block 750a 128
128 expansion block 750b 96
96 expansion block 750c 64
64 output block 760 3
enhanced frame n

MACHINE LEARNING NETWORKS FOR HYBRID VIDEO COMPRESSION AND CORRESPONDING DECOMPRESSION

BACKGROUND

Video encoder-decoder ("codec") systems have become highly optimized over the past 35 years. Typically, a video codec implements complicated algorithms for compression and decompression, using a wide range of tools. Examples of video codecs include those that implement the H.264/AVC standard, H.265/HEVC standard, H.266/VVC standard, VP9 standard, or AV1 standard. A video encoder for a codec standard or format can provide very good quality for a given bitrate of encoded data. Even so, some information is typically lost during the compression process. In particular, the quality of video having a high spatial resolution and high frame rate can suffer when encoded for delivery at a low bitrate.

Lossy compression can introduce various types of distortions (also called compression artifacts) that are noticeable in video after decoding. For example, reconstructed video can exhibit blocking artifacts at boundaries between blocks of sample values used in encoding and decoding, ringing artifacts in which edges of content are repeated in the reconstructed video, blurring artifacts in which details are lost due to quantization, banding artifacts (also called posterization) in which fine-grained differences in colors are lost, and mosquito noise artifacts.

SUMMARY

In summary, the detailed description presents innovations in machine learning ("ML") networks used in video processing scenarios. For example, an ML refinement network can be used to refine video after a video decoder has reconstructed the video. Using the ML refinement network for post-processing can mitigate compression artifacts introduced during encoding and otherwise improve the quality of the reconstructed video. As another example, an ML encoder network and ML decoder network can be used, in combination with a core video encoder and core video decoder, for hybrid compression and corresponding decompression. In the hybrid compression, the ML encoder network can transform video before encoding in order to boost rate-distortion performance of the core video encoder, which can encode the transformed video with better quality for a given bitrate or, alternatively, encode the transformed video at a lower bitrate for a given level of quality. In corresponding decompression, the ML decoder network can enhance reconstructed video after decoding, thereby compensating for transformations applied by the ML encoder network, in addition to mitigating compression artifacts introduced during encoding and otherwise improving the quality of the reconstructed video.

According to a first set of techniques and tools described herein, a video post-processing tool trains an ML refinement network for post-processing of video. The video post-processing tool receives a current unit of input video (e.g., frame, slice, or tile) and encodes the current unit of input video, which produces encoded data for the current unit of input video. The video post-processing tool decodes the encoded data, which produces a decoded current unit. With an ML refinement network, the video post-processing tool refines the decoded current unit to mitigate compression artifacts and otherwise improve video quality. This produces a refined current unit. As part of the training process, the video post-processing tool determines feedback, based at least in part on differences between the current unit of input video and the refined current unit, and adjusts the ML refinement network based at least in part on the feedback. Through multiple iterations of training of the ML refinement network, the video post-processing tool can effectively train the ML refinement network to mitigate compression artifacts introduced during encoding and otherwise improve video quality.

According to a second set of techniques and tools described herein, a video post-processing tool uses an ML refinement network to post-process video. The video post-processing tool receives encoded data for a current unit of video (e.g., frame, slice, or tile) and decodes the encoded data, which produces a decoded current unit. With an ML refinement network, the video post-processing tool refines the decoded current unit to mitigate compression artifacts and otherwise improve video quality. This produces a refined current unit, which can be further post-processed for display and output.

According to a third set of techniques and tools described herein, a video encoding tool trains an ML encoder network and an ML decoder network for hybrid compression of video and corresponding decompression. The video encoding tool receives a current unit of input video (e.g., frame, slice, or tile). With an ML encoder network, the video encoding tool transforms the current unit to facilitate preservation of image quality (during subsequent compression), which produces a transformed current unit. The video encoding tool encodes the transformed current unit, which produces encoded data for the transformed current unit, and then decodes the encoded data. This produces a decoded current unit. With an ML decoder network, the video encoding tool enhances the decoded current unit to compensate for transformations applied by the ML encoder network, mitigate compression artifacts introduced during encoding, and otherwise improve video quality. This produces an enhanced current unit. As part of the training process, the video encoding tool determines feedback (based at least in part on differences between the current unit of input video and the enhanced current unit) and adjusts at least one of the ML encoder network and ML decoder network based at least in part on the feedback. Through multiple iterations of training of the ML encoder network and ML decoder network, the video encoding tool can effectively train the ML encoder network to boost performance of a core video encoder, and the video encoding tool can effectively train the ML decoder network to compensate for transformations applied by the ML encoder network, mitigate compression artifacts, and otherwise improve video quality.

According to a fourth set of techniques and tools described herein, a video encoding tool uses an ML encoder network in hybrid compression of video. The video encoding tool receives a current unit of input video (e.g., frame, slice, or tile). With an ML encoder network, the video encoding tool transforms the current unit to facilitate preservation of image quality (during subsequent compression), which produces a transformed current unit. The video encoding tool encodes the transformed current unit. This produces encoded data for the transformed current unit, which is output as part of a bitstream for delivery to one or more client computer systems. By using the ML encoder network, the video encoding tool can boost performance of a core video encoder used to encode the transformed video.

According to a fifth set of techniques and tools described herein, a video decoding tool uses an ML decoder network in decompression of video that has been compressed using hybrid compression. The video decoding tool receives encoded data for a current unit (e.g., frame, slice, or tile) and decodes the encoded data, which produces a decoded current unit. With an ML decoder network, the video decoding tool enhances the decoded current unit to compensate for transformations applied by the ML encoder network, mitigate compression artifacts introduced during encoding, and otherwise improve video quality. This produces an enhanced current unit, which can be further post-processed for display and output.

The innovations described herein can be implemented as part of a method, as part of a computer system (physical or virtual) configured to perform the method, or as part of a tangible computer-readable media storing computer-executable instructions for causing a processor system, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 1*a* is a diagram illustrating an example architecture for training an ML refinement network to use in post-processing of video.

FIG. 1*b* is a diagram illustrating an example architecture for client-side inference using an ML refinement network in post-processing of video.

FIGS. 2*a*-2*f* are diagrams illustrating an example ML refinement network for use in post-processing of video.

FIGS. 5*a* and 5*b* are diagrams illustrating an example architecture for training an ML encoder network and ML decoder network to use in hybrid compression of video and corresponding decompression.

FIG. 5*c* is a diagram illustrating an example architecture for server-side inference using an ML encoder network and ML decoder network in hybrid compression of video. FIG. 5*d* is a diagram illustrating an example architecture for client-side inference using an ML decoder network in corresponding decompression.

FIGS. 6*a*-6*f* are diagrams illustrating an example ML encoder network for use in hybrid compression of video.

FIG. 8 is a flowchart illustrating an example technique for training an ML encoder network and ML decoder network to use in hybrid compression of video and corresponding decompression.

FIG. 9 is a flowchart illustrating an example technique for server-side inference using an example ML encoder network in hybrid compression of video.

FIG. 10 is a flowchart illustrating an example technique for client-side inference using an example ML decoder network in corresponding decompression.

DETAILED DESCRIPTION

Figure 2A:
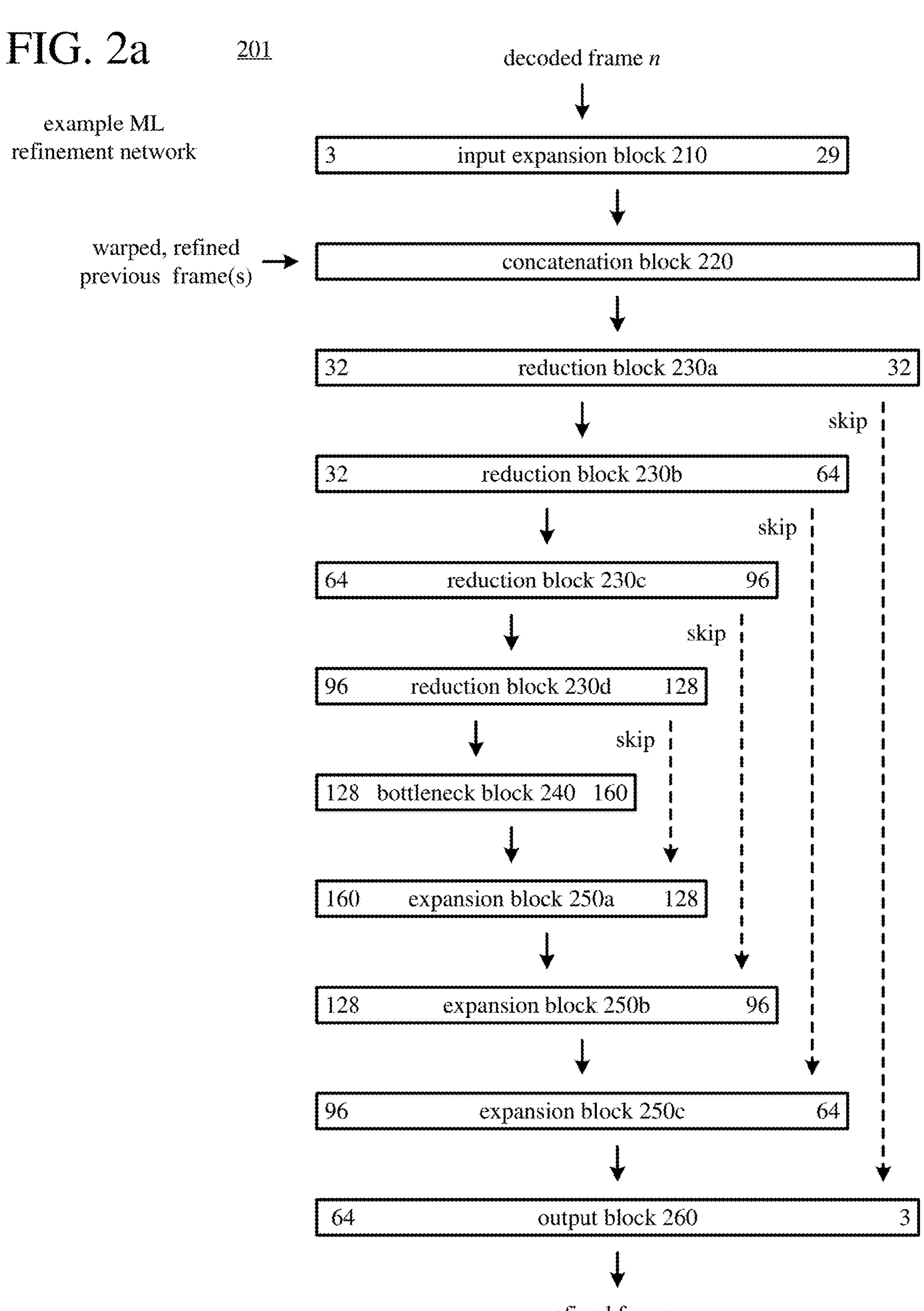

Innovations in machine learning ("ML") networks used in video processing scenarios are described.

Some of the innovations use an ML refinement network. For example, an ML refinement network can be used to refine video after a video decoder has reconstructed the video. Using the ML refinement network for post-processing can mitigate compression artifacts introduced during encoding and otherwise improve the quality of the reconstructed video.

Other innovations use an ML encoder network and ML decoder network. For example, an ML encoder network and ML decoder network can be used, in combination with a core video encoder and core video decoder, for hybrid compression and corresponding decompression. In the hybrid compression, the ML encoder network can transform video before encoding in order to boost rate-distortion performance of the core video encoder. This can enable the core video encoder to encode the transformed video with better quality for a given bitrate of encoded data or, alternatively, encode the transformed video at a lower bitrate for a given level of quality. In corresponding decompression, the ML decoder network can enhance reconstructed video after decoding, thereby compensating for transformations applied by the ML encoder network, mitigating compression artifacts introduced during encoding, and otherwise improving the quality of the reconstructed video.

I. ML Refinement Networks for Post-Processing of Reconstructed Video.

When video is encoded by a video encoder, the encoding process typically involves lossy compression. Lossy compression can introduce various types of distortions (also called compression artifacts) that are noticeable in video after decoding. For example, reconstructed video can exhibit blocking artifacts at boundaries between blocks of sample values used in encoding and decoding, ringing artifacts in which edges of content are repeated in the reconstructed video, blurring artifacts in which details are lost due to quantization, banding artifacts (also called posterization) in which fine-grained differences in colors are lost, and mosquito noise artifacts.

Machine learning ("ML") provides an opportunity to recover some information lost during lossy compression. This section describes operations performed to train and use an ML refinement network for post-processing of reconstructed video. Using an ML refinement network for post-processing of reconstructed video can provide various technical benefits.

Primarily, using an ML refinement network for post-processing of reconstructed video can mitigate compression artifacts introduced during encoding by reducing their severity or even eliminating them. In this way, quality of the reconstructed video can be improved. The use of lower bitrates for encoded data can be enabled, with the ML refinement network recovering quality in post-processing of reconstructed video.

More specifically, during training, an ML refinement network can be provided with extensive examples of reconstructed video and corresponding input video, which the ML refinement network can use to determine how the reconstructed video should appear without compression artifacts. After training, compression artifacts can be identified as known features by the ML refinement network. During runtime inference, the ML refinement network can further leverage patterns learned with reference to original reference material (input video) to mitigate compression artifacts that have been introduced during encoding.

In some example implementations, a temporal feedback loop can provide the ML refinement network, as input, with additional information from recent reconstructed video. For example, additional information that the ML refinement network itself has inferred from recent reconstructed video (in refined previous frames) can supplement refinement operations for a current frame, reducing the likelihood of temporal aliasing in display of the frames of a video sequence. An alternative (or additional) temporal feedback loop can provide the ML refinement network, as input, with additional information from recent decoded video before refinement. For example, additional information from decoded previous frames can supplement refinement operations (with the ML refinement network) for a current frame. Using a temporal feedback loop can enable the ML refinement network to further improve quality of reconstructed video.

In some example implementations, the ML refinement network is used for post-processing of reconstructed video in order to improve video quality for a given bitrate or, alternatively, to reduce bitrate for a given level of video quality. In doing so, the ML refinement network can add computational complexity and increase memory usage, and the ML refinement network can also add latency due to processing delays. Typically, the added computational complexity, increased memory usage, and added latency are manageable and reasonable in exchange for improved video quality in reconstructed video.

In some example implementations, an ML refinement network is trained for post-processing of reconstructed video that has been encoded and decoded according to a specific codec standard or format. Moreover, the ML refinement network is trained for post-processing of reconstructed video that has been encoded at a particular target quality or bitrate. The ML refinement network is trained using representative training data. To the extent the ML refinement network is used for post-processing of reconstructed video that deviates significantly from the training data, that has been encoded and decoded according to a different codec standard or format, or that has been encoded at a different target quality or bitrate, performance of the ML refinement network may suffer, even if some improvements in video quality are still achieved.

In some example implementations, post-processing of reconstructed video using an ML refinement network uses special-purpose hardware at a client computer system to implement the ML refinement network. For example, the special-purpose hardware can use a graphics processing unit ("GPU") or neural processing unit ("NPU"). With the special-purpose hardware, the client computer system can perform post-processing operations for runtime inference with the ML refinement network without significant delay, such that significant latency is not introduced and such that the output frame rate is not adversely affected. On the other hand, in such example implementations, a server computer system that performs encoding of the video does not perform post-processing with the ML refinement network and, as such, need not have special-purpose hardware.

A. Example Architectures for Training an ML Refinement Network.

FIG. 1*a* shows an example architecture (101) for training an ML refinement network to use in post-processing of reconstructed video. The example architecture (101) includes a video encoder (120), video decoder (130), ML refinement network (140), and reward function evaluation module (150). When the ML refinement network (140) uses temporal feedback with information from decoded video as an optional enhancement, the example architecture (101) can also include one or more decoded video buffers (160) and one or more associated warping modules (170). When the ML refinement network (140) uses temporal feedback with information from refined video as an optional enhancement, the example architecture (101) can also include one or more refined video buffers (180) and one or more associated warping modules (190).

The video encoder (120) is configured to accept, as input, an input frame n, encode the input frame n, and produce, as output, encoded data for the frame n. The encoded data can be formatted according to the H.264/AVC standard, H.265/HEVC standard, H.266/VVC standard, AV1 standard, or another codec standard or format.

The video decoder (130) is configured to accept, as input, encoded data for the frame n, decode the encoded data for frame n, and produce, as output, a decoded frame n. The video decoder (130) can be configured to perform decoding operations according to the H.264/AVC standard, H.265/HEVC standard, H.266/VVC standard, AV1 standard, or another codec standard or format.

The video encoder (120) and video decoder (130) can skip certain operations such as entropy coding operations and entropy decoding operations, which are lossless and hence do not affect video quality. As such, the encoded data that is output from the video encoder (120) and input to the video decoder (130) can be part of a bitstream organized according to a codec standard or format, or the encoded data can be an intermediate representation of the encoded data. In other words, the compression and decompression, respectively, can be partial.

The ML refinement network (140) is configured to accept, as input, a decoded frame n, perform post-processing operations on the decoded frame n, and produce, as output, a refined frame n. In particular, the ML refinement network (140) is configured to perform post-processing operations on sample values of the decoded frame n. The refinements react to patterns of features in content according to parameters of the ML refinement network (140), which have initial values but are extensively modified during training. In terms of recognizable outcomes, depending on content of input and training of the ML refinement network (140), the refinement can accomplish effects such as color mapping, sharpening, blurring, or other filtering. The ML refinement network (140) can be a convolutional neural network having a U-Net architecture, as described with reference to FIGS. 2*a*-2*f*. Alternatively, the ML refinement network (140) can implement another type of ML model, such as a transformer network.

The reward function evaluation module (150) is configured to accept, as inputs, the input frame n and refined frame n. The input frame n serves as a "ground truth" against which the result from the ML refinement network (140)—that is, the refined frame n—is measured. The reward function evaluation module (150) is configured to evaluate differences between the input frame n and refined frame n. The differences between the input frame n and refined frame n can be quantified according to a reward function (alternatively called a loss function). The reward function evaluation module (150) is configured to produce, as output, feedback to the ML refinement network (140). Based on the feedback, the ML refinement network (140) is adjusted.

As explained below with reference to FIGS. 2_a_-2_f_, an ML refinement network can perform "super-resolution" operations at increased spatial resolution after an input expansion, compared to the spatial resolution of the decoded frame n provided to the ML refinement network (140). When the ML refinement network (140) performs "super-resolution" operations at increased spatial resolution, the input frame n ("ground truth") provided to the reward function evaluation module (150) has a spatial resolution that matches the spatial resolution of the refined frame n. In this case, the reward function evaluation module (150) is configured to evaluate differences between the input frame n and refined frame n. Based on feedback from the reward function evaluation module (150), the ML refinement network (140) learns to both refine the decoded frame n and upsample the decoded frame n to the spatial resolution of the input frame n. For example, suppose input video has a spatial resolution of 2160p (that is, 3840×2160), the input video is downsampled before or during compression to a spatial resolution of 1080p (that is, 1920×1080), the ML refinement network (140) is configured to accepted decoded video that has a spatial resolution of 1080p, and the ML refinement network (140) is configured to produce refined video at a spatial resolution of 2160p. In this case, the reward function evaluation module (150) accepts (as "ground truth" input) frames of the 2160p input video. Based on feedback from the reward function evaluation module (150), the ML refinement network (140) learns to both refine the 1080p decoded video and upsample the 1080p decoded video to the spatial resolution of 2160p based on the 2160 input video.

Training can repeat in training iterations for different batches (subsets) of input data in a training set, for an epoch (a pass through the data in the training set). The process of training the ML refinement network (140) can continue for multiple epochs until the ML refinement network (140) reaches a convergence threshold. For example, the convergence threshold can be used to determine whether parameters of the ML refinement network (140) have stabilized (e.g., changes in parameters are below a threshold amount, which depends on implementation). Or, as another example, the convergence threshold can be used to determine whether differences between input video and refined output from the ML refinement network (140) are negligible (e.g., the value of the reward function has reached a threshold amount, which depends on implementation).

In general, with the feedback from the reward function evaluation module (150), the ML refinement network (140) is exposed to examples of input video and their decoded counterparts during the training process. The ML refinement network (140) can gradually learn to associate features found in the decoded video with features in the input video as "ground truth" for the video. During subsequent runtime inference, the trained ML refinement network can use the learned patterns to mitigate compression artifacts that were introduced during encoding and otherwise restore image quality lost during compression.

In some example implementations, the reward function evaluation module (150) provides feedback to the ML refinement network (140) according to a reward function for actor-critic reinforcement learning. For the ML refinement network (140), an actor path provides a "player" or decision-maker during training. The actor selects an action (here, determining the output of the ML refinement network (140)) based on a policy, as reflected in the configuration of the ML refinement network (140). A critic path provides an "observer" (here, the reward function evaluation module (150)), who grades the performance of the actor. The critic assesses whether being in the state that results from the action selected by the actor is valuable or not valuable. The critic quantifies whether the action is valuable or not valuable using a reward function. The reward function can implement an objective measure of quality degradation between sample values of the input frame n and corresponding sample values of the refined frame n, such as mean squared error, peak signal-to-noise ratio, a structural similarity index, a multi-scale structural similarity index, or video multimethod assessment fusion ("VMAF"). Based on the value of the reward function, the ML refinement network (140) is adjusted. For example, if one or more weight values or bias values have been adjusted in an iteration of training the ML refinement network (140), and the resulting value of the reward function increases, the training process keeps the adjusted values or increases the magnitude of the previous adjustments in the next iteration of training. On the other hand, if the resulting value of the reward function decreases, the training process reverses the previous adjustments (to weight value(s) and/or bias value(s)) or decreases the magnitude of the previous adjustments in the next iteration of training. In general, the training process continues until the ML refinement network (140) reaches a convergence threshold.

In the preceding examples, the ML refinement network (140) is trained using a variation of actor-critic reinforcement learning. Alternatively, the ML refinement network (140) can be trained using another type of reinforcement learning. Or, as another alternative, the ML refinement network (140) can be trained using supervised learning, unsupervised learning, or another variation of machine learning.

As a first optional enhancement, the ML refinement network (140) can use temporal feedback based on information from decoded video. In this case, the ML refinement network (140) is configured to accept, as input, decoded previous video from output of the video decoder (130), after spatial alignment to current video through a warping process. In the example architecture (101) of FIG. 1_a_, for example, each of the buffer(s) (160) is configured to store a decoded previous frame from time n−1, n−2, and so on. Each of the warping module(s) (170) is configured to retrieve a decoded previous frame from one of the buffer(s) (160) and to warp the decoded previous frame to spatially align sample values of the decoded previous frame with corresponding sample values of the decoded frame n. The warping can use motion estimation between the decoded previous frame and decoded frame n and/or forward projection of motion information from the decoded previous frame to decoded frame n. For example, the warping can use motion information for frame n, provided by the video decoder (130), which provides recent correlation history. In general, the warping temporally projects sample values from their locations in the decoded previous frames to expected locations in the decoded frame n. Alternatively, motion estimation can be performed using optical flow analysis of decoded frames of a video sequence. In this case, independent motion estimation can be performed using decoded previous frames that have been buffered. The buffered previous frames are at least one frame older than the current frame being decoded. Motion information can be projected forward by one frame, but such forward projection may reduce the accuracy of the motion information.

As a second optional enhancement, the ML refinement network (140) can use temporal feedback based on information from refined video. The second optional enhancement can be used instead of or in addition to the first optional enhancement. For the second optional enhancement, the ML refinement network (140) is configured to accept, as input, refined previous video from output of the ML refinement network (140), after spatial alignment to current video through a warping process. In the example architecture (101) of FIG. 1*a*, for example, each of the refined video buffer(s) (180) is configured to store a refined frame from time n−1, n−2, and so on. Each of the warping module(s) (190) is configured to retrieve a refined previous frame from one of the buffer(s) (180) and to warp the refined previous frame to spatially align sample values of the refined previous frame with corresponding sample values of the decoded frame n. The warping can use motion estimation between the refined previous frame and decoded frame n, or the warping can use forward projection of motion information from the refined previous frame to decoded frame n. For example, the warping can use motion information for frame n, provided by the video decoder (130). In general, the warping temporally projects sample values from their locations in the refined previous frames to expected locations in the decoded frame n. Alternatively, motion estimation can be performed using optical flow analysis of refined frames of a video sequence. In this case, independent motion estimation can be performed using refined previous frames that have been buffered. The buffered previous frames are at least one frame older than the current frame being decoded. Motion information can be projected forward by one frame, but such forward projection may reduce the accuracy of the motion information.

When the ML refinement network (140) performs “super-resolution” operations at a higher spatial resolution than the decoded frame n, the warped, refined previous frame has a different spatial resolution than the decoded frame n, such that the warped, refined previous frame cannot be simply concatenated with the decoded frame n as inputs to the ML refinement network (140). Instead, the decoded frame n can be upsampled to have the same resolution as the warped, refined previous frame before the frames are concatenated as inputs.

In some example implementations, the video encoder (120) and video decoder (130) use simple forward prediction of motion, as opposed to bidirectional prediction. This can help reduce overall latency by avoiding startup delay that accounts for reordering of pictures from decoding order to output order. Alternatively, the video encoder (120) and video decoder (130) can also use bidirectional prediction.

In some example implementations, the ML refinement network (140) is adapted for a particular context. For example, video can be compressed and decompressed using a specific codec standard or format that is intended to be used for runtime inference. In this case, the ML refinement network (140) is adapted to perform post-processing of reconstructed video that has been compressed and decompressed for the specific codec standard or format. Different ML refinement networks can be used for different codec standards or formats. Alternatively, a single (larger) ML refinement network can be used for multiple different codec standards or formats.

As another example, during training of the ML refinement network (140), encoded data can be compressed at a given target quality or bitrate. In this case, the ML refinement network (140) is further adapted to perform post-processing of reconstructed video that has been compressed at the given target quality or bitrate. Different ML refinement networks can be used for different target qualities or bitrates. Alternatively, a single (larger) ML refinement network can be used for different target qualities or bitrates.

As another example, during training of the ML refinement network (140), the video encoder (120) can make certain decisions and set certain parameters (e.g., source scan type; use of coding tools) in the same way as a video encoder during runtime inference. In this case, the ML refinement network (140) is further adapted to perform post-processing of reconstructed video that has been compressed according to such settings. Different ML refinement networks can be used for different combinations of encoder settings and decisions. Alternatively, a single (larger) ML refinement network can be used for different combinations of encoder settings and decisions.

As another example, the ML refinement network (140) can be trained for a specific type of video, such as “talking head” video or screen capture content. In this case, the ML refinement network (140) is adapted to perform post-processing for that type of video. Different ML refinement networks can be used for different types of video. Alternatively, the ML refinement network (140) can be trained for various types of video, such that the ML refinement network (140) is adapted to perform post-processing for any arbitrary type of video.

Although FIG. 1*a* shows a frame of video as input or output from different modules, the example architecture (101) can be configured to process other units of video, such as slices or tiles. For example, the video encoder (120) can be configured to encode a slice or tile and produce encoded data for the slice or tile, the video decoder (130) can be configured to decode a slice or tile and produce the decoded slice or tile for post-processing, and the ML refinement network (140) can be configured to perform post-processing operations on a decoded slice or tile. Processing of sub-frame units of video can provide more opportunities for parallel processing. Processing of sub-frame units of video can also reduce memory usage because features need not be stored for an entire frame.

Although FIG. 1*a* depicts serial processing of a single video frame, various operations of the pipeline can be performed in parallel for different video frames. Parallel processing can reduce overall latency and also utilize available hardware more completely. For example, while refinement operations are performed by the ML refinement network (140) for a given frame n, decoding operations can be performed by the video decoder (130) for a subsequent frame n+1, and encoding operations can be performed by the video encoder (120) for a subsequent frame n+2.

As another example, parallel processing can be performed for sub-frame units such as slices or tiles. While refinement operations are performed by the ML refinement network (140) for a given slice or tile, decoding operations can be performed by the video decoder (130) for a subsequent (second) slice or tile, and encoding operations can be performed by the video encoder (120) for the next (third) slice or tile. Performing operations at the granularity of sub-frame units can reduce latency (one stage in the pipeline can begin after the prior stage has completed a single sub-frame unit, rather than having to wait for the entire frame to finish).

To the extent the video encoder (120), video decoder (130), and ML refinement network (140) individually support parallel processing of sub-frame units, there are even more opportunities for parallel processing. For example, while refinement operations are performed by the ML refinement network (140) for multiple slices or tiles of frame n, decoding operations can be performed by the video decoder (130) for multiple slices or tiles of frame n+1, and encoding operations can be performed by the video encoder (120) for multiple slices or tiles of frame n+2.

B. Example Architectures for Inference Using an ML Refinement Network.

Once an ML refinement network has been trained for post-processing of reconstructed video, the trained ML refinement network can be deployed for inference at runtime.

FIG. 1*b* shows an example architecture (102) for client-side inference using an ML refinement network in post-processing of reconstructed video. The example architecture (102) includes a video decoder (130) and trained ML refinement network (142). When the trained ML refinement network (142) uses temporal feedback based on information from decoded video as a first optional enhancement, the example architecture (102) can also include one or more buffers (160) and one or more warping modules (170). When temporal feedback based on information from refined video is used as a second optional enhancement, the example architecture (102) can include one or more refined video buffers (180) and one or more associated warping modules (190).

The video decoder (130) is configured to accept, as input, encoded data for the frame n, which the video decoder (130) receives from a content delivery network or other source. The encoded data that is input to the video decoder (130) can be part of a bitstream organized according to the H.264/AVC standard, H.265/HEVC standard, H.266/VVC standard, AV1 standard, or another codec standard or format. The video decoder (130) is configured to decode the encoded data for frame n and produce, as output, a decoded frame n. Specifically, the video decoder (130) is configured to perform decoding operations according to the codec standard or format.

The trained ML refinement network (142) is configured to accept, as input, a decoded frame n, perform post-processing operations on the decoded frame n (as described with reference to FIG. 1*a*), and produce, as output, a refined frame n. The trained ML refinement network (142) can be a convolutional neural network having a U-Net architecture, as described with reference to FIGS. 2*a*-2*f*. Alternatively, the trained ML refinement network (142) can implement another type of ML model, such as a transformer network.

Optionally, the trained ML refinement network (142) can use temporal feedback. In particular, the trained ML refinement network (142) can use temporal feedback according to a first optional enhancement (with information from decoded previous frames) and/or according to a second optional enhancement (with information from refined previous frames).

When the trained ML refinement network (142) uses temporal feedback based on information from decoded video, the trained ML refinement network (142) is also configured to accept, as input, decoded previous video from output of the video decoder (130), after spatial alignment to current video through a warping process. The decoded previous video is buffered in the decoded video buffer(s) (160) and warped by the associated warping module(s) (170), as described with reference to FIG. 1*a*.

When the trained ML refinement network (142) uses temporal feedback based on information from refined video, the trained ML refinement network (142) is also configured to accept, as input, refined previous video from output of the trained ML refinement network (142), after spatial alignment to current video through a warping process. In the example architecture (102) of FIG. 1*b*, for example, each of the refined video buffer(s) (180) is configured to store a refined frame from time n−1, n−2, and so on. Each of the warping module(s) (170) is configured to retrieve a refined previous frame from one of the buffer(s) (180) and to warp the refined previous frame to spatially align sample values of the refined previous frame with corresponding sample values of the decoded frame n. The warping can use motion estimation between the refined previous frame and decoded frame n, or the warping can use forward projection of motion information from the refined previous frame to decoded frame n, as described with reference to FIG. 1*a*. Rescaling operations before concatenation with the decoded frame n can be performed as described with reference to FIG. 1*a*.

In some example implementations, the trained ML refinement network (142) is adapted for a particular context (e.g., a specific codec standard or format; a given target quality or bitrate; a combination of encoder settings and decisions; and/or a specific type of video), as described with reference to the ML refinement network (140) of FIG. 1*a*. When different ML refinement networks are trained for different options (e.g., different target quality levels or bitrates), a given client computer system can have the different ML refinement networks installed or otherwise available. An appropriate one of the ML refinement networks can be selected at runtime based on current conditions. If the conditions change, the selected ML refinement network can be dynamically switched to a different ML refinement network during runtime.

Although FIG. 1*b* shows a frame of video as input or output from different modules, the example architecture (102) can be configured to process other units of video, such as slices or tiles. For example, the video decoder (130) can be configured to decode a slice or tile and produce the decoded slice or tile for post-processing, and the trained ML refinement network (142) can be configured to perform post-processing operations on a decoded slice or tile. Processing of sub-frame units of video can provide more opportunities for parallel processing. Processing of sub-frame units of video can also reduce memory usage because features need not be stored for an entire frame.

Although FIG. 1*b* depicts serial processing of a single video frame, various operations of the pipeline can be performed in parallel for different video frames. Parallel processing can reduce overall latency and also utilize available hardware more completely. For example, while refinement operations are performed by the ML trained refinement network (142) for a given frame n, decoding operations can be performed by the video decoder (130) for a subsequent frame n+1.

As another example, parallel processing can be performed for sub-frame units such as slices or tiles. While refinement operations are performed by the trained ML refinement network (142) for a given slice or tile, decoding operations can be performed by the video decoder (130) for a subsequent slice or tile. Performing operations at the granularity of sub-frame units can reduce latency, as explained with reference to FIG. 1*a*. To the extent the video decoder (130) and trained ML refinement network (142) individually support parallel processing of sub-frame units, there are even more opportunities for parallel processing. For example, while refinement operations are performed by the trained ML refinement network (142) for multiple slices or tiles of frame n, decoding operations can be performed by the video decoder (130) for multiple slices or tiles of frame n+1.

The example architecture (102) of FIG. 1*b* can include one or more other modules (not shown) configured to perform post-processing operations for display. For example, the other module(s) can be configured to accept, as input, a refined frame n, perform post-processing operations (for color space conversion, color mapping, scaling, sharpening, or other filtering), and produce, as output for display, a post-processed frame n. Post-processing operations can be performed for a given frame n while refinement operations are performed in parallel for subsequent video of frame n+1, and decoding operations are performed in parallel for subsequent video of frame n+2.

C. Example ML Refinement Networks.

FIGS. 2*a*-2*f* show an example ML refinement network (201) that can be used in post-processing of reconstructed video. The example ML refinement network (201) can be used to implement the ML refinement network (140) described with reference to FIG. 1*a*, the trained ML refinement network (142) described with reference to FIG. 1*b*, or another ML refinement network.

In general, the example ML refinement network (201) is a convolutional neural network having a U-net architecture. As shown in FIG. 2*a*, the example ML refinement network (201) includes an input expansion block (210), a concatenation block (220), reduction blocks (230*a*-230*d*), a bottleneck block (240), expansion blocks (250*a*-250*c*), and an output block (260). In FIG. 2*a*, the number at the left side of a given block shows a count of inputs (or input channels in an input feature map) to the given block, and the number at the right side of a given block shows the number of corresponding output channels in an output feature map from the given block, for an example implementation. For example, for a 1920×1080 frame with three sample values per pixel, the inputs to the input expansion block (210) are three sample values per pixel (1920×1080×3), and the outputs from the input expansion block (210) are 29 channels per pixel in a feature map that has different spatial resolution due to upsampling operations (and possibly convolution operations). In other implementations, the numbers of input channels and output channels can vary. An indication of "skip" denotes features are provided as output from one block directly as input to another block, bypassing intervening blocks of the example refinement network (201) and thereby allowing gradients to flow more freely through the example refinement network (201).

FIGS. 2*b*-2*f* show additional details for some of the blocks of FIG. 2*a*. Such blocks of FIG. 2*a* can be implemented using combinations of convolution blocks, batch normalization blocks, activation blocks, upsampling blocks, and max pooling blocks.

A convolution block represents a convolution operation using a filter. A 3×3 convolution block represents a convolution operation using a 3×3 kernel placed, as a sliding window typically displaced by one sample value (but alternatively displaced by another "stride") over portions of a channel of the input to the 3×3 convolution block. The 3×3 convolution block can be used to detect and/or extract relevant features from the input to the 3×3 convolution block. The output of the 3×3 convolution block can be a feature map with the same (or reduced) spatial resolution but increased depth (more channels for features) or decreased depth (fewer channels for features). With regard to spatial resolution, the input to the 3×3 convolution block can be padded such that the output feature map has the same spatial resolution as the input feature map. Or, without padding, the output feature map can have a smaller spatial resolution. With regard to depth in terms of the number of output channels, different filters can be used to create different output channels based on the input, with each filter producing output in a separate channel in the output feature map. For example, for three inputs of a 3×3 convolution block, 29 different instances of filters can be used to create 29 different output features from the 3×3 convolution block. A 1×1 convolution block represents a convolution operation using a 1×1 kernel placed, as a sliding window, over portions of the input to the 1×1 convolution block. The 1×1 convolution block can be used to change the number of channels in a feature map while retaining important features. The output of the 1×1 convolution block can be a feature map with the same spatial resolution but different depth (e.g., fewer channels for features). During training, the weight value of a 1×1 kernel per output channel and weight values of a 3×3 kernel per output channel can be adjusted as parameters. Alternatively, convolution blocks of different sizes (e.g., 5×5 instead of 3×3) can be used.

A batch normalization block represents a normalization operation for a batch. A batch normalization block can stabilize a network during training by standardizing inputs and also make the network more robust to changes in input distribution. For example, for a batch of input data, the batch normalization block calculates mean and standard deviation values, normalizes the batch using the mean and standard deviation values, and scales and shifts the normalized values using parameters (bias values) learned during training for the batch normalization block. During runtime inference, the learned parameters (bias values) are used to normalize values.

A rectified linear unit ("ReLu") activation block implements a ReLu activation function. For example, the ReLU activation function is $f(x)=\max(0, x)$, which changes negative values of x to zero. In general, the activation function can help a network converge faster during training and have better performance by addressing the problem of vanishing gradients. Alternatively, an activation block can implement another activation function, such as a leaky ReLu activation function (e.g., $f(x)=\max(0.01\times x, x)$) or a sigmoid function that accepts a real number and produces an output in the range of 0.0 to 1.0 (e.g., $s(x)=1/(1+e^{-x})$).

A 2× upsampling block represents an upsampling operation. In general, an upsampling block increases the spatial resolution of a feature map without changing the number of channels. For example, the 2× upsampling block doubles the spatial resolution of a feature map in each dimension, per channel. For example, applying an 2× upsampling block to a 1920×1080×32 feature map produces a 3840×2160×32 output feature map. The 2× upsampling block can use bilinear interpolation or deconvolution with weight values that are learned during training. Upsampling can help a network capture finer details in subsequent operations. Alternatively, an upsampling block can implement upsampling by a different factor.

A max pooling block represents a specialized downsampling operation in which a maximum value within a kernel is retained. In general, a max pooling block reduces spatial resolution of an input feature map while retaining important information. For example, a MaxPool 2×2 block represents a downsampling operation using a 2×2 kernel placed, as a sliding window displaced by two sample values, over portions of a channel of the input feature map to the MaxPool 2×2 block. Within the 2×2 kernel, the maximum value is retained for the channel of the input feature map. With the MaxPool 2×2 block, the spatial resolution of the output feature map is halved by a factor of two horizontally and vertically.

With reference to FIG. 2*a*, the input expansion block (210) is configured to accept inputs to the example ML refinement network (201) from a decoded frame n (or sub-frame unit thereof), perform operations with blocks shown in FIG. 2*b*, and produce outputs for the concatenation block (220). For example, the inputs are sample values of the decoded frame n or sub-frame unit thereof. For a given pixel, the inputs are sample values of three different color components such as R, G, B, or Y, U, V. FIG. 2*b* shows an example of the input expansion block (210). The input expansion block (210) includes multiple convolution blocks (211, 214), multiple batch normalization blocks (212, 215), multiple ReLu activation blocks (213, 216), and a 2× upsampling block (217), which are configured to perform operations as described above. The output feature map from the input expansion block (210) includes 29 output channels.

In the example of FIGS. 2*a*-2*f*, the ML refinement network (200) performs "super-resolution" operations at increased spatial resolution, compared to the decoded frame n. Alternatively, spatial resolution is not increased for super-resolution operations by the ML refinement network (200). In this case, the input expansion block (210) can be omitted from the ML refinement network (200).

With reference to FIG. 2*a*, the concatenation block (220) is configured to accept inputs from the input expansion block (210), accept inputs from one or more warped, refined previous frames when temporal feedback (based on information from refined previous frames) is used, concatenate the inputs, and produce outputs for the first reduction block (230*a*). For example, the inputs from the warped, refined previous frame(s) are sample values that have been spatially aligned with corresponding sample values in the current decoded frame n. For a given pixel, the inputs are sample values of three different color components such as R, G, B, or Y, U, V. When temporal feedback based on information from decoded previous frames is used (not shown), inputs are from one or more warped, decoded previous frames. When temporal feedback is not used, the concatenation block (220) can be skipped or dummy values can be used in place of sample values from the warped, refined previous frame(s).

With reference to FIG. 2*a*, each of the reduction blocks (230*a*-230*d*) is configured to accept inputs from an earlier block in FIG. 2*a*, perform operations with blocks shown in FIG. 2*c*, and produce outputs for a following block in FIG. 2*a*. In general, the reduction blocks (230*a*-230*d*) reduce spatial resolution but expand the number of features. FIG. 2*c* shows an example of each of the reduction blocks (230*a*-230*d*). Each of the reduction blocks (230*a*-230*d*) includes multiple convolution blocks (231, 234), multiple batch normalization blocks (232, 235), multiple ReLu activation blocks (233, 236), and a MaxPool 2×2 block (237), which are configured to perform operations as described above. Of note, the output of the ReLu activation block (236) is directly provided as output to a downstream block (shown as "skip" in FIGS. 2*a* and 2*c*) in addition to being provided to the MaxPool 2×2 block (237).

With reference to FIG. 2*a*, the bottleneck block (240) is configured to accept inputs from the final reduction block (230*d*), perform operations with blocks shown in FIG. 2*d*, and produce outputs for the first expansion block (250*a*). In general, the bottleneck block (240) expands the number of features without changing the spatial resolution (or at least without changing the spatial resolution significantly). FIG. 2*d* shows an example of the bottleneck block (240). The bottleneck block (240) includes multiple convolution blocks (241, 244), multiple batch normalization blocks (242, 245), and multiple ReLu activation blocks (243, 246), which are configured to perform operations as described above.

With reference to FIG. 2*a*, each of the expansion blocks (250*a*-250*c*) is configured to accept inputs from an earlier block in FIG. 2*a*, perform operations with blocks shown in FIG. 2*e*, and produce outputs for a following block in FIG. 2*a*. In general, the expansion blocks (250*a*-250*c*) reduce the number of features but increase spatial resolution. FIG. 2*e* shows an example of each of the expansion blocks (250*a*-250*c*). Each of the expansion blocks (250*a*-250*c*) includes a 2× upsampling block (251), multiple convolution blocks (252, 255), multiple batch normalization blocks (253, 256), and multiple ReLu activation blocks (254, 257), which are configured to perform operations as described above. Of note, the 1×1 convolution block (252) directly receives input from an upstream block (shown as "skip" in FIGS. 2*a* and 2*e*) in addition to receiving input from the 2× upsampling block (251).

With reference to FIG. 2*a*, the output block (260) is configured to accept inputs from the final expansion block (250*c*), perform operations with blocks shown in FIG. 2*f*, and produce output sample values. For example, the outputs are sample values of the refined frame n or sub-frame unit thereof. For a given pixel, the outputs are sample values of three different color components such as R, G, B, or Y, U, V. In general, the output block (260) reduces the number of features but increases spatial resolution. FIG. 2*f* shows an example of the output block (260). The output block (260) includes a 2× upsampling block (261), multiple convolution blocks (262, 265, 268), multiple batch normalization blocks (263, 266), and multiple ReLu activation blocks (264, 267), which are configured to perform operations as described above. Of note, the 1×1 convolution block (262) directly receives inputs from an upstream block (shown as "skip" in FIGS. 2*a* and 2*f*) in addition to receiving inputs from the 2× upsampling block (261).

Alternatively, an ML refinement network can be implemented using a different approach, e.g., with residual dense blocks.

D. Example Techniques for Training an ML Refinement Network for Post-Processing of Reconstructed Video.

Figure 3:
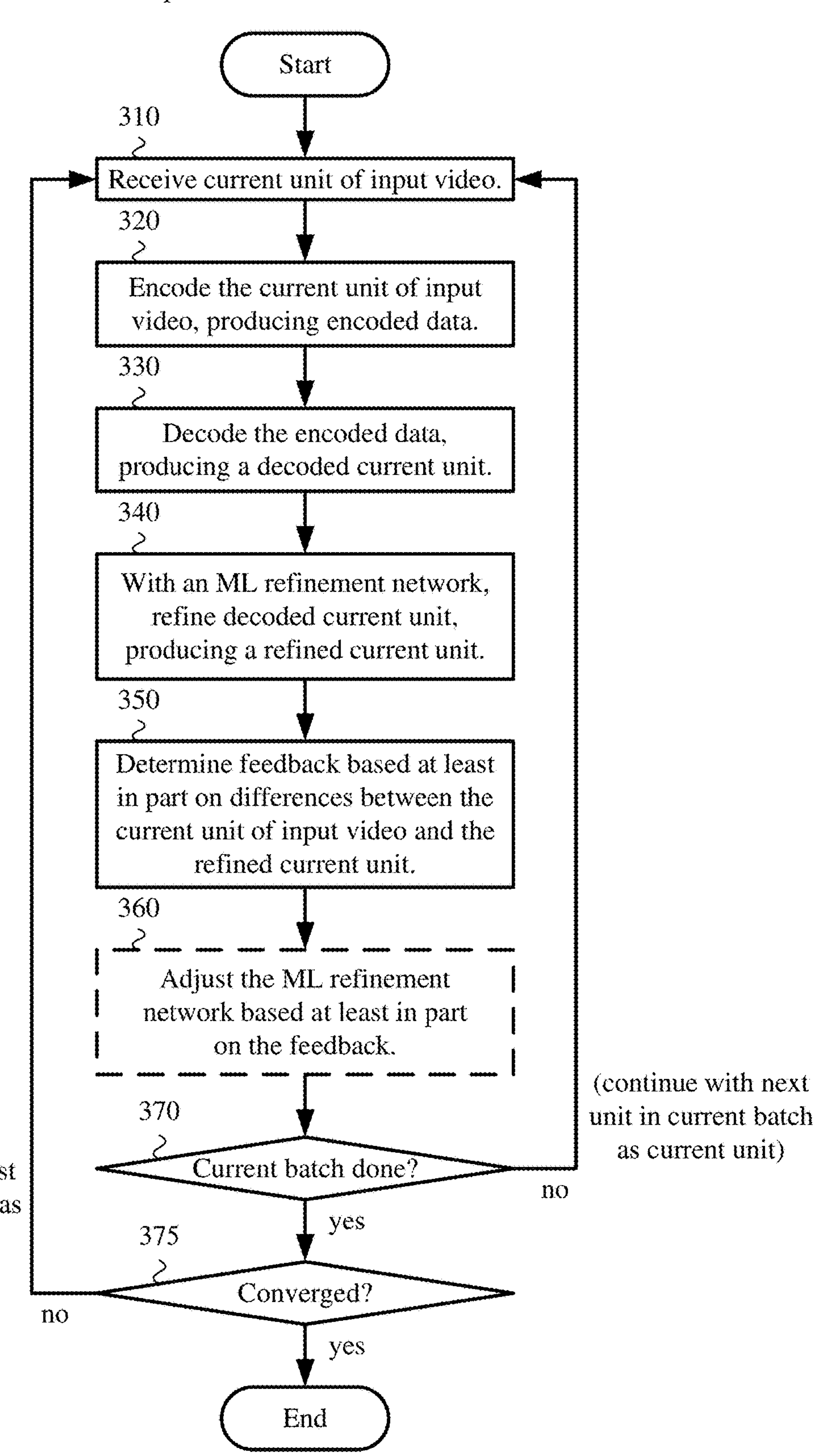
FIG. 3 is a flowchart illustrating an example technique for training an ML refinement network to use in post-processing of video.

FIG. 3 shows an example technique (300) for training an ML refinement network for post-processing of reconstructed video. A video post-processing tool, as described with reference to FIG. 1*a* or otherwise, can perform the technique (300).

To start, the video post-processing tool receives (310) a current unit of input video. For example, the current unit of input video is a frame, a slice, or a tile. Alternatively, the current unit of input video is a group of pictures, a sequence, or another unit of video.

The video post-processing tool encodes (320) the current unit of input video, which produces encoded data for the current unit of input video. The video post-processing tool also decodes (330) the encoded data, which produces a decoded current unit. For the encoding (320) and the decoding (330), the video post-processing tool can completely encode and decode the current unit, or the video post-processing tool can partially encode and decode the current unit (e.g., skipping some operations such as entropy coding/decoding or other lossless operations).

With an ML refinement network, the video post-processing tool refines (340) the decoded current unit to mitigate compression artifacts, which produces a refined current unit. For example, the ML refinement network is a convolutional neural network having a U-Net architecture, as described with reference to FIGS. 2*a*-2*f*. Alternatively, the ML refinement network implements another type of ML model. The compression artifacts that are mitigated can include blocking artifacts, blurring artifacts, banding artifacts, ringing artifacts, and/or another type of compression artifact.

The video post-processing tool determines (350) feedback based at least in part on differences between the current unit of input video and the refined current unit. For example, the video post-processing tool determines a value of a reward function based on differences in corresponding sample values between the current unit of input video and refined current unit. Examples of reward functions are described above.

The video post-processing tool adjusts (360) the ML refinement network based at least in part on the feedback. For example, the video post-processing tool adjusts weight values and/or bias values in at least one block of a convolutional neural network having a U-Net architecture. Alternatively, the video post-processing tool adjusts the ML refinement network in some other way. The video post-processing tool can skip the adjustment (360) of the ML refinement network for some units of video. For example, the video post-processing tool aggregates the feedback for the current unit with other feedback (from previous units). In this case, the adjustment (360) of the ML refinement network can use the aggregated feedback for the current unit after skipping the adjustment (360) for the previous units, or the adjustment (360) of the ML refinement network can be skipped for the current unit.

The video post-processing tool performs training for a current batch of units of input video. The current batch of units can be for part of a video sequence, for an entire video sequence, or for multiple video sequences. The video post-processing tool checks (370) whether the current batch is done. If not, the video post-processing tool continues with the next unit in the current batch as the current unit. Thus, for each of one or more subsequent units treated as the current unit, the video post-processing tool can repeat operations for the receiving (310), encoding (320), decoding (330), refining (340), determining (350), and adjusting (360).

After completing processing for the units in the current batch, the video post-processing tool checks (375) whether the ML refinement network has reached a convergence threshold. Examples of convergence thresholds are described above. If the ML refinement network has reached the convergence threshold, the training process completes. If the ML refinement network has not yet reached the convergence threshold, the video post-processing tool continues with the first unit of a next batch of units as the current unit of the current batch. Thus, in each of multiple training iterations until the ML refinement network satisfies the convergence threshold, for a different unit treated as the current unit, the video post-processing tool can repeat operations for the receiving (310), encoding (320), decoding (330), refining (340), determining (350), and adjusting (360).

In example implementations in which units of video are frames, slices, tiles, or other types of units smaller than a frame, the video post-processing tool can use temporal feedback during the training process. For temporal feedback, the video post-processing tool can implement a feedback loop using information from one or more decoded previous units. Instead of or in addition to such a feedback loop, the video post-processing tool can implement a feedback loop using information from one or more refined previous units.

For a feedback loop using information from one or more refined previous units, the video post-processing tool can retrieve, from a refined video buffer, a given refined previous unit and warp the given refined previous unit. The warping produces a given warped, refined previous unit. In general, the warping spatially aligns sample values of the given refined previous unit with expected locations in the decoded current unit. The warping can use motion estimation and/or forward projection of motion from the given refined previous unit. The video post-processing tool provides the given warped, refined previous unit to the ML refinement network, and the refining (340) the decoded current unit with the ML refinement network is based at least in part on the given warped, refined previous unit. If some example implementations, the video post-processing tool can use temporal feedback from multiple refined previous units that have been stored in buffers. Thus, the video post-processing tool can, for each of one or more additional refined previous units treated as the given refined previous unit, repeat operations for the retrieving, warping, and providing. Conversely, after refining the current unit, the video post-processing tool can store, in a buffer, the refined current unit for use in providing temporal feedback to the ML refinement network For one or more subsequent units.

For a feedback loop using information from one or more decoded previous units, the video post-processing tool can retrieve, from a decoded video buffer, a given decoded previous unit and warp the given decoded previous unit. The warping produces a given warped, decoded previous unit. In general, the warping spatially aligns sample values of the given decoded previous unit with locations in the decoded current unit. The warping can use motion estimation and/or forward projection of motion from the given decoded previous unit. The video post-processing tool provides the given warped, decoded previous unit to the ML refinement network, and the refining (850) the decoded current unit with the ML refinement network is based at least in part on the given warped, decoded previous unit. In some example implementations, the video post-processing tool can use temporal feedback from multiple decoded previous units that have been stored in decoded video buffers. Thus, the video post-processing tool can, for each of one or more additional decoded previous units treated as the given decoded previous unit, repeat operations for the retrieving, warping, and providing. Conversely, after decoding the current unit, the video post-processing tool can store, in a decoded video buffer, the decoded current unit for use in providing temporal feedback to the ML refinement network for one or more subsequent units.

Although the encoding (320), decoding (330), and refining (340) are performed serially for a given unit of video, the video post-processing tool can perform certain operations in parallel for different units. For example, at least some operations for the encoding (320), decoding (330), and refining (340) can be performed in parallel for different units of video.

Typically, the encoding (320) is performed using a video encoder for a codec standard or format, and the decoding (330) is performed using a video decoder for the codec standard or format. In this case, the ML refinement network is also trained for the codec standard or format. In some example implementations, the encoding (320) produces the encoded data at a target level of quality and/or bitrate during training. In this case, the ML refinement network is trained for the target level of quality and/or bitrate.

E. Example Techniques for Using an ML Refinement Network to Post-Process Reconstructed Video.

Figure 4:
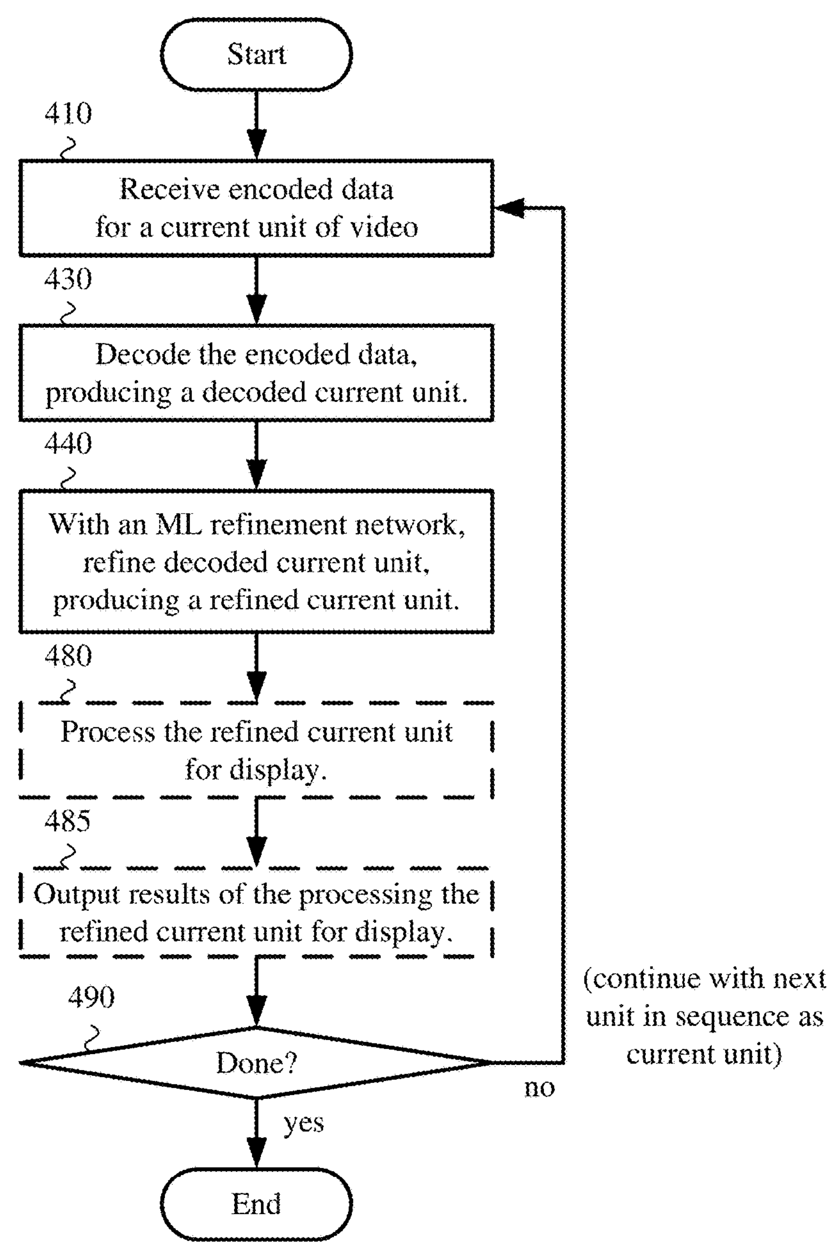
FIG. 4 is a flowchart illustrating an example technique for client-side inference using an example ML refinement network in post-processing of video.

FIG. 4 shows an example technique (400) for using an ML refinement model to post-process reconstructed video. A video post-processing tool, as described with reference to FIG. 1*b* or otherwise, can perform the technique (400).

To start, the video post-processing tool receives (410) encoded data for a current unit of video. For example, the current unit of video is a frame, a slice, or a tile. Alternatively, the current unit of video is a group of pictures, a sequence, or another unit of video. The video post-processing tool decodes (430) the encoded data, which produces a decoded current unit.

With an ML refinement network, the video post-processing tool refines (440) the decoded current unit to mitigate compression artifacts, which produces a refined current unit. For example, the ML refinement network is a convolutional neural network having a U-Net architecture, as described with reference to FIGS. 2*a*-2*f*. Alternatively, the ML refinement network implements another type of ML model. The compression artifacts that are mitigated can include blocking artifacts, blurring artifacts, banding artifacts, ringing artifacts, and/or another type of compression artifact.

When a frame has been completed, the video post-processing tool processes (480) the refined current unit for display and outputs (485) results of the processing the refined current unit for display. For example, the processing (480) includes color mapping operations, color space conversion operations, scaling operations, sharpening operations, and/or other filtering operations. If the current unit is a sub-frame unit, the refined current unit may be stored until a frame is complete, at which point the processing (480) and outputting (485) may be performed for the frame. Also, depending on differences between decoding order of frames and display order of frames, the processing (480) and outputting (485) may be performed after storing the refined current unit for a period of time in a decoded picture buffer.

The video post-processing tool checks (490) whether to continue with another unit of video. If so, the video post-processing tool continues with the next unit in a sequence as the current unit. Thus, for each of one or more subsequent units treated as the current unit, the video post-processing tool can repeat operations for the receiving (410), decoding (430) and refining (440). As frames are completed, the video post-processing tool can also repeat operations for the processing (480) and outputting (485).

In example implementations in which units of video are frames, slices, tiles, or other types of units smaller than a frame, the video post-processing tool can use temporal feedback during the inference process. For temporal feedback, the video post-processing tool can implement a feedback loop using information from one or more decoded previous units. Instead of or in addition to such a feedback loop, the video post-processing tool can implement a feedback loop using information from one or more refined previous units.

For a feedback loop using information from one or more refined previous units, the video post-processing tool can retrieve, from a buffer, a given refined previous unit and warp the given refined previous unit. The warping produces a given warped, refined previous unit. In general, the warping spatially aligns sample values of the given refined previous unit with expected locations in the decoded current unit. The warping can use motion estimation and/or forward projection of motion from the given refined previous unit. The video post-processing tool provides the given warped, refined previous unit to the ML refinement network, and the refining (440) the decoded current unit with the ML refinement network is based at least in part on the given warped, refined previous unit. In some example implementations, the video post-processing tool can use temporal feedback from multiple refined previous units that have been stored in buffers. Thus, the video post-processing tool can, for each of one or more additional refined previous units treated as the given refined previous unit, repeat operations for the retrieving, warping, and providing. Conversely, after refining the current unit, the video post-processing tool can store, in a buffer, the refined current unit for use in providing temporal feedback to the ML refinement network for one or more subsequent units.

For a feedback loop using information from one or more decoded previous units, the video post-processing tool can retrieve, from a decoded video buffer, a given decoded previous unit and warp the given decoded previous unit. The warping produces a given warped, decoded previous unit. In general, the warping spatially aligns sample values of the given decoded previous unit with locations in the decoded current unit. The warping can use motion estimation and/or forward projection of motion from the given decoded previous unit. The video post-processing tool provides the given warped, decoded previous unit to the ML refinement network, and the refining the decoded current unit with the ML refinement network is based at least in part on the given warped, decoded previous unit. In some example implementations, the video post-processing tool can use temporal feedback from multiple decoded previous units that have been stored in decoded video buffers. Thus, the video post-processing tool can, for each of one or more additional decoded previous units treated as the given decoded previous unit, repeat operations for the retrieving, warping, and providing. Conversely, after decoding the current unit, the video post-processing tool can store, in a decoded video buffer, the decoded current unit for use in providing temporal feedback to the ML refinement network for one or more subsequent units.

Although the decoding (430) and refining (440) are performed serially for a given unit of video, the video post-processing tool can perform certain operations in parallel for different units. For example, at least some operations for the decoding (430), refining (440), and processing (480) can be performed in parallel for different units of video.

Typically, the decoding (430) is performed using a video decoder for a codec standard or format. In this case, the ML refinement network has been trained for the codec standard or format. Also, in some example implementations, the ML refinement network has been trained for a target level of quality and/or bitrate.

F. Innovative Features.

The following table shows some of the innovative features described herein for using an ML refinement network to post-process reconstructed video.

| | Feature |
|---|---|
| A1 | In a computer system, a method of training a machine learning ("ML") refinement network for post-processing of video, the method comprising:<br>receiving a current unit of input video;<br>encoding the current unit of input video, thereby producing encoded data for the current unit of input video;<br>decoding the encoded data, thereby producing a decoded current unit;<br>with an ML refinement network, refining the decoded current unit to mitigate compression artifacts, thereby producing a refined current unit;<br>determining feedback based at least in part on differences between the current unit of input video and the refined current unit; and<br>adjusting the ML refinement network based at least in part on the feedback. |
| A2 | The method of A1, wherein the ML refinement network is a convolutional neural network having a U-Net architecture. |
| A3 | The method of A2, wherein the adjusting the ML refinement network includes adjusting weight values and/or bias values in at least one block of the convolutional neural network having the U-Net architecture. |
| A4 | The method of any one of A1 to A3, wherein the compression artifacts include blocking artifacts, blurring artifacts, banding artifacts, and/or ringing artifacts. |
| A5 | The method of any one of A1 to A4, further comprising, in each of multiple training iterations until the ML refinement network satisfies a convergence threshold:<br>repeating the receiving, the encoding, the decoding, the refining, the determining, and the adjusting. |
| A6 | The method of any one of A1 to A5, wherein the current unit of input video is a frame, a slice, or a tile. |
| A7 | The method of any one of A1 to A6, further comprising:<br>storing, in a decoded video buffer, the decoded current unit for use in providing temporal feedback to the ML refinement network. |
| A8 | The method of any one of A1 to A6, further comprising:<br>retrieving, from a decoded video buffer, a given decoded previous unit;<br>warping the given decoded previous unit to spatially align sample values of the given decoded previous unit with locations in the decoded current unit, thereby producing a given warped, decoded previous unit; and<br>providing the given warped, decoded previous unit to the ML refinement network, wherein the refining the decoded current unit is based at least in part on the given warped, decoded previous unit. |
| A9 | The method of A8, wherein the warping uses motion estimation and/or forward projection of motion from the given decoded previous unit. |
| A10 | The method of A8, further comprising, for each of one or more additional decoded previous units as the given decoded previous unit, repeating the retrieving, the warping, and the providing. |
| A11 | The method of any one of A1 to A10, further comprising:<br>storing, in a buffer, the refined current unit for use in providing temporal feedback to the ML refinement network. |
| A12 | The method of any one of A1 to A10, further comprising:<br>retrieving, from a buffer, a given refined previous unit;<br>warping the given refined previous unit to spatially align sample values of the given refined previous unit with expected locations in the decoded current unit, thereby producing a given warped, refined previous unit; and<br>providing the given warped, refined previous unit to the ML refinement network, wherein the refining the decoded current unit is based at least in part on the given warped, refined previous unit. |
| A13 | The method of A12, wherein the warping uses motion estimation and/or forward projection of motion from the given refined previous unit. |
| A14 | The method of A12, further comprising, for each of one or more additional refined previous units as the given refined previous unit, repeating the retrieving, the warping, and the providing. |
| A15 | The method of any one of A1 to A14, further comprising, for each of one or more subsequent units as the current unit, repeating the receiving, the encoding, the decoding, the refining, the determining, and the adjusting. |
| A16 | The method of A15, wherein at least some operations for the encoding, the decoding, and the refining are performed in parallel for different units. |
| A17 | The method of any one of A1 to A5, wherein the current unit of input video is a group of pictures or a sequence. |
| A18 | The method of any one of A1 to A17, wherein the encoding is performed using a video encoder for a codec standard or format, wherein the decoding is performed using a video decoder for the codec standard or format, and wherein the ML refinement network is trained for the codec standard or format. |
| A19 | The method of any one of A1 to A17, wherein the encoding produces the encoded data at a target level of quality and/or bitrate, and wherein the ML refinement network is trained for the target level of quality and/or bitrate. |
| A20 | The method of any one of A1 to A19, further comprising:<br>aggregating the feedback with other feedback, wherein the adjusting the ML refinement network uses the aggregated feedback. |
| A21 | One or more computer-readable media having stored thereon computer-executable instructions for causing a processor system, when programmed thereby, to perform operations of the method of any one of A1 to A20. |

-continued

| | Feature |
|---|---|
| A22 | A computer system comprising a processor system and memory, wherein the computer system is configured to perform operations of the method of any one of A1 to A20. |
| B1 | In a computer system, a method of using a machine learning ("ML") refinement network to post-process video, the method comprising: receiving encoded data for a current unit of video; decoding the encoded data, thereby producing a decoded current unit; and with an ML refinement network, refining the decoded current unit to mitigate compression artifacts, thereby producing a refined current unit. |
| B2 | The method of B1, wherein the ML refinement network is a convolutional neural network having a U-Net architecture. |
| B3 | The method of B1 or B2, wherein the compression artifacts include blocking artifacts, blurring artifacts, banding artifacts, and/or ringing artifacts. |
| B4 | The method of any one of B1 to B3, wherein the current unit of video is a frame, a slice, or a tile. |
| B5 | The method of any one of B1 to B4, further comprising: storing, in a decoded video buffer, the decoded current unit for use in providing temporal feedback to the ML refinement network. |
| B6 | The method of any one of B1 to B4, further comprising: retrieving, from a decoded video buffer, a given decoded previous unit; warping the given decoded previous unit to spatially align sample values of the given decoded previous unit with locations in the decoded current unit, thereby producing a given warped, decoded previous unit; and providing the given warped, decoded previous unit to the ML refinement network, wherein the refining the decoded current unit is based at least in part on the given warped, decoded previous unit. |
| B7 | The method of B6, wherein the warping uses motion estimation and/or forward projection of motion from the given decoded previous unit. |
| B8 | The method of B6, further comprising, for each of one or more additional decoded previous units as the given decoded previous unit, repeating the retrieving, the warping, and the providing. |
| B9 | The method of any one of B1 to B8, further comprising: storing, in a buffer, the refined current unit for use in providing temporal feedback to the ML refinement network. |
| B10 | The method of any one of B1 to B8, further comprising: retrieving, from a buffer, a given refined previous unit; warping the given refined previous unit to spatially align sample values of the given refined previous unit with expected locations in the decoded current unit, thereby producing a given warped, refined previous unit; and providing the given warped, refined previous unit to the ML refinement network, wherein the refining the decoded current unit is based at least in part on the given warped, refined previous unit. |
| B11 | The method of B10, wherein the warping uses motion estimation and/or forward projection of motion from the given refined previous unit. |
| B12 | The method of B10, further comprising, for each of one or more additional refined previous units as the given refined previous unit, repeating the retrieving, the warping, and the providing. |
| B13 | The method of any one of B1 to B12, further comprising, for each of one or more subsequent units as the current unit, repeating the receiving, the decoding, the refining, the processing, and the outputting. |
| B14 | The method of B13, wherein at least some operations for the decoding and the refining are performed in parallel for different units. |
| B15 | The method of any one of B1 to B3, wherein the current unit of video is a group of pictures or a sequence. |
| B16 | The method of any one of B1 to B15, wherein the decoding is performed using a video decoder for a codec standard or format, and wherein the ML refinement network has been trained for the codec standard or format. |
| B17 | The method of any one of B1 to B16, wherein the ML refinement network has been trained for a target level of quality and/or bitrate. |
| B18 | The method of any one of B1 to B17, further comprising: processing the refined current unit for display; and outputting results of the processing the refined current unit for display. |
| B19 | One or more computer-readable media having stored thereon computer-executable instructions for causing a processor system, when programmed thereby, to perform operations of the method of any one of B1 to B18. |
| B20 | A client computer system comprising a processor system and memory, wherein the client computer system is configured to perform operations of the method of any one of B1 to B18. |

II. ML Networks for Hybrid Compression and Corresponding Decompression.

Video codec systems have become highly optimized over the past 35 years. Typically, a video codec implements complicated algorithms for compression and decompression, using a wide range of tools. Examples of video codecs include those that implement the H.264/AVC standard, H.265/HEVC standard, H.266/VVC standard, VP9 standard, or AV1 standard. A video encoder for a codec standard or format can provide very good quality for a given bitrate of encoded data. Even so, some information is typically lost during the compression process, and some compression artifacts are typically introduced.

If a computer system that encodes video has sufficient resources, the computer system can use a machine learning ("ML") encoder network to transform video before encoding with a video encoder (core video encoder). For example, an ML encoder network can be trained to learn how to transform video to improve the achievable quality of the core video encoder with which the ML encoder network is paired. In some implementations, the ML encoder network can perform some compression operations (such as downsampling to decrease spatial resolution), in addition to transforming video before compression with the core video encoder. A corresponding ML decoder network can compensate for transformations of the ML encoder network and recover information that is lost during encoding, in addition to performing some decompression operations (such as upsampling to increase spatial resolution). This section describes operations performed to train and use an ML encoder network and ML decoder network for hybrid compression of video and corresponding decompression, in conjunction with a core video encoder and core video decoder. Using an ML encoder network and ML decoder network can provide various technical benefits.

Primarily, using an ML encoder network to transform video before encoding can enhance the ability of a core video encoder (after the ML encoder network) to preserve information during the process of compression. In this way, quality of the reconstructed video can be improved. Conversely, using an ML decoder network for enhancement of reconstructed video can compensate for transformations applied by the ML encoder network, in addition to mitigating compression artifacts (introduced during encoding) by reducing their severity or even eliminating them. In this way, quality of the reconstructed video can be further improved. The use of lower bitrates for encoded data can even be enabled, with the ML decoder network recovering quality in enhancement of reconstructed video.

More specifically, during training, an ML encoder network and ML decoder network can be provided with extensive examples of reconstructed video and corresponding input video, which the ML encoder network can use to determine how the transform video to preserve quality during compression, and which the ML decoder network can use to determine how the reconstructed video should appear without compression artifacts. After training, compression artifacts can be identified as known features. During runtime inference, the ML encoder network can leverage patterns learned with reference to input video to transform video to enable a core video encoder to better preserve quality. During runtime inference, the ML decoder network can leverage patterns learned with reference to input video to compensate for transformations applied by the ML encoder network and to mitigate compression artifacts introduced by the core video encoder.

In some example implementations, a temporal feedback loop can provide the ML encoder network and ML decoder network, as input, with additional information from recent reconstructed video. For example, additional information from enhanced previous frames can supplement transformation operations (with the ML encoder network) and enhancement operations (with the ML decoder network) for a current frame. An alternative (or additional) temporal feedback loop can provide the ML encoder network and ML decoder network, as input, with additional information from recent decoded video before enhancement. For example, additional information from decoded previous frames can supplement transformation operations (with the ML encoder network) and enhancement operations (with the ML decoder network) for a current frame. Using a temporal feedback loop can enable the ML encoder network and ML decoder network to further improve quality of reconstructed video.

In general, the ML encoder network and ML decoder network can improve video quality for a given bitrate of encoded data or, alternatively, reduce bitrate for a given level of video quality. In doing so, the ML encoder network and ML decoder network can add computational complexity and increase memory usage, and the ML encoder network and ML decoder network can also add latency due to processing delays. Typically, the added computational complexity, increased memory usage, and added latency are manageable and reasonable in exchange for improved video quality in reconstructed video, compared to use of the core video codec alone. Furthermore, the resource requirements of the ML encoder network and ML decoder network can be much lower than the resource requirements of an approach to compression and decompression that uses only ML networks (with no core encoder and decoder).

In some example implementations, an ML encoder network and ML decoder network are trained for processing of video according to a specific codec standard or format. Moreover, the ML encoder network and ML decoder network are trained for video that has been encoded at a particular target quality or bitrate. The ML encoder network and ML decoder network are trained using representative training data. To the extent the ML encoder network and ML decoder network are used for processing of video that deviates significantly from the training data, that is encoded and decoded according to a different codec standard or format, or that is encoded at a different target quality or bitrate, performance of the ML encoder network and ML decoder network may suffer, even if some improvements in video quality are still achieved.

In some example implementations, processing of video using an ML encoder network and ML decoder network use special-purpose hardware at server and client computer systems to implement the ML encoder network and ML decoder network. For example, the special-purpose hardware can use a GPU or NPU. With the special-purpose hardware, the computer systems can perform processing operations for runtime inference with the ML encoder network and ML decoder network without significant delay, such that significant latency is not introduced and such that the output frame rate is not adversely affected.

A. Example Architectures for Training an ML Encoder Network and ML Decoder Network.

FIG. **5*a* shows an example architecture (501) for a first phase of training an ML encoder network and ML decoder network to use in hybrid compression of video and corresponding decompression. FIG. 5*b* shows an example architecture (802**) for a second phase of training the ML encoder network and ML decoder network to use in hybrid compression of video and corresponding decompression. For the first-phase training, a surrogate video encoder is used, which approximates the behavior of a core video encoder. In the first-phase training, the ML encoder network and ML decoder network are trained for transformation of video and corresponding enhancement of the video. In some implementations, the ML encoder network is also trained for direct compression operations, and the ML decoder network is trained for corresponding decompression operations in the first phase. For the second-phase training, the surrogate video encoder is replaced with the core video encoder. In the second-phase training, the ML decoder network is further trained for enhancement of reconstructed video to mitigate compression artifacts introduced during encoding (by the core video encoder) and otherwise improve video quality.

With regard to FIG. 5*a*, the example architecture (501) for first-phase training includes an ML encoder network (510), surrogate encoder (520), surrogate decoder (530), ML decoder network (540), and reward function evaluation module (550). When the ML encoder network (510) and ML decoder network (540) use temporal feedback with information from decoded video as an optional enhancement, the example architecture (501) can include one or more decoded video buffers (560) and one or more associated warping modules (570). When the ML encoder network (510) and ML decoder network (540) use temporal feedback with information from enhanced video as an optional enhancement, the example architecture (501) can include one or more enhanced video buffers (580) and one or more associated warping modules (590).

The ML encoder network (510) is configured to accept, as input, an input frame n, transform the input frame n, and produce, as output, the transformed frame n. In particular, the ML encoder network (510) is configured to perform transformations on sample values of the input frame n. The transformations react to patterns of features in content according to parameters of the ML encoder network (510), which have initial values but are extensively modified during training. In terms of recognizable outcomes, depending on content of input and training of the ML encoder network (510), the transformations can accomplish effects such as color mapping, sharpening, blurring, or other filtering, without direct compression of the input frame n.

In some example implementations, the ML encoder network (510) can also perform direct compression operations. The direct compression operations can include downsampling to reduce spatial resolution by a factor of x horizontally and/or vertically, where x depends on implementation. For example, x is 2 or 4. Alternatively, the direct compression operations include range reduction to decrease the range of sample values of the input frame n or other operations.

The ML encoder network (510) can be a convolutional neural network having a U-Net architecture, as described with reference to FIGS. 6*a*-6*f*. Alternatively, the ML encoder network (510) can implement another type of ML model, such as a transformer network.

The surrogate encoder (520) is configured to accept, as input, a transformed frame n, process the transformed frame n using a simplified approximation of encoding for a codec standard or format, and produce, as output, encoded data for frame n. The surrogate decoder (530) is configured to accept, as input, the encoded data for frame n, process the encoded data for frame n using a simplified approximation of decoding for the codec standard or format, and produce, as output, a decoded frame n. The codec standard or format that is approximated can be the H.264/AVC standard, H.265/HEVC standard, H.266/VVC standard, AV1 standard, or another codec standard or format.

In general, the surrogate encoder (520) emulates the behavior of a given core video encoder but has lower computational complexity than the core video encoder. Because the surrogate encoder (520) is executed repeatedly and frequently during training, the lower computational complexity of the surrogate encoder (520) can make the training process complete faster. On one hand, closely emulating the behavior of the core video encoder helps train the ML encoder network (510) to perform transformations that will allow the core video encoder to compress video more effectively. On the other hand, the decision space of the core video encoder can be vast, encompassing a huge number of decisions with complicated dependencies, which could hinder convergence of the ML encoder network (510) during training. To address this tension, the surrogate encoder (520) can perform operations of the core video encoder that provide much of the overall benefit of compression in terms of rate-distortion efficiency, without performing operations that make less significant contributions. In general, when evaluating different features and tools to add to the surrogate encoder (520), the value of adding a specific feature or tool can be assessed through quality analysis of ML encoder networks trained using that version of the surrogate encoder (520), and the specific feature or tool can be accepted, rejected, or refined.

For example, the surrogate encoder (520) can perform a simplified form of motion estimation, compared to a more exhaustive search for motion information that is performed by the core video encoder. As another example, the surrogate encoder (520) can perform some evaluation of partitioning strategies (e.g., partitioning down to 16×16 partitions for coding tree units, motion partitions, and/or transform blocks, but not evaluate smaller partitions (e.g., 4×4) or complicated combinations of different sizes of smaller partitions. As another example, the surrogate encoder (520) can use a simplified frequency transform that is simpler than the frequency transform used by the core video encoder but provides similar energy compaction. As another example, the surrogate encoder (520) can use a simplified process to select prediction modes for blocks. As another example, the surrogate encoder (520) can use a simplified process to select values for adaptive quantization spatially, between color spaces, and/or for different frequency coefficients.

The surrogate decoder (530) emulates the behavior of a given core video decoder but has lower computational complexity than the core video decoder. Compared to the core video encoder, however, the decisions evaluated by the core video decoder are significantly simpler and fewer. As such, emulation of the core video decoder by the surrogate decoder (530) does not have as much of an impact on performance.

To facilitate training of the ML encoder network (510), operations of the surrogate encoder (520) and surrogate decoder (530) are differentiable, and the surrogate encoder (520) and surrogate decoder (530) are part of the feedback loop in training. Gradients that provide feedback that can be used to adjust the ML encoder network (510) are conveyed back through the ML decoder network (540), surrogate decoder (530), surrogate encoder (520), and ML encoder network (510), or through handlers that implement back propagation. Based on the gradients, relevant weight values and bias values can be adjusted in layers of the ML decoder network (540) and ML encoder network (510). (The surrogate encoder (520) and surrogate decoder (530) do not have parameters to be adjusted. Even though the surrogate encoder (520) and surrogate decoder (530) are not trained, however, feedback still propagates back through them to the ML encoder network (510).)

The surrogate encoder (520) and surrogate decoder (530) can skip certain operations such as entropy coding operations and entropy decoding operations, which are lossless and hence do not affect video quality. The encoded data output from the surrogate encoder (520) can be formatted in any suitable bitstream format recognized by the surrogate encoder (520) and surrogate decoder (530), including the bitstream format of the codec standard or format or another bitstream format.

The ML decoder network (540) is configured to accept, as input, a decoded frame n, perform enhancement operations on the decoded frame n, and produce, as output, an enhanced frame n. In particular, the ML decoder network (540) is configured to perform enhancement operations on sample values of the decoded frame n. The enhancements react to patterns of features in content according to parameters of the ML decoder network (540), which have initial values but are extensively modified during training. In first-phase training, the enhancements can compensate for transformations applied by the ML encoder network (510). In terms of recognizable outcomes, depending on content of input and training of the ML decoder network (540), the enhancement can accomplish effects such as color mapping, sharpening, blurring, or other filtering.

In some example implementations, the ML decoder network (540) can also perform operations to compensate for direct compression operations. Such operations can include upsampling to increase spatial resolution by a factor of x horizontally and/or vertically, where x depends on implementation. For example, x is 2 or 4. Alternatively, the operations include range expansion to increase the range of sample values of the input frame n or other operations.

The ML decoder network (540) can be a convolutional neural network having a U-Net architecture, as described with reference to FIG. 7. Alternatively, the ML decoder network (540) can implement another type of ML model, such as a transformer network.

The reward function evaluation module (550) is configured to accept, as inputs, the input frame n and enhanced frame n. The input frame n serves as a "ground truth" against which the result from the ML decoder network (540)—that is, the enhanced frame n—is measured. The reward function evaluation module (550) is configured to evaluate differences between the input frame n and enhanced frame n. The differences between the input frame n and enhanced frame n can be quantified according to a reward function (alternatively called a loss function). The reward function evaluation module (550) is configured to produce, as output, feedback to the ML encoder network (510) and ML decoder network (540). Based on the feedback, the ML encoder network (510) is adjusted. The ML decoder network (540) can also be adjusted based on the feedback. Thus, in the first phase, the ML encoder network (510) and ML decoder network (540) are jointly trained. The ML encoder network (510) learns transformations, and the ML decoder network (540) learns corresponding enhancements to compensate for the transformations, so as to improve information transfer through the process of video encoding/decoding. For example, as the ML decoder network (540) improves performance for frame reconstruction, the ML encoder network (510) can learn which samples (or, more generally, content) need not be preserved in the output from the ML encoder network (510) to a video encoder for compression.

Training can repeat in training iterations for different batches (subsets) of input data in a training set, for an epoch. The process of training the ML encoder network (510) and ML decoder network (540) can continue for multiple epochs until the ML encoder network (510) and ML decoder network (540) reach a convergence threshold. For example, the convergence threshold can be used to determine whether parameters of the ML encoder network (510) and ML decoder network (540) have stabilized (e.g., changes in parameters are below a threshold amount, which depends on implementation). Or, as another example, the convergence threshold can be used to determine whether differences between input video and enhanced output from the ML decoder network (540) are negligible (e.g., the value of the reward function has reached a threshold amount, which depends on implementation).

In general, with the feedback from the reward function evaluation module (550), the ML encoder network (510) and ML decoder network (540) are exposed to examples of input video and their enhanced counterparts during the training process. The ML encoder network (510) and ML decoder network (540) can gradually learn to associate features found in the enhanced video with features in the input video as "ground truth" for the video. During subsequent runtime inference, the trained ML encoder network can use the learned patterns to transform video in ways that help a core video encoder compress the video more effectively, and trained ML decoder network can use the learned patterns to compensate for such transformations by the trained ML encoder network.

In some example implementations, the reward function evaluation module (550) provides feedback to the ML encoder network (510) (and ML decoder network (540)) according to a reward function for actor-critic reinforcement learning, which generally operates as described with reference to FIG. 1*a*. The reward function can implement an objective measure of quality degradation between sample values of the input frame n and corresponding sample values of the enhanced frame n, such as mean squared error, peak signal-to-noise ratio, a structural similarity index, a multi-scale structural similarity index, or VMAF. Based on the value of the reward function, the ML encoder network (510) is adjusted (and the ML decoder network (540) can also be adjusted). For example, if one or more weight values or bias values have been adjusted in an iteration of training an ML network, and the resulting value of the reward function increases, the training process keeps the adjusted values or increases the magnitude of the previous adjustments in the next iteration of training. On the other hand, if the resulting value of the reward function decreases, the training process reverses the previous adjustments (to weight value(s) and/or bias value(s)) or decreases the magnitude of the previous adjustments in the next iteration of training. In general, the training process continues until the ML encoder network (510) and ML decoder network (540) reach a convergence threshold.

In the preceding examples, the ML encoder network (510) and ML decoder network (540) are trained using a variation of actor-critic reinforcement learning. Alternatively, the ML encoder network (510) and ML decoder network (540) can be trained using another type of reinforcement learning. Or, as another alternative, the ML encoder network (510) and ML decoder network (540) can be trained using supervised learning, unsupervised learning, or another variation of machine learning.

In some example implementations, the ML encoder network (510) (through spatial downsampling) and surrogate encoder (520) (through lossy compression) force input video into a compressed state with significant information loss. First-phase training teaches the ML encoder network (510) to alter video in such a way as to reduce this information loss. Simultaneously, the ML decoder network (540) learns to recover and reconstruct video (so as to match input video) as much as possible from the limited data the ML decoder network (540) receives. As training progresses, the ML encoder network (510) learns which transformations work to preserve information through spatial downscaling with the ML encoder network (510) and lossy compression with the surrogate encoder (520), and the ML decoder network (540) learns to compensate for such changes to improve video restoration.

As with a core video encoder and core video decoder, given the temporally coherent nature of video, the ML encoder network (510) and ML decoder network (540) can benefit from feedback from previous video.

As a first optional enhancement, the ML encoder network (510) and ML decoder network (540) can use temporal feedback based on information from decoded video. In this case, the ML encoder network (510) and ML decoder network (540), respectively, are configured to accept, as input, decoded previous video from output of the surrogate decoder (530), after spatial alignment to current video through a warping process. In the example architecture (501) of FIG. 5*a*, for example, each of the buffer(s) (560) is configured to store a decoded previous frame from time n−1, n−2, and so on. Each of the warping module(s) (570) is configured to retrieve a decoded previous frame from one of the buffer(s) (560) and to warp the decoded previous frame to spatially align sample values of the decoded previous frame with corresponding sample values of the decoded frame n. The warping can use motion estimation between the decoded previous frame and decoded frame n and/or forward projection of motion information from the decoded previous frame to decoded frame n. For example, the warping can use motion information for frame n, provided by the surrogate encoder (520) or core video encoder, which provides recent correlation history. In general, the warping temporally projects sample values from their locations in the decoded previous frames to expected locations in the decoded frame n.

When the ML encoder network (510) performs spatial downsampling, the warped, decoded previous frame has the same spatial resolution as the decoded frame n, such that the warped, decoded previous frame can be simply concatenated with the decoded frame n as inputs to the ML decoder network (540). On the other hand, compared to the second optional enhancement, effective temporal feedback may use buffering of more previous frames in the first optional enhancement. Also, when the ML encoder network (510) performs spatial downsampling, the warped, decoded previous frame has a different spatial resolution than the input frame n, such that the warped, decoded previous frame cannot be simply concatenated with the input frame n as inputs to the ML encoder network (510). Instead, the warped, decoded previous frame can be upsampled to have the same resolution as the input frame n before the frames are concatenated as inputs.

Alternatively, the ML encoder network (510) does not directly use temporal feedback according to the first optional enhancement. In this case, the ML encoder network (510) can indirectly use temporal feedback. Specifically, the ML encoder network (510) can learn to transform video in ways that preserve information expected to be most useful to the ML decoder network (540), which directly uses temporal feedback.

As a second optional enhancement, both the ML encoder network (510) and ML decoder network (540) can use temporal feedback based on information from enhanced video. The second optional enhancement can be used instead of or in addition to the first optional enhancement. For the second optional enhancement, the ML encoder network (510) and ML decoder network (540), respectively, are configured to accept, as input, enhanced previous video from output of the ML decoder network (540), after spatial alignment to current video through a warping process. In the example architecture (501) of FIG. 5*a*, for example, each of the buffer(s) (580) is configured to store an enhanced frame from time n−1, n−2, and so on. Each of the warping module(s) (590) is configured to retrieve an enhanced previous frame from one of the buffer(s) (580) and to warp the enhanced previous frame to spatially align sample values of the enhanced previous frame with corresponding sample values of the decoded frame n. The warping can use motion estimation between the enhanced previous frame and decoded frame n and/or forward projection of motion information from the enhanced previous frame to decoded frame n. In general, the warping temporally projects sample values from their locations in the enhanced previous frames to expected locations in the decoded frame n.

When the ML encoder network (510) performs spatial downsampling, the warped, enhanced previous frame has a different spatial resolution than the decoded frame n, such that the warped, enhanced previous frame cannot be simply concatenated with the decoded frame n as inputs to the ML decoder network (540). Instead, the decoded frame n can be upsampled to have the same resolution as the warped, enhanced previous frame before the frames are concatenated as inputs. Compared to the first optional enhancement, effective temporal feedback may use buffering of fewer previous frames (e.g., a single previous frame), requiring less memory and fewer resources for motion estimation.

For temporal feedback according to the first optional enhancement, motion estimation can use motion information (such as motion vectors) determined, as part of encoding current video by reference to previously reconstructed video, by a surrogate encoder or core video encoder and provided to the warping module(s) (570). Such motion information may represent motion in the video that has been encoded and decoded. For temporal feedback according to the second optional enhancement, such motion information can be used but may be ineffective. Due to processing by the ML encoder network (510), such motion information may be missing information from input video.

Alternatively, motion estimation can be performed using optical flow analysis of decoded frames or enhanced frames of a video sequence. In this case, independent motion estimation can be performed using decoded previous frames or enhanced previous frames that have been buffered. The buffered previous frames are at least one frame older than the current frame being encoded and decoded. Motion information can be projected forward by one frame, but such forward projection may reduce the accuracy of the motion information.

With regard to FIG. 5*b*, the example architecture (502) for second-phase training includes many of the same modules as the example architecture (501) of FIG. 5*a*. Depending on the type of temporal feedback used in the first-phase training (if any), the example architecture (502) for second-phase training can include temporal feedback using the first optional enhancement and/or second optional enhancement. Differences compared to the example architecture (501) of FIG. 5*a* are as follows.

First, the ML encoder network (510) is replaced with a trained ML encoder network (512). In other words, the ML encoder network (510) has been frozen.

Second, the surrogate encoder (520) and surrogate decoder (530) are replaced with a core video encoder (522) and core video decoder (532), respectively. Even if the ML decoder network (540) is suitably trained for recovery of content processed through the trained ML encoder network (512), surrogate encoder (520), and surrogate decoder (530), the core video encoder (522) may cause information loss in ways the ML decoder network (540) did not encounter during the first-phase training.

The core video encoder (522) is configured to accept, as input, an input frame n, encode the input frame n, and produce, as output, encoded data for the frame n. The encoded data can be formatted according to the H.264/AVC standard, H.265/HEVC standard, H.266/VVC standard, AV1 standard, or another codec standard or format. Compared to the surrogate encoder (520), which approximates the behavior of the core video encoder (522), the core video encoder (522) is more computationally complex (e.g., evaluating more options and combinations of encoder settings, encoder decisions, and encoding tools).

The core video decoder (532) is configured to accept, as input, encoded data for the frame n, decode the encoded data for frame n, and produce, as output, a decoded frame n. The core video decoder (532) can be configured to perform decoding operations according to the H.264/AVC standard, H.265/HEVC standard, H.266/VVC standard, AV1 standard, or another codec standard or format. The surrogate decoder (530) approximates the behavior of the core video decoder (532), which is more computationally complex.

Third, the reward function evaluation module (552) provides feedback to the ML decoder network (540), but not the ML encoder network. Based on feedback in the second-phase training, the ML decoder network (540) is trained to adapt to the behaviors of the core video encoder (522) and core video decoder (532), especially those behaviors that are different than the surrogate encoder (520) and surrogate decoder (530). In particular, the ML decoder network (540) can adapt to mitigate compression artifacts introduced by the core video encoder (522).

The reward function evaluation module (552) is configured to accept, as inputs, the input frame n and enhanced frame n. The reward function evaluation module (552) is further configured to evaluate differences between the input frame n and enhanced frame n. The differences between the input frame n and enhanced frame n can be quantified according to a reward function, as explained with reference to FIG. 5*a*. The reward function evaluation module (552) is configured to produce, as output, feedback to the ML decoder network (540). Based on the feedback, the ML decoder network (540) is adjusted.

As in the first-phase training, the second-phase training can repeat in training iterations for different batches (subsets) of input data in a training set, for an epoch. The process of training the ML decoder network (540) can continue for multiple epochs until the ML decoder network (540) reaches a convergence threshold. For example, the convergence threshold can be used to determine whether parameters of the ML decoder network (540) have stabilized (e.g., changes in parameters are below a threshold amount, which depends on implementation). Or, as another example, the convergence threshold can be used to determine whether differences between input video and enhanced output from the ML decoder network (540) are negligible (e.g., the value of the reward function has reached a threshold amount, which depends on implementation).

In general, with the feedback from the reward function evaluation module (552), the ML decoder network (540) is exposed to examples of input video and their enhanced counterparts during the second-phase training process. The ML decoder network (540) can gradually learn to associate features found in the enhanced video with features in the input video as "ground truth" for the video. During subsequent runtime inference, the trained ML decoder network can use the learned patterns to enhance video in ways that mitigate compression artifacts introduced by the core video encoder (522).

In some example implementations, the reward function evaluation module (552) provides feedback to the ML decoder network (540) according to a reward function for actor-critic reinforcement learning, which generally operates as described with reference to FIG. 5*a*. The reward function can implement an objective measure of quality degradation between sample values of the input frame n and corresponding sample values of the enhanced frame n, such as mean squared error, peak signal-to-noise ratio, a structural similarity index, a multi-scale structural similarity index, or VMAF. Based on the value of the reward function, the ML decoder network (540) is adjusted, as explained with reference to FIG. 5*a*. In general, the training process continues until the ML decoder network (540) reaches a convergence threshold. Alternatively, the ML decoder network (540) can be trained using another type of reinforcement learning. Or, as another alternative, the ML decoder network (540) can be trained using supervised learning, unsupervised learning, or another variation of machine learning.

With reference to FIGS. 5*a* and 5*b*, in some example implementations, the core video encoder (522) and core video decoder (532) (as well as the surrogate encoder (520) and surrogate decoder (530) for first-phase training) use simple forward prediction of motion, as opposed to bidirectional prediction. This can help reduce overall latency by avoiding startup delay that accounts for reordering of pictures from decoding order to output order. Alternatively, bidirectional prediction can also be used.

In some example implementations, the ML encoder network (510) and ML decoder network (540) are adapted for a particular context. For example, video can be compressed and decompressed (with a surrogate or core encoder/decoder) for a specific codec standard or format that is intended to be used for runtime inference. In this case, the ML encoder network (510) and ML decoder network (540) are adapted to perform hybrid compression and corresponding decompression for the specific codec standard or format. Similarly, the surrogate encoder (520) and surrogate decoder (530) are typically adapted for a specific codec standard or format. Different ML encoder networks and ML decoder networks can be used for different codec standards or formats. Alternatively, a single (larger) ML encoder network and single ML decoder network can be used for multiple different codec standards or formats.

As another example, during training of the ML encoder network (510) and ML decoder network (540), encoded data can be compressed at a given target quality or bitrate. In this case, the ML encoder network (510) and ML decoder network (540) are further adapted to perform hybrid compression and corresponding decompression for the given target quality or bitrate. Different ML encoder networks and ML decoder networks can be used for different target qualities or bitrates. Alternatively, a single (larger) ML encoder network and single ML decoder network can be used for different target qualities or bitrates.

As another example, during training of the ML encoder network (510) and ML decoder network (540), the core video encoder (522) (and surrogate encoder (520), to a lesser extent) can make certain decisions and set certain parameters (e.g., source scan type; use of coding tools) in the same way as a core video encoder during runtime inference. In this case, the ML encoder network (510) and ML decoder network (540) are further adapted to hybrid compression and corresponding decompression according to such settings. Different ML encoder networks and ML decoder networks can be used for different combinations of encoder settings and decisions. Alternatively, a single (larger) ML encoder network and single ML decoder network can be used for different combinations of encoder settings and decisions.

As another example, the ML encoder network (510) and ML decoder network (540) can be trained for a specific type of video, such as "talking head" video or screen capture content. In this case, the ML encoder network (510) and ML decoder network (540) are adapted to perform hybrid compression and corresponding decompression for that type of video. Different ML encoder networks and ML decoder networks can be used for different types of video. Alternatively, the ML encoder network (510) and ML decoder network (540) can be trained for various types of video, such that the ML encoder network (510) and ML decoder network (540) are adapted to perform hybrid compression and corresponding decompression for any arbitrary type of video.

Although FIGS. 5*a* and 5*b* show a frame of video as input or output from different modules, the example architectures (501, 502) can be configured to process other units of video, such as slices or tiles. For example, the surrogate encoder (520) or core video encoder (522) can be configured to encode a slice or tile and produce encoded data for the slice or tile, and the surrogate decoder (530) or core video decoder (532) can be configured to decode a slice or tile and produce the decoded slice or tile. Similarly, the ML encoder network (510) and ML decoder network (540) can be configured to perform operations on a slice or tile. Processing of sub-frame units of video can provide more opportunities for parallel processing. Processing of sub-frame units of video can also reduce memory usage because features need not be stored for an entire frame.

Although FIGS. 5*a* and 5*b* depict serial processing of a single video frame, various operations of the pipeline can be performed in parallel for different video frames. Parallel processing can reduce overall latency and also utilize available hardware more completely. For example, while enhancement operations are performed by the ML decoder network (540) for a given frame n, decoding operations can be performed by the surrogate decoder (530) or core video decoder (532) for a subsequent frame n+1, encoding operations can be performed by the surrogate encoder (520) or core video encoder (522) for a subsequent frame n+2, and transformation operations can be performed by the ML encoder network (510) for a subsequent frame n+3.

As another example, parallel processing can be performed for sub-frame units such as slices or tiles. While enhancement operations are performed by the ML decoder network (540) for a given (x) slice or tile, decoding operations can be performed by the surrogate video decoder (530) or core video decoder (532) for a subsequent (x+1) slice or tile, encoding operations can be performed by the surrogate encoder (520) or core video encoder (522) for the next (x+2) slice or tile, and transformation operations can be performed by the ML encoder network (510) for the following (x+3) slice or tile. Performing operations at the granularity of sub-frame units can reduce latency, as explained with reference to FIG. 1*a*.

To the extent the ML encoder network (510), surrogate encoder (520) or core video encoder (522), surrogate decoder (530) or core video decoder (532), and ML decoder network (540) individually support parallel processing of sub-frame units, there are even more opportunities for parallel processing. For example, while enhancement operations are performed by the ML decoder network (540) for multiple slices or tiles of frame n, decoding operations can be performed by the surrogate video decoder (530) or core video decoder (532) for multiple slices or tiles of frame n+1, encoding operations can be performed by the surrogate encoder (520) or core video encoder (522) for multiple slices or tiles of frame n+2, and transformation operations can be performed by the ML encoder network (510) for multiple slices or tiles of frame n+3.

B. Example Architectures for Inference Using an ML Encoder Network and ML Decoder Network.

Once the ML encoder network and ML decoder network have been trained for hybrid compression of video, the trained ML encoder network and trained ML decoder network can be deployed for server-side inference at runtime.

FIG. 5*c* shows an example architecture (503) for server-side inference using an ML encoder network and ML decoder network in hybrid compression of video. The example architecture (503) includes a trained ML encoder network (512) and core video encoder (522). When the trained ML encoder network (512) uses temporal feedback as an optional enhancement, the example architecture (503) also includes a core video decoder (532) and trained ML decoder network (542). For temporal feedback based on information from decoded video, the example architecture (503) includes one or more decoded video buffers (560) and one or more associated warping modules (570). For temporal feedback based on information from enhanced video, the example architecture (503) includes one or more enhanced video buffers (580) and one or more associated warping modules (590).

The trained ML encoder network (512) is configured to accept, as input, an input frame n, transform the input frame n, and produce, as output, the transformed frame n. In particular, the trained ML encoder network (512) performs transformations on sample values of the input frame n. The transformations react to patterns of features in content according to parameters of the trained ML encoder network (512), as explained with reference to FIG. 5*a*. The trained ML encoder network (512) can also perform direct compression operations, as explained with reference to FIG. 5*a*. The trained ML encoder network (512) can be a convolutional neural network having a U-Net architecture, as described with reference to FIGS. 6*a*-6*f*. Alternatively, the trained ML encoder network (512) can implement another type of ML model, such as a transformer network.

The core video encoder (522) is configured to accept, as input, an input frame n, encode the input frame n, and produce, as output, encoded data for the frame n. The encoded data can be formatted according to the H.264/AVC standard, H.265/HEVC standard, H.266/VVC standard, AV1 standard, or another codec standard or format. The core video encoder (522) is configured to provide the encoded data for the frame n to a content delivery network or other network, for delivery to one or more client computer systems.

When the trained ML encoder network (512) uses temporal feedback as an optional enhancement, the core video decoder (532) is configured to accept, as input provided by the core video encoder (522), encoded data for the frame n. The encoded data can be part of a bitstream organized according to the H.264/AVC standard, H.265/HEVC standard, H.266/VVC standard, AV1 standard, or another codec standard or format. The core video decoder (532) is configured to decode the encoded data for frame n and produce, as output, a decoded frame n. Specifically, the core video decoder (532) is configured to perform decoding operations according to the codec standard or format.

The trained ML decoder network (542) is configured to accept, as input, a decoded frame n, perform enhancement operations on the decoded frame n (as described with reference to FIG. 5*a*), and produce, as output, an enhanced frame n. The trained ML decoder network (542) can be a convolutional neural network having a U-Net architecture, as described with reference to FIG. 7. Alternatively, the trained ML decoder network (542) can implement another type of ML model, such as a transformer network.

Optionally, the trained ML encoder network (512) and trained ML decoder network (542) can use temporal feedback. In particular, the trained ML encoder network (512) and trained ML decoder network (542) can use temporal feedback according to a first optional enhancement (with information from decoded previous frames) and/or according to a second optional enhancement (with information from enhanced previous frames).

When the trained ML encoder network (512) and trained ML decoder network (542) use temporal feedback based on information from decoded video, the trained ML encoder network (512) and trained ML decoder network (542), respectively, are also configured to accept, as input, decoded previous video from output of the core video decoder (532), after spatial alignment to current video through a warping process. The decoded previous video is buffered in the decoded video buffer(s) (560) and warped by the associated warping module(s) (570), as described with reference to FIG. 5*a*. For the trained ML encoder network (512), rescaling operations before concatenation can be performed as described with reference to FIG. 5*a*.

When the trained ML encoder network (512) and trained ML decoder network (542) use temporal feedback based on information from enhanced video, the trained ML encoder network (512) and trained ML decoder network (542) are also configured to accept, as input, enhanced previous video from output of the trained ML decoder network (542), after spatial alignment through a warping process. The enhanced previous video is buffered in the enhanced video buffer(s) (580) and warped by the associated warping module(s) (580), as described with reference to FIG. 5*a*. For the trained ML decoder network (542), rescaling operations before concatenation can be performed as described with reference to FIG. 5*a*.

Once the ML encoder network and ML decoder network have been trained for hybrid compression of video, the trained ML decoder network can also be deployed for client-side inference at runtime.

FIG. 5*d* shows an example architecture (504) for client-side inference using an ML decoder network in decompression of video that has been compressed using hybrid compression. The example architecture (504) includes a core video decoder (532) and trained ML decoder network (542). When temporal feedback based on information from decoded video is used as a first optional enhancement, the example architecture (504) can include one or more decoded video buffers (560) and one or more associated warping modules (570). When temporal feedback based on information from enhanced video is used as a second optional enhancement, the example architecture (504) can include one or more enhanced video buffers (580) and one or more associated warping modules (590).

The core video decoder (532) is configured to accept, as input, encoded data for the frame n, which the core video decoder (532) receives from a content delivery network or other source. Otherwise, the core video decoder is configured to operate as described with reference to FIG. 5*c*.

The trained ML decoder network (542) is configured to accept, as input, a decoded frame n, perform enhancement operations on the decoded frame n (as described with reference to FIG. 5*a*), and produce, as output, an enhanced frame n. The trained ML decoder network (542) can be a convolutional neural network having a U-Net architecture, as described with reference to FIG. 7. Alternatively, the trained ML decoder network (542) can implement another type of ML model, such as a transformer network. With regard to temporal feedback, the trained ML decoder network (542) is configured to operate as described with reference to FIG. 5*c*.

The example architecture (504) of FIG. 5*d* can include one or more other modules (not shown) configured to perform post-processing operations for display. For example, the other module(s) can be configured to accept, as input, an enhanced frame n, perform post-processing operations (for color space conversion, color mapping, scaling, sharpening, or other filtering), and produce, as output for display, a post-processed frame n.

With regard to FIGS. 5*c* and 5*d*, in some example implementations, the core video encoder (522) and core video decoder (532) uses simple forward prediction of motion, as opposed to bidirectional prediction. This can help reduce overall latency by avoiding startup delay that accounts for reordering of pictures from decoding order to output order. Alternatively, the core video encoder (522) and core video decoder (532) can also use bidirectional prediction.

In some example implementations, the trained ML encoder network (512) and trained ML decoder network (542) are adapted for a particular context (e.g., a specific codec standard or format; a given target quality or bitrate; a combination of encoder settings and decisions; and/or a specific type of video), as described with reference to FIG. 5*a*. When different ML encoder networks and ML decoder networks are trained for different options (e.g., different target quality levels or bitrates), a given server computer system can have the different ML encoder networks and ML decoder networks installed or otherwise available. An appropriate pair of ML encoder network and ML decoder network can be selected at runtime based on current conditions. If the conditions change, the selected pair can be dynamically switched to a different pair of ML encoder network and ML decoder network during runtime. Similarly, a given client computer system can have the different ML decoder networks installed or otherwise available. An appropriate ML decoder network can be selected at runtime based on current conditions. If the conditions change, the selected ML decoder network can be dynamically switched to a different ML decoder network during runtime.

Although FIGS. 5*c* and 5*d* show a frame of video as input or output from different modules, either of the example architectures (503, 504) can be configured to process other units of video, such as slices or tiles. For example, with regard to the server-side operations of FIG. 5*c*, the core video encoder (522) can be configured to encode a slice or tile and produce encoded data for the slice or tile, and the core video decoder (532) can be configured to decode a slice or tile and produce the decoded slice or tile. The trained ML encoder network (512) and trained ML decoder network (542) can be configured to perform operations on a slice or tile. Similarly, with regard to the client-side operations of FIG. 5*d*, the core video decoder (532) can be configured to decode a slice or tile and produce the decoded slice or tile, and the trained ML decoder network (542) can be configured to perform operations on a slice or tile. Processing of sub-frame units of video can provide more opportunities for parallel processing. Processing of sub-frame units of video can also reduce memory usage because features need not be stored for an entire frame.

Although FIGS. 5*c* and 5*d* depict serial processing of a single video frame, various operations of the respective pipelines can be performed in parallel for different video frames. Parallel processing can reduce overall latency and also utilize available hardware more completely. For example, with regard to the server-side operations of FIG. 5*c*, while enhancement operations are performed by the trained ML decoder network (542) for a given frame n, decoding operations can be performed by the core video decoder (532) for a subsequent frame n+1, encoding operations can be performed by the core video encoder (522) for a subsequent frame n+2, and transformation operations can be performed by the trained ML encoder network (512) for a subsequent frame n+3. Similarly, with regard to the client-side operations of FIG. 5*c*, while enhancement operations are performed by the trained ML decoder network (542) for a given frame n, decoding operations can be performed by the core video decoder (532) for a subsequent frame n+1. Moreover, post-processing operations can be performed for an earlier frame n−1 while enhancement operations are performed in parallel for the given frame n.

As another example, parallel processing can be performed for sub-frame units such as slices or tiles. With regard to the server-side operations of FIG. 5*c*, while enhancement operations are performed by the trained ML decoder network (542) for a given (x) slice or tile, decoding operations can be performed by the core video decoder (532) for a subsequent (x+1) slice or tile, encoding operations can be performed by the core video encoder (522) for the next (x+2) slice or tile, and transformation operations can be performed by the trained ML encoder network (512) for the following (x+3) slice or tile. Similarly, with regard to the client-side operations of FIG. 5*d*, while enhancement operations are performed by the trained ML decoder network (542) for a given slice or tile, decoding operations can be performed by the core video decoder (532) for a subsequent slice or tile. Performing operations at the granularity of sub-frame units can reduce latency, as explained with reference to FIG. 1*a*.

To the extent the trained ML encoder network (512), core video encoder (522), core video decoder (532), and trained ML decoder network (542) individually support parallel processing of sub-frame units, there are even more opportunities for parallel processing. For example, with regard to the server-side operations of FIG. 5*c*, while enhancement operations are performed by the trained ML decoder network (542) for multiple slices or tiles of frame n, decoding operations can be performed by the core video decoder (532) for multiple slices or tiles of frame n+1, encoding operations can be performed by the core video encoder (522) for multiple slices or tiles of frame n+2, and transformation operations can be performed by the trained ML encoder network (512) for multiple slices or tiles of frame n+3. Similarly, with regard to the client-side operations of FIG. 5*d*, while enhancement operations are performed by the trained ML decoder network (542) for multiple slices or tiles of frame n, decoding operations can be performed by the core video decoder (532) for multiple slices or tiles of frame n+1. Moreover, post-processing operations can be performed for an earlier frame n−1 while enhancement operations are performed in parallel for the given frame n.

C. Example ML Encoder Networks.

FIGS. 6*a*-6*f* show an example ML encoder network (601) that can be used in hybrid compression of video. The example ML encoder network (601) can be used to implement the ML encoder network (510) described with reference to FIG. 5*a*, the trained ML encoder network (512) described with reference to FIGS. 5*b* and 5*c*, or another ML encoder network.

Figure 6A:
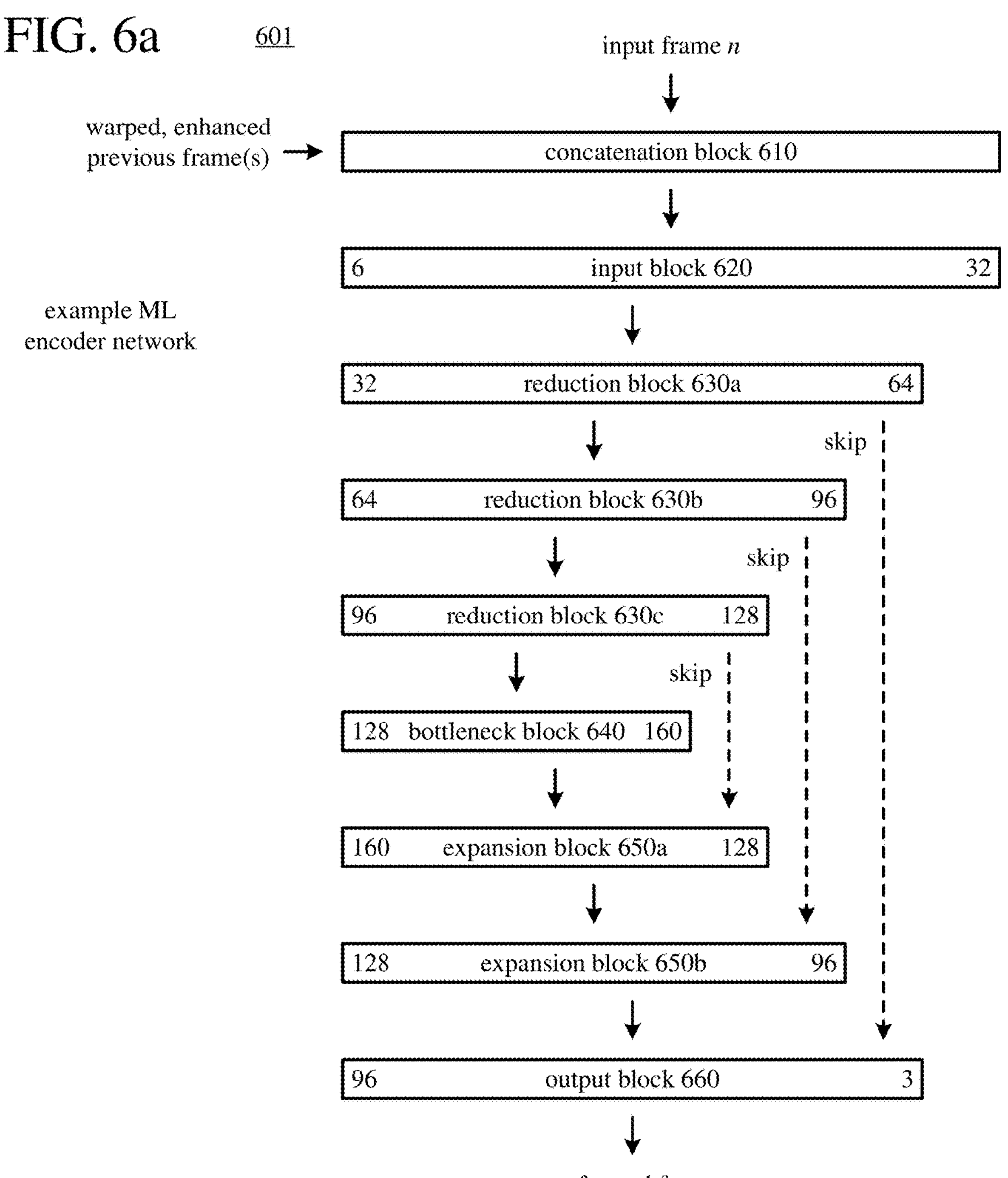

In general, the example ML encoder network (601) is a convolutional neural network having a U-net architecture. As shown in FIG. 6*a*, the example ML encoder network (601) includes a concatenation block (610), an input block (620), reduction blocks (630*a*-630*c*), a bottleneck block (640), expansion blocks (650*a*-650*b*), and an output block (660). In FIG. 6*a*, the number at the left side of a given block shows a count of inputs (or input channels in an input feature map) to the given block, and the number at the right side of a given block shows the number of corresponding output channels in an output feature map from the given block, for an example implementation. In other implementations, the numbers of input channels and output channels can vary. An indication of "skip" denotes features are provided as output from one block directly as input to another block, bypassing intervening blocks of the example encoder network (601) and thereby allowing gradients to flow more freely through the example encoder network (601).

FIGS. 6*b*-6*f* show additional details for some of the blocks of FIG. 6*a*. Such blocks of FIG. 6*a* can be implemented using combinations of convolution blocks, batch normalization blocks, activation blocks, upsampling blocks, and max pooling blocks. Operations of convolution blocks, batch normalization blocks, activation blocks, upsampling blocks, and max pooling blocks are described above with reference to FIG. 2*a*.

With reference to FIG. 6*a*, the concatenation block (610) is configured to accept inputs to the example ML encoder network (601) from an input frame n (or sub-frame unit thereof), accept inputs from one or more warped, enhanced previous frames when temporal feedback (based on information from enhanced previous frames) is used, concatenate the inputs, and produce outputs for the input block (620). For example, the inputs include sample values of the input frame n or sub-frame unit thereof. For a given pixel of the input frame n, the inputs are sample values of three different color components such as R, G, B, or Y, U, V. With regard to configurations that implement temporal feedback based on information from enhanced previous frames, the inputs from the warped, enhanced previous frame(s) are sample values that have been spatially aligned with corresponding sample values in the current input frame n. For a given pixel of a warped, enhanced previous frame, the inputs are sample values of three different color components such as R, G, B, or Y, U, V. When temporal feedback based on information from decoded previous frames is used (not shown), inputs are from one or more warped, decoded previous frames, after appropriate rescaling to the spatial resolution of the current input frame n. When temporal feedback is not used, the concatenation block (610) can be skipped or dummy values can be used in place of sample values from the warped, enhanced previous frame(s).

The input block (620) is configured to accept inputs from the concatenation block (610), perform operations with blocks shown in FIG. 6*b*, and produce outputs for the first reduction block (630*a*). FIG. 6*b* shows an example of the input block (620). The input block (620) includes multiple convolution blocks (621, 624), multiple batch normalization blocks (622, 625), multiple ReLu activation blocks (623, 626), and a MaxPool 2×2 block (627), which are configured to perform operations as described with reference to FIG. 2*a*. The output feature map from the input block (620) includes 32 output channels.

With reference to FIG. 6*a*, each of the reduction blocks (630*a*-630*c*) is configured to accept inputs from an earlier block in FIG. 6*a*, perform operations with blocks shown in FIG. 6*c*, and produce outputs for a following block in FIG. 6*a*. In general, the reduction blocks (630*a*-630*c*) reduce spatial resolution but expand the number of features. FIG. 6*c* shows an example of each of the reduction blocks (630*a*-630*c*). Each of the reduction blocks (630*a*-630*c*) includes multiple convolution blocks (631, 634), multiple batch normalization blocks (632, 635), multiple ReLu activation blocks (633, 636), and a MaxPool 2×2 block (637), which are configured to perform operations as described with reference to FIG. 2*a*. Of note, the output of the ReLu activation block (636) is directly provided as output to a downstream block (shown as "skip" in FIGS. 6*a* and 6*c*) in addition to being provided to the MaxPool 2×2 block (637).

With reference to FIG. 6*a*, the bottleneck block (640) is configured to accept inputs from the final reduction block (630*c*), perform operations with blocks shown in FIG. 6*d*, and produce outputs for the first expansion block (650*a*). In general, the bottleneck block expands the number of features without changing the spatial resolution (or at least without changing the spatial resolution significantly). FIG. 6*d* shows an example of the bottleneck block (640). The bottleneck block (640) includes multiple convolution blocks (641, 644), multiple batch normalization blocks (642, 645), and multiple ReLu activation blocks (643, 646), which are configured to perform operations as described with reference to FIG. 2*a*.

Figures 6E, 6F:
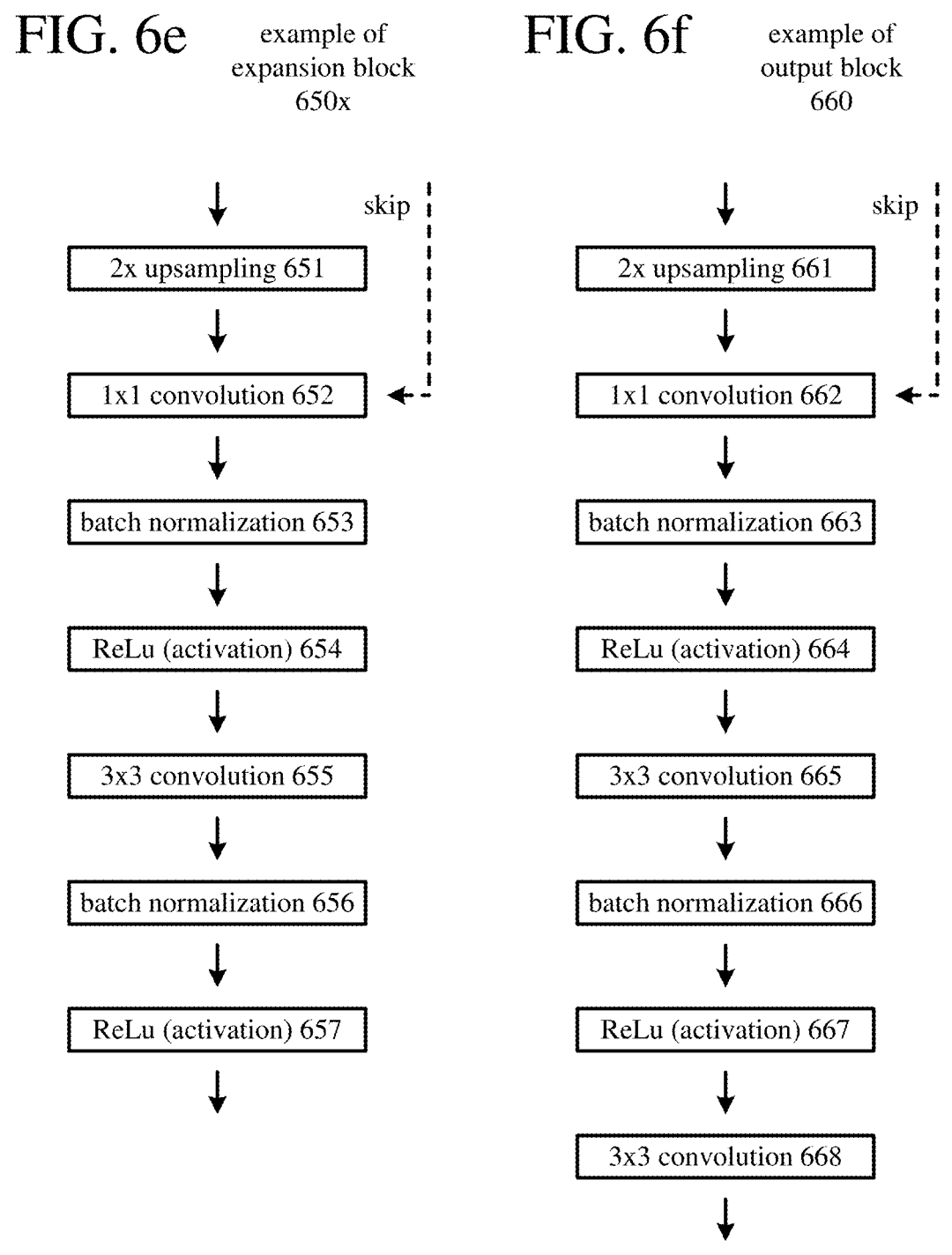

With reference to FIG. 6*a*, each of the expansion blocks (650*a*-650*b*) is configured to accept inputs from an earlier block in FIG. 6*a*, perform operations with blocks shown in FIG. 6*e*, and produce outputs for a following block in FIG. 6*a*. In general, the expansion blocks (650*a*-650*b*) reduce the number of features but increase spatial resolution. FIG. 6*e* shows an example of each of the expansion blocks (650*a*-650*b*). Each of the expansion blocks (650*a*-650*c*) includes a 2× upsampling block (651), multiple convolution blocks (652, 655), multiple batch normalization blocks (653, 656), and multiple ReLu activation blocks (654, 657), which are configured to perform operations as described with reference to FIG. 2*a*. Of note, the 1×1 convolution block (652) directly receives input from an upstream block (shown as "skip" in FIGS. 6*a* and 6*e*) in addition to receiving input from the 2× upsampling block (651).

With reference to FIG. 6*a*, the output block (660) is configured to accept inputs from the final expansion block (650*b*), perform operations with blocks shown in FIG. 6*f*, and produce output sample values. For example, the outputs are sample values of the transformed frame n or sub-frame unit thereof. For a given pixel, the outputs are sample values of three different color components such as R, G, B, or Y, U, V. In general, the output block (660) reduces the number of features but increases spatial resolution. FIG. 6*f* shows an example of the output block (660). The output block (660) includes a 2× upsampling block (661), multiple convolution blocks (662, 665, 668), multiple batch normalization blocks (663, 666), and multiple ReLu activation blocks (664, 667), which are configured to perform operations as described with reference to FIG. 2*a*. Of note, the 1×1 convolution block (662) directly receives inputs from an upstream block (shown as "skip" in FIGS. 6*a* and 6*f*) in addition to receiving inputs from the 2× upsampling block (661).

In the example of FIGS. 6*a*-6*f*, the ML encoder network (601) performs compression operations (spatial downsampling) to decrease spatial resolution. Alternatively, compression operations are not performed by the ML encoder network (601) (and corresponding decompression operations are not performed by an ML decoder network). In this case, the reduction blocks and expansion blocks can be adjusted in the ML encoder network (601) to perform transformation operations without changing overall spatial resolution.

Alternatively, an ML encoder network can be implemented using a different approach, e.g., with residual dense blocks.

D. Example ML Decoder Networks.

Figure 7:
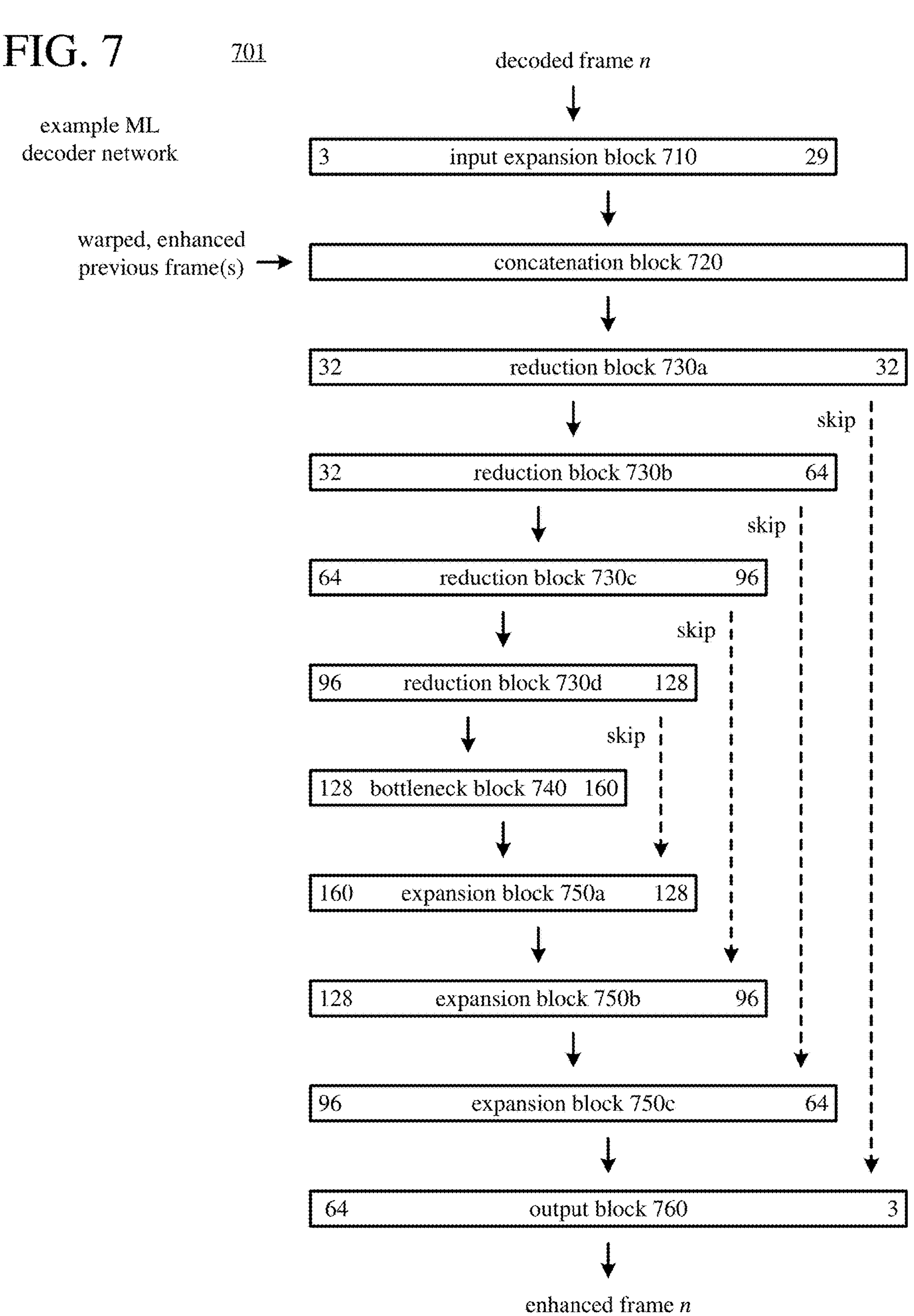
FIG. 7 is a diagram illustrating an example ML decoder network for use in hybrid compression of video and corresponding decompression.

FIG. 7 shows an example ML decoder network (701) that can be used in hybrid compression of video and corresponding decompression. The example ML decoder network (701) can be used to implement the ML decoder network (540) described with reference to FIGS. 5*a* and 5*b*, the trained ML decoder network (542) described with reference to FIGS. 5*c* and 5*d*, or another ML decoder network.

In general, the example ML decoder network (701) is a convolutional neural network having a U-net architecture. As shown in FIG. 7, the example ML decoder network (701) includes an input expansion block (710), a concatenation block (720), reduction blocks (730*a*-730*d*), a bottleneck block (740), expansion blocks (750*a*-750*c*), and an output block (760). In FIG. 7, the number at the left side of a given block shows a count of inputs (or input channels in an input feature map) to the given block, and the number at the right side of a given block shows the number of corresponding output channels in an output feature map from the given block, for an example implementation. In other implementations, the numbers of input channels and output channels can vary. An indication of "skip" denotes features are provided as output from one block directly as input to another block, bypassing intervening blocks of the example ML decoder network (701) and thereby allowing gradients to flow more freely through the example ML decoder network (701).

FIGS. 2*b*-2*f* show additional details for some of the blocks of FIG. 7. Such blocks of FIG. 7 can be implemented using combinations of convolution blocks, batch normalization blocks, activation blocks, upsampling blocks, and max pooling blocks. Operations of convolution blocks, batch normalization blocks, activation blocks, upsampling blocks, and max pooling blocks are described above with reference to FIG. 2*a*.

The input expansion block (710) is configured to accept inputs to the example ML decoder network (701) from a decoded frame n (or sub-frame unit thereof), perform operations with blocks shown in FIG. 2*b*, and produce outputs for the concatenation block (720). For example, the inputs are sample values of the decoded frame n or sub-frame unit thereof. For a given pixel, the inputs are sample values of three different color components such as R, G, B, or Y, U, V. FIG. 2*b* shows an example of the input expansion block (710). The output feature map from the input expansion block (710) includes 29 output channels.

In the example of FIG. 7, the ML decoder network (701) performs decompression operations (spatial upsampling) to increase spatial resolution, to compensate for direct compression (spatial downsampling) by an ML encoder network. Alternatively, compression operations are not performed by the ML encoder network and corresponding decompression operations are not performed by the ML decoder network (701). In this case, the input expansion block (710) can be omitted from the ML decoder network (701), and the reduction blocks and expansion blocks can be adjusted in the ML decoder network (701) so that overall spatial resolution is unchanged.

The concatenation block (720) is configured to accept inputs from the input expansion block (710), accept inputs from one or more warped, enhanced previous frames when temporal feedback (based on information from enhanced previous frames) is used, concatenate the inputs, and produce outputs for the first reduction block (730*a*). For example, the inputs from the warped, enhanced previous frame(s) are sample values that have been spatially aligned with corresponding sample values in the current decoded frame n. For a given pixel, the inputs are sample values of three different color components such as R, G, B, or Y, U, V. When temporal feedback based on information from decoded previous frames is used (not shown), inputs are from one or more warped, decoded previous frames. When temporal feedback is not used, the concatenation block (720) can be skipped or dummy values can be used in place of sample values from the warped, enhanced previous frame(s).

Each of the reduction blocks (730*a*-730*d*) is configured to accept inputs from an earlier block in FIG. 7, perform operations with blocks shown in FIG. 2*c*, and produce outputs for a following block in FIG. 7. In general, the reduction blocks (730*a*-730*d*) reduce spatial resolution but expand the number of features. FIG. 2*c* shows an example of each of the reduction blocks (730*a*-730*d*).

The bottleneck block (740) is configured to accept inputs from the final reduction block (730*d*), perform operations with blocks shown in FIG. 2*d*, and produce outputs for the first expansion block (750*a*). In general, the bottleneck block expands the number of features without changing the spatial resolution (or at least without changing the spatial resolution significantly). FIG. 2*d* shows an example of the bottleneck block (740).

Each of the expansion blocks (750*a*-750*c*) is configured to accept inputs from an earlier block in FIG. 7, perform operations with blocks shown in FIG. 2*e*, and produce outputs for a following block in FIG. 7. In general, the expansion blocks (750*a*-750*c*) reduce the number of features but increase spatial resolution. FIG. 2*e* shows an example of each of the expansion blocks (750*a*-750*c*).

The output block (760) is configured to accept inputs from the final expansion block (750*c*), perform operations with blocks shown in FIG. 2*f*, and produce output sample values. For example, the outputs are sample values of the enhanced frame n or sub-frame unit thereof. For a given pixel, the outputs are sample values of three different color components such as R, G, B, or Y, U, V. In general, the output block (760) reduces the number of features but increases spatial resolution. FIG. 2*f* shows an example of the output block (760).

Alternatively, an ML decoder network can be implemented using a different approach, e.g., with residual dense blocks.

E. Example Techniques for Training an ML Encoder Network and ML Decoder Network.

Figure 8:
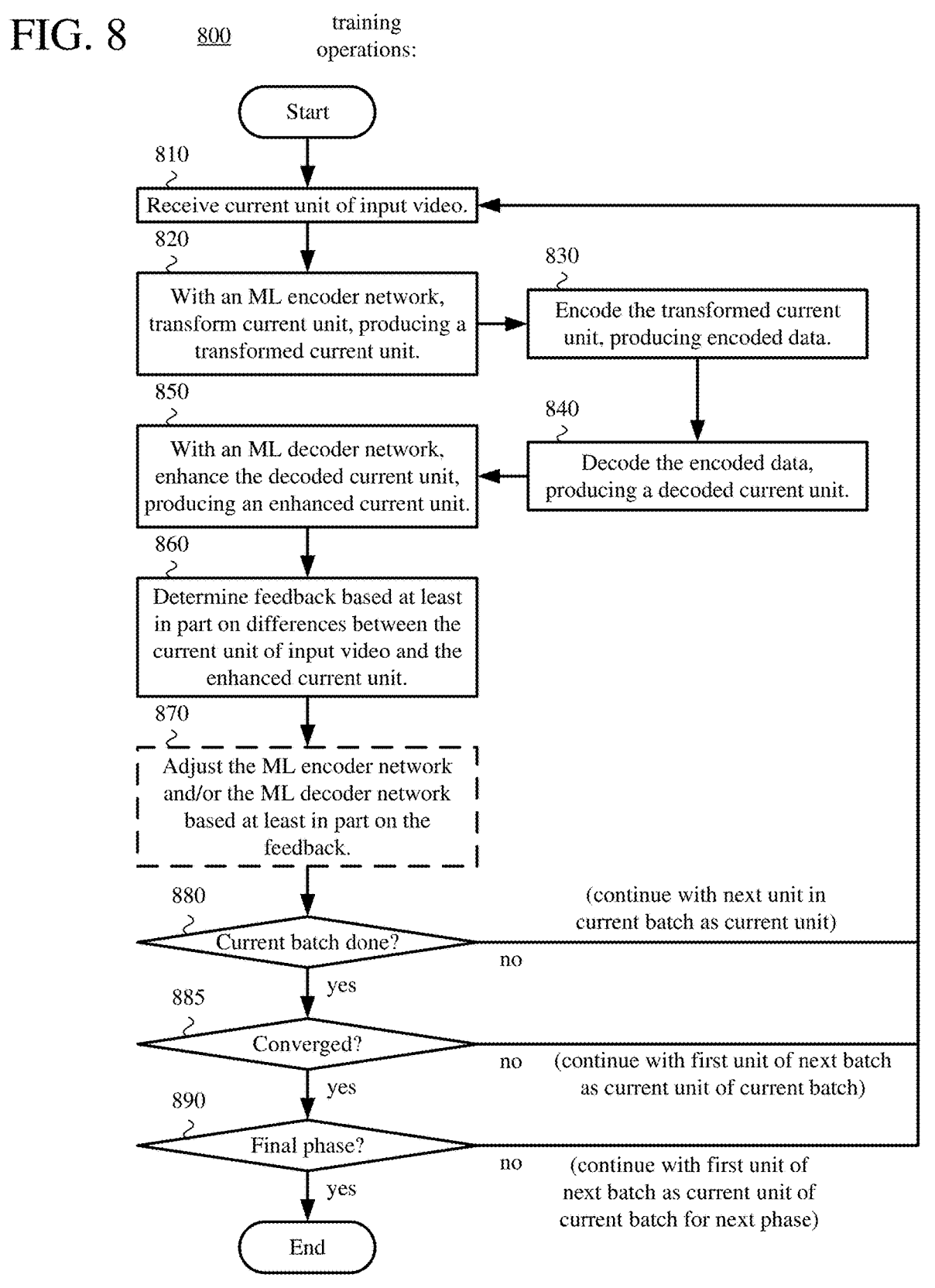

FIG. 8 shows an example technique (800) for training an ML encoder network and ML decoder network for hybrid compression of video and corresponding decompression. A video encoding tool, as described with reference to FIGS. 5*a*-5*b* or otherwise, can perform the technique (800).

To start, the video encoding tool receives (810) a current unit of input video. For example, the current unit of input video is a frame, a slice, or a tile. Alternatively, the current unit of input video is a group of pictures, a sequence, or another unit of video.

With an ML encoder network, the video encoding tool transforms (820) the current unit to facilitate preservation of image quality. This produces a transformed current unit. As part of the transforming (820), the video encoding tool can partially compress the current unit (e.g., by downsampling the current unit to decrease spatial resolution). For example, the ML encoder network is a convolutional neural network having a U-Net architecture, as described with reference to FIGS. 6*a*-6*f*. Alternatively, the ML encoder network implements another type of ML model.

The video encoding tool encodes (830) the transformed current unit. This produces encoded data for the transformed current unit. The video encoding tool decodes (840) the encoded data. This produces a decoded current unit. For the encoding (830) and the decoding (840), the video encoding tool can completely encode and decode the current unit, or the video encoding tool can partially encode and decode the current unit (e.g., skipping some operations such as entropy coding/decoding or other lossless operations). As explained with reference to FIGS. 5*a* and 5*b*, the encoding (830) and decoding (840) can use a surrogate encoder and surrogate decoder, respectively, or a core video encoder and core video decoder, respectively.

With an ML decoder network, the video encoding tool enhances (850) the decoded current unit to compensate for transformations applied by the ML encoder network and mitigate compression artifacts. This produces an enhanced current unit. If, as part of the transforming (820), the video encoding tool has partially compressed the current unit, the video encoding tool partially decompresses the decoded current unit as part of the enhancing (850) (e.g., by upsampling the decoded current unit to increase spatial resolution). For example, the ML decoder network is a convolutional neural network having a U-Net architecture, as described with reference to FIG. 7. Alternatively, the ML decoder network implements another type of ML model.

The video encoding tool determines (860) feedback based at least in part on differences between the current unit of input video and the enhanced current unit. For example, the video encoding tool determines a value of a reward function based on differences in corresponding sample values between the current unit of input video and enhanced current unit. Examples of reward functions are described above.

The video encoding tool adjusts (870) at least one of the ML encoder network and the ML decoder network based at least in part on the feedback. For example, when the ML encoder network or ML decoder network is a convolutional neural network having a U-Net architecture, the video encoding tool can adjust weight values and/or bias values in at least one block of the convolutional neural network. Alternatively, the video encoding tool adjusts the ML encoder network and/or ML decoder network in some other way. The video encoding tool can skip the adjustment (870) of the ML encoder network and/or ML decoder network for some units of video. For example, the video encoding tool aggregates the feedback for the current unit with other feedback (from previous units). In this case, the adjustment (870) of the ML encoder network and/or ML decoder network can use the aggregated feedback for the current unit after skipping the adjustment (870) for the previous units, or the adjustment (870) of the ML encoder network and/or ML decoder network can be skipped for the current unit.

The video encoding tool performs training for a current batch of units of input video. The current batch of units can be for part of a video sequence, for an entire video sequence, or for multiple video sequences. The video encoding tool checks (880) whether the current batch is done. If not, the video encoding tool continues with the next unit in the current batch as the current unit. Thus, for each of one or more subsequent units treated as the current unit, the video encoding tool can repeat operations for the receiving (810), transforming (820), encoding (830), decoding (840), enhancing (850), determining (860), and adjusting (870).

After completing processing for the units in the current batch, the video encoding tool checks (885) whether the ML encoder network and/or ML decoder network (depending on which of the networks is being trained) has reached a convergence threshold. Examples of convergence thresholds are described above. If the ML network(s) being trained have reached the convergence threshold, the training process completes. If the ML network(s) being trained have not yet reached the convergence threshold, the video encoding tool continues with the first unit of a next batch of units as the current unit of the current batch. Thus, in each of multiple training iterations until the ML network(s) being trained satisfy the convergence threshold, for a different unit treated as the current unit, the video encoding tool can repeat operations for the receiving (810), transforming (820), encoding (830), decoding (840), enhancing (850), determining (860), and adjusting (870).

In implementations in which the ML encoder network and ML decoder network are trained in multiple phases (examples below), after the ML network(s) being trained have reached the convergence threshold, the video encoding tool checks (890) whether training has completed for a final phase. If not, for a next phase, the video encoding tool continues with the first unit of a next batch as the current unit of the current batch.

In some example implementations, in a first phase of training, for the encoding (830), the video encoding tool uses a surrogate encoder for a codec standard or format. For the decoding (840), the video encoding tool uses a surrogate decoder for the codec standard or format. In the first phase of training, both the ML encoder network and the ML decoder network are adjusted (870) based at least in part on the feedback. When the first phase of training completes, the ML encoder network has been trained.

In a second phase of training, for the encoding (830), the video encoding tool uses a core video encoder for a codec standard or format. For the decoding (840), the video encoding tool uses a core video decoder for the codec standard or format. In the second phase of training, only the ML decoder network is adjusted (870) based at least in part on the feedback. When the second phase of training completes, the ML decoder network has been trained.

Thus, for example, for a first phase of training, in each of multiple training iterations until the ML encoder network satisfies a first convergence threshold, the video encoding tool repeats the receiving (810), transforming (820), encoding (830), decoding (840), enhancing (850), determining (860), and adjusting (870). In the first phase of training, the encoding (830) is performed using a surrogate encoder for a codec standard or format, and the decoding (840) is performed using a surrogate decoder for the codec standard or format. For the adjusting (870) in the first phase, both the ML encoder network and the ML decoder network are adjusted based at least in part on feedback. For a second phase of training, in each of multiple training iterations until the ML decoder network satisfies a second convergence threshold, the video encoding tool repeats the receiving (810), transforming (820), encoding (830), decoding (840), enhancing (850), determining (860), and adjusting (870). In the second phase of training, the encoding (830) is performed using a core video encoder for the codec standard or format, and the decoding (840) is performed using a core video decoder for the codec standard or format. For the adjusting (870) in the second phase, only the ML decoder network is adjusted based at least in part on feedback.

In example implementations in which units of video are frames, slices, tiles, or other types of units smaller than a frame, the video encoding tool can use temporal feedback during the training process. For temporal feedback, the video encoding tool can implement a feedback loop using information from one or more decoded previous units. Instead of or in addition to such a feedback loop, the video encoding tool can implement a feedback loop using information from one or more enhanced previous units.

For a feedback loop using information from one or more enhanced previous units, the video encoding tool can retrieve, from an enhanced video buffer, a given enhanced previous unit and warp the given enhanced previous unit. The warping produces a given warped, enhanced previous unit. In general, the warping spatially aligns sample values of the given enhanced previous unit with expected locations in the decoded current unit. The warping can use motion estimation and/or forward projection of motion from the given enhanced previous unit. The video encoding tool provides the given warped, enhanced previous unit to the ML encoder network, and the transforming (820) the current unit with the ML encoder network is based at least in part on the given warped, enhanced previous unit. The video encoding tool also provides the given warped, enhanced previous unit to the ML decoder network, and the enhancing (850) the decoded current unit with the ML decoder network is based at least in part on the given warped, enhanced previous unit. In some example implementations, the video encoding tool can use temporal feedback from multiple enhanced previous units that have been stored in enhanced video buffers. Thus, the video encoding tool can, for each of one or more additional enhanced previous units treated as the given enhanced previous unit, repeat operations for the retrieving, warping, providing to the ML encoder network, and providing to the ML decoder network. Conversely, after enhancing the current unit, the video encoding tool can store, in an enhanced video buffer, the enhanced current unit for use in providing temporal feedback to the ML encoder network and ML decoder network for one or more subsequent units.

For a feedback loop using information from one or more decoded previous units, the video encoding tool can retrieve, from a decoded video buffer, a given decoded previous unit and warp the given decoded previous unit. The warping produces a given warped, decoded previous unit. In general, the warping spatially aligns sample values of the given decoded previous unit with locations in the decoded current unit. The warping can use motion estimation and/or forward projection of motion from the given decoded previous unit. The video encoding tool provides the given warped, decoded previous unit to the ML encoder network, and the transforming (820) the current unit with the ML encoder network is based at least in part on the given warped, decoded previous unit. The video encoding tool also provides the given warped, decoded previous unit to the ML decoder network, and the enhancing (850) the decoded current unit with the ML decoder network is based at least in part on the given warped, decoded previous unit. In some example implementations, the video encoding tool can use temporal feedback from multiple decoded previous units that have been stored in decoded video buffers. Thus, the video encoding tool can, for each of one or more additional decoded previous units treated as the given decoded previous unit, repeat operations for the retrieving, warping, providing to the ML encoder network, and providing to the ML decoder network. Conversely, after decoding the current unit, the video encoding tool can store, in a decoded video buffer, the decoded current unit for use in providing temporal feedback to the ML encoder network and ML decoder network for one or more subsequent units.

Although the transforming (820), encoding (830), decoding (840), and enhancing (850) are performed serially for a given unit of video, the video encoding tool can perform certain operations in parallel for different units. For example, at least some operations for the transforming (820), encoding (830), decoding (840), and enhancing (850) can be performed in parallel for different units of video.

Typically, the encoding (830) is performed using a video encoder for a codec standard or format, and the decoding (840) is performed using a video decoder for the codec standard or format. In this case, the ML encoder network and ML decoder network are also trained for the codec standard or format. In some example implementations, the encoding (830) produces the encoded data at a target level of quality and/or bitrate during training. In this case, the ML encoder network and ML decoder network are trained for the target level of quality and/or bitrate.

F. Example Techniques for Using an ML Encoder Network for Hybrid Compression.

Figures 9, 10:
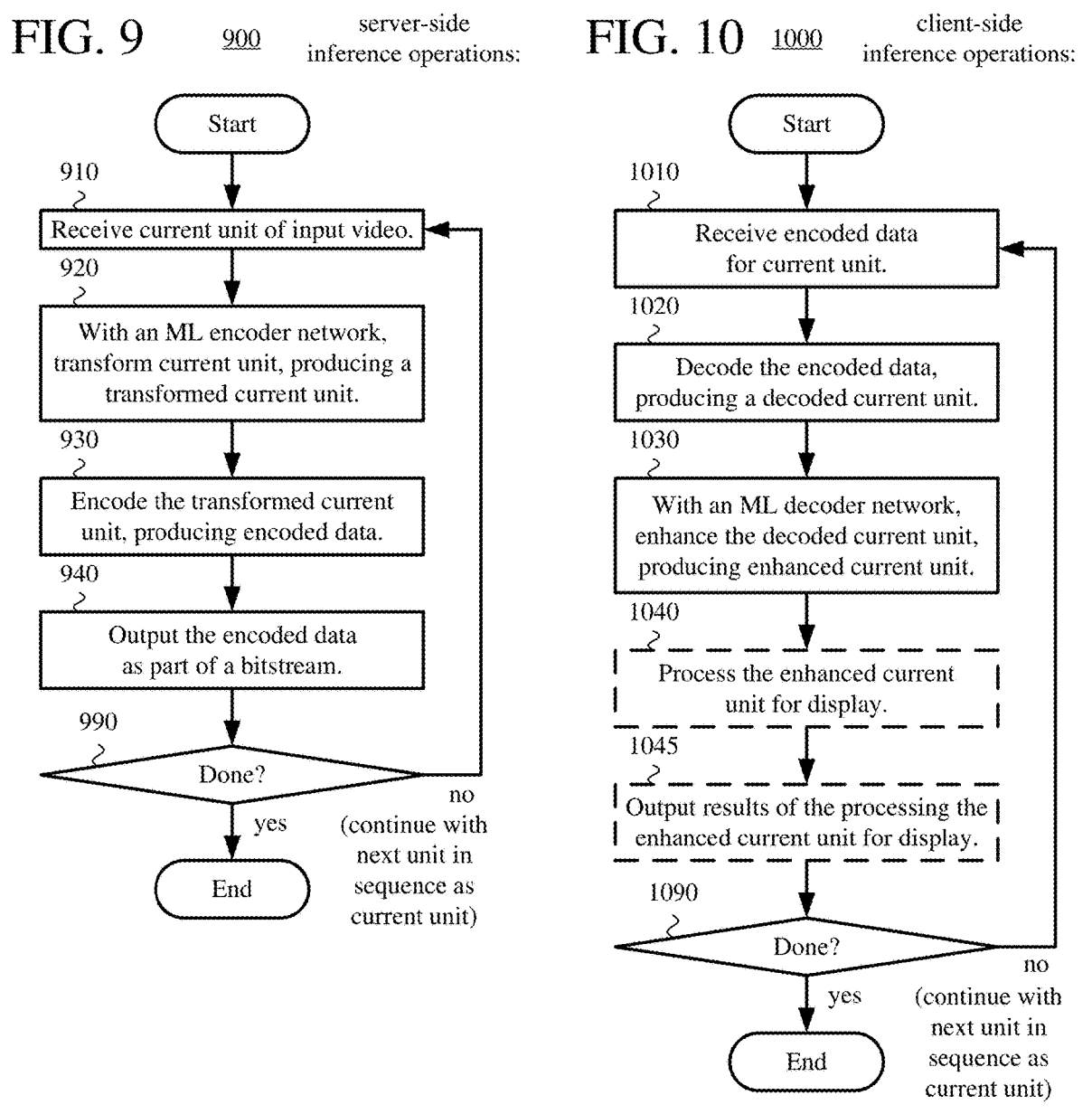

FIG. 9 shows an example technique (900) for using an ML encoder network for hybrid compression of video. When temporal feedback is implemented, an ML decoder network is also used. A video encoding tool, as described with reference to FIG. 5*c* or otherwise, can perform the technique (900).

To start, the video encoding tool receives (910) a current unit of input video. For example, the current unit of input video is a frame, a slice, or a tile. Alternatively, the current unit of input video is a group of pictures, a sequence, or another unit of video.

With an ML encoder network, the video encoding tool transforms (920) the current unit to facilitate preservation of image quality. This produces a transformed current unit. As part of the transforming (920), the video encoding tool can partially compress the current unit (e.g., by downsampling the current unit to decrease spatial resolution). For example, the ML encoder network is a convolutional neural network having a U-Net architecture, as described with reference to FIGS. 6*a*-6*f*. Alternatively, the ML encoder network implements another type of ML model.

The video encoding tool encodes (930) the transformed current unit. This produces encoded data for the transformed current unit. As explained with reference to FIG. 5*c*, the encoding (930) uses a core video encoder. The video encoding tool outputs (940) the encoded data as part of a bitstream.

In example implementations in which units of video are frames, slices, tiles, or other types of units smaller than a frame, the video encoding tool can use temporal feedback during the inference process. For temporal feedback, the video encoding tool can implement a feedback loop using information from one or more decoded previous units. Instead of or in addition to such a feedback loop, the video encoding tool can implement a feedback loop using information from one or more enhanced previous units.

When temporal feedback is used, the video encoding tool decodes the encoded data. This produces a decoded current unit. As explained with reference to FIG. 5*c*, the decoding uses a core video decoder. With an ML decoder network, the video encoding tool enhances the decoded current unit to compensate for transformations applied by the ML encoder network and mitigate compression artifacts that have been introduced during encoding. This produces an enhanced current unit. If, as part of the transforming (920), the video encoding tool has partially compressed the current unit, the video encoding tool partially decompresses the decoded current unit as part of the enhancing (e.g., by upsampling the decoded current unit to increase spatial resolution). For example, the ML decoder network is a convolutional neural network having a U-Net architecture, as described with reference to FIG. 7. Alternatively, the ML decoder network implements another type of ML model.

For a feedback loop using information from one or more enhanced previous units, the video encoding tool can retrieve, from an enhanced video buffer, a given enhanced previous unit and warp the given enhanced previous unit. The warping produces a given warped, enhanced previous unit. In general, the warping spatially aligns sample values of the given enhanced previous unit with expected locations in the decoded current unit. The warping can use motion estimation and/or forward projection of motion from the given enhanced previous unit. The video encoding tool provides the given warped, enhanced previous unit to the ML encoder network, and the transforming (920) the current unit with the ML encoder network is based at least in part on the given warped, enhanced previous unit. The video encoding tool also provides the given warped, enhanced previous unit to the ML decoder network, and the enhancing the decoded current unit with the ML decoder network is based at least in part on the given warped, enhanced previous unit. In some example implementations, the video encoding tool can use temporal feedback from multiple enhanced previous units that have been stored in enhanced video buffers. Thus, the video encoding tool can, for each of one or more additional enhanced previous units treated as the given enhanced previous unit, repeat operations for the retrieving, warping, providing to the ML encoder network, and providing to the ML decoder network. Conversely, after enhancing the current unit, the video encoding tool can store, in an enhanced video buffer, the enhanced current unit for use in providing temporal feedback to the ML encoder network and ML decoder network for one or more subsequent units.

For a feedback loop using information from one or more decoded previous units, the video encoding tool can retrieve, from a decoded video buffer, a given decoded previous unit and warp the given decoded previous unit. The warping produces a given warped, decoded previous unit. In general, the warping spatially aligns sample values of the given decoded previous unit with locations in the decoded current unit. The warping can use motion estimation and/or forward projection of motion from the given decoded previous unit. The video encoding tool provides the given warped, decoded previous unit to the ML encoder network, and the transforming (920) the current unit with the ML encoder network is based at least in part on the given warped, decoded previous unit. The video encoding tool also provides the given warped, decoded previous unit to the ML decoder network, and the enhancing the decoded current unit with the ML decoder network is based at least in part on the given warped, decoded previous unit. In some example implementations, the video encoding tool can use temporal feedback from multiple decoded previous units that have been stored in decoded video buffers. Thus, the video encoding tool can, for each of one or more additional decoded previous units treated as the given decoded previous unit, repeat operations for the retrieving, warping, providing to the ML encoder network, and providing to the ML decoder network. Conversely, after decoding the current unit, the video encoding tool can store, in a decoded video buffer, the decoded current unit for use in providing temporal feedback to the ML encoder network and ML decoder network for one or more subsequent units.

The video encoding tool checks (990) whether to continue for a next unit of a sequence. If so, the video encoding tool continues with the next unit in the sequence as the current unit. Thus, for each of one or more subsequent units treated as the current unit, the video encoding tool can repeat operations for the receiving (910), transforming (920), encoding (930), and outputting (940). If temporal feedback is implemented, the video encoding unit similarly repeats operations for decoding and enhancing.

Although the transforming (920) and encoding (930) are performed serially for a given unit of video, the video encoding tool can perform certain operations in parallel for different units. For example, at least some operations for the transforming (920) and encoding (930) can be performed in parallel for different units of video. When the video encoding tool performs decoding and enhancing as part of a temporal feedback loop, at least some operations for the transforming (920), encoding (930), decoding, and enhancing can be performed in parallel for different units of video.

Typically, the encoding (930) is performed using a video encoder for a codec standard or format, and the decoding (if performed) is performed using a video decoder for the codec standard or format. In this case, the ML encoder network (and ML decoder network, if used) have been trained for the codec standard or format. Also, in some example implementations, the ML encoder network (and ML decoder network, if used) have been trained for a target level of quality and/or bitrate.

G. Example Techniques for Using an ML Decoder Network for Hybrid Decompression.

FIG. 10 shows an example technique (1000) for using an ML decoder network for decompression of video that has been compressed using hybrid compression. A video decoding tool, as described with reference to FIG. 5*d* or otherwise, can perform the technique (1000).

To start, the video decoding tool receives (1010) encoded data for a current unit of video. For example, the current unit of video is a frame, a slice, or a tile. Alternatively, the current unit of video is a group of pictures, a sequence, or another unit of video.

The video decoding tool decodes (1020) the encoded data. This produces a decoded current unit. As explained with reference to FIG. 5*d*, the decoding (1020) uses a core video decoder.

With an ML decoder network, the video decoding tool enhances (1030) the decoded current unit to compensate for transformations applied by the ML encoder network and mitigate compression artifacts that have been introduced during encoding. This produces an enhanced current unit. If the current unit has been partially compressed as part of a transformation stage during encoding, the video decoding tool partially decompresses the decoded current unit as part of the enhancing (e.g., by upsampling the decoded current unit to increase spatial resolution). For example, the ML decoder network is a convolutional neural network having a U-Net architecture, as described with reference to FIG. 7. Alternatively, the ML decoder network implements another type of ML model.

In example implementations in which units of video are frames, slices, tiles, or other types of units smaller than a frame, the video decoding tool can use temporal feedback during the inference process. For temporal feedback, the video decoding tool can implement a feedback loop using information from one or more decoded previous units. Instead of or in addition to such a feedback loop, the video decoding tool can implement a feedback loop using information from one or more enhanced previous units.

For a feedback loop using information from one or more enhanced previous units, the video decoding tool can retrieve, from an enhanced video buffer, a given enhanced previous unit and warp the given enhanced previous unit. The warping produces a given warped, enhanced previous unit. In general, the warping spatially aligns sample values of the given enhanced previous unit with expected locations in the decoded current unit. The warping can use motion estimation and/or forward projection of motion from the given enhanced previous unit. The video decoding tool provides the given warped, enhanced previous unit to the ML decoder network, and the enhancing (1030) the decoded current unit with the ML decoder network is based at least in part on the given warped, enhanced previous unit. In some example implementations, the video decoding tool can use temporal feedback from multiple enhanced previous units that have been stored in enhanced video buffers. Thus, the video decoding tool can, for each of one or more additional enhanced previous units treated as the given enhanced previous unit, repeat operations for the retrieving, warping, and providing to the ML decoder network. Conversely, after enhancing the current unit, the video decoding tool can store, in an enhanced video buffer, the enhanced current unit for use in providing temporal feedback to the ML decoder network for one or more subsequent units.

For a feedback loop using information from one or more decoded previous units, the video decoding tool can retrieve, from a decoded video buffer, a given decoded previous unit and warp the given decoded previous unit. The warping produces a given warped, decoded previous unit. In general, the warping spatially aligns sample values of the given decoded previous unit with locations in the decoded current unit. The warping can use motion estimation and/or forward projection of motion from the given decoded previous unit. The video decoding tool provides the given warped, decoded previous unit to the ML decoder network, and the enhancing (1030) the decoded current unit with the ML decoder network is based at least in part on the given warped, decoded previous unit. In some example implementations, the video decoding tool can use temporal feedback from multiple decoded previous units that have been stored in decoded video buffers. Thus, the video decoding tool can, for each of one or more additional decoded previous units treated as the given decoded previous unit, repeat operations for the retrieving, warping, and providing. Conversely, after decoding the current unit, the video decoding tool can store, in a decoded video buffer, the decoded current unit for use in providing temporal feedback to the ML decoder network for one or more subsequent units.

When a frame has completed, the video decoding tool processes (1040) the enhanced current unit for display and outputs (1045) results of the processing the enhanced current unit for display. For example, the processing (1040) includes color mapping operations, color space conversion operations, scaling operations, sharpening operations, and/or other filtering operations. If the current unit is a sub-frame unit, the enhanced current unit may be stored until a frame is complete, at which point the processing (1040) and outputting (1045) may be performed for the frame. Also, depending on differences between decoding order of frames and display order of frames, the processing (1040) and outputting (1045) may be performed after storing the enhanced current unit for a period of time in a decoded picture buffer.

The video decoding tool checks (1090) whether to continue with a next unit of video. If so, the video decoding tool continues with the next unit in a sequence as the current unit. Thus, for each of one or more subsequent units treated as the current unit, the video decoding tool can repeat operations for the receiving (1010), decoding (1020), and enhancing (1030). As frames are completed, the video decoding tool can also repeat operations for the processing (1040) and the outputting (1045).

Although the decoding (1020) and enhancing (1030) are performed serially for a given unit of video, the video decoding tool can perform certain operations in parallel for different units. For example, at least some operations for the decoding (1020) and enhancing (1030) can be performed in parallel for different units of video.

Typically, the decoding (1020) is performed using a video decoder for a codec standard or format. In this case, the ML decoder network has been trained for the codec standard or format. Also, in some example implementations, the ML decoder network has been trained for a target level of quality and/or bitrate.

H. Innovative Features.

The following table shows some of the innovative features described herein for use of an ML encoder network and ML decoder network in hybrid compression and corresponding decompression.

| | Feature |
|---|---|
| C1 | In a computer system, a method of training a machine learning ("ML") encoder network and an ML decoder network for hybrid compression of video and corresponding decompression, the method comprising:<br>receiving a current unit of input video;<br>with an ML encoder network, transforming the current unit to facilitate preservation of image quality, thereby producing a transformed current unit;<br>encoding the transformed current unit, thereby producing encoded data for the transformed current unit;<br>decoding the encoded data, thereby producing a decoded current unit;<br>with an ML decoder network, enhancing the decoded current unit to compensate for transformations applied by the ML encoder network and mitigate compression artifacts, thereby producing an enhanced current unit;<br>determining feedback based at least in part on differences between the current unit of input video and the enhanced current unit; and<br>adjusting at least one of the ML encoder network and the ML decoder network based at least in part on the feedback. |
| C2 | The method of C1, wherein the transforming the current unit also partially compresses the current unit, and wherein the enhancing the decoded current unit also partially decompresses the decoded current unit. |
| C3 | The method of C2, wherein the transforming the current unit partially compresses the current unit by downsampling the current unit, and wherein the enhancing the decoded current unit partially decompresses the decoded current unit by upsampling the decoded current unit. |
| C4 | The method of any one of C1 to C3, wherein the ML encoder network is a convolutional neural network having a U-Net architecture. |
| C5 | The method of C4, wherein the adjusting includes adjusting weight values and/or bias values in at least one block of the convolutional neural network having the U-Net architecture. |
| C6 | The method of any one of C1 to C3, wherein the ML decoder network is a convolutional neural network having a U-Net architecture. |
| C7 | The method of C6, wherein the adjusting includes adjusting weight values and/or bias values in at least one block of the convolutional neural network having the U-Net architecture. |
| C8 | The method of any one of C1 to C7, wherein the encoding is performed using a surrogate encoder for a codec standard or format, wherein the decoding is performed using a surrogate decoder for the codec standard or format, and wherein, for the adjusting, both the ML encoder network and the ML decoder network are adjusted based at least in part on the feedback. |
| C9 | The method of any one of C1 to C7, wherein the encoding is performed using a core video encoder for a codec standard or format, wherein the decoding is performed using a core video decoder for the codec standard or format, and wherein, for the adjusting, only the ML decoder network is adjusted based at least in part on the feedback. |
| C10 | The method of any one of C1 to C7, further comprising:<br>for a first phase of training, in each of multiple training iterations until the ML encoder network satisfies a first convergence threshold, repeating the receiving, the transforming, the encoding, the decoding, the enhancing, the determining, and the adjusting, wherein, in the first phase of training, the encoding is performed using a surrogate encoder for a codec standard or format, the decoding is performed using a surrogate decoder for the codec standard or format, and, for the adjusting, |

-continued

| | Feature |
|---|---|
| | both the ML encoder network and the ML decoder network are adjusted based at least in part on the feedback; and for a second phase of training, in each of multiple training iterations until the ML decoder network satisfies a second convergence threshold, repeating the receiving, the transforming, the encoding, the decoding, the enhancing, the determining, and the adjusting, wherein, in the second phase of training, the encoding is performed using a core video encoder for the codec standard or format, the decoding is performed using a core video decoder for the codec standard or format, and, for the adjusting, only the ML decoder network is adjusted based at least in part on the feedback. |
| C11 | The method of any one of C1 to C7, further comprising, in each of multiple training iterations until the ML encoder network or the ML decoder network satisfies a convergence threshold: repeating the receiving, the transforming, the encoding, the decoding, the enhancing, the determining, and the adjusting. |
| C12 | The method of any one of C1 to C11, wherein the current unit of input video is a frame, a slice, or a tile. |
| C13 | The method of any one of C1 to C12, further comprising: storing, in a decoded video buffer, the decoded current unit for use in providing temporal feedback to the ML decoder network. |
| C14 | The method of any one of C1 to C12, further comprising: retrieving, from a decoded video buffer, a given decoded previous unit; warping the given decoded previous unit to spatially align sample values of the given decoded previous unit with locations in the decoded current unit, thereby producing a given warped, decoded previous unit; providing the given warped, decoded previous unit to the ML encoder network, wherein the transforming the current unit is based at least in part on the given warped, decoded previous unit; and providing the given warped, decoded previous unit to the ML decoder network, wherein the enhancing the decoded current unit is based at least in part on the given warped, decoded previous unit. |
| C15 | The method of C14, wherein the warping uses motion estimation and/or forward projection of motion from the given decoded previous unit. |
| C16 | The method of C14, further comprising, for each of one or more additional decoded previous units as the given decoded previous unit, repeating the retrieving, the warping, the providing to the ML encoder network, and the providing to the ML decoder network. |
| C17 | The method of any one of C1 to C16, further comprising: storing, in an enhanced video buffer, the enhanced current unit for use in providing temporal feedback to the ML encoder network and the ML decoder network. |
| C18 | The method of any one of C1 to C16, further comprising: retrieving, from an enhanced video buffer, a given enhanced previous unit; warping the given enhanced previous unit to spatially align sample values of the given enhanced previous unit with expected locations in the decoded current unit, thereby producing a given warped, enhanced previous unit; providing the given warped, enhanced previous unit to the ML encoder network, wherein the transforming the current unit is based at least in part on the given warped, enhanced previous unit; and providing the given warped, enhanced previous unit to the ML decoder network, wherein the enhancing the decoded current unit is based at least in part on the given warped, enhanced previous unit. |
| C19 | The method of C18, wherein the warping uses motion estimation and/or forward projection of motion from the given enhanced previous unit. |
| C20 | The method of C18, further comprising, for each of one or more additional enhanced previous units as the given enhanced previous unit, repeating the retrieving, the warping, the providing to the ML encoder network, and the providing to the ML decoder network. |
| C21 | The method of any one of C1 to C20, further comprising, for each of one or more subsequent units as the current unit, repeating the receiving, the transforming, the encoding, the decoding, the enhancing, the determining, and the adjusting. |
| C22 | The method of C21, wherein at least some operations for the transforming, the encoding, the decoding, and the enhancing are performed in parallel for different units. |
| C23 | The method of any one of C1 to C11, wherein the current unit of input video is a group of pictures or a sequence. |
| C24 | The method of any one of C1 to C23, wherein the ML encoder network and ML decoder network are trained for a codec standard or format. |
| C25 | The method of any one of C1 to C23, wherein the ML encoder network and ML decoder network are trained for a target level of quality and/or bitrate. |
| C26 | The method of any one of C1 to C25, further comprising: aggregating the feedback with other feedback, wherein the adjusting the at least one of the ML encoder network and the ML decoder network uses the aggregated feedback. |
| C27 | One or more computer-readable media having stored thereon computer-executable instructions for causing a processor system, when programmed thereby, to perform operations of the method of any one of C1 to C26. |

-continued

| | Feature |
|---|---|
| C28 | A computer system comprising a processor system and memory, wherein the computer system is configured to perform operations of the method of any one of C1 to C26. |
| D1 | In a server computer system, a method of using a machine learning ("ML") encoder network in hybrid compression of video, the method comprising: receiving a current unit of input video; with an ML encoder network, transforming the current unit to facilitate preservation of image quality, thereby producing a transformed current unit; encoding the transformed current unit, thereby producing encoded data for the transformed current unit; and outputting the encoded data as part of a bitstream. |
| D2 | The method of D1, wherein the transforming the current unit also partially compresses the current unit. |
| D3 | The method of D2, wherein the transforming the current unit partially compresses the current unit by downsampling the current unit. |
| D4 | The method of any one of D1 to D3, wherein the ML encoder network is a convolutional neural network having a U-Net architecture. |
| D5 | The method of any one of D1 to D4, wherein the encoding is performed using a video encoder for a codec standard or format, and wherein the ML encoder network is trained for the codec standard or format. |
| D6 | The method of any one of D1 to D5, wherein the ML encoder network is trained for a target level of quality and/or bitrate. |
| D7 | The method of any one of D1 to D6, further comprising: decoding the encoded data, thereby producing a decoded current unit; with an ML decoder network, enhancing the decoded current unit to compensate for transformations applied by the ML encoder network and mitigate compression artifacts, thereby producing an enhanced current unit. |
| D8 | The method of D7, wherein the enhancing the decoded current unit also partially decompresses the decoded current unit. |
| D9 | The method of D8, wherein the enhancing the decoded current unit partially decompresses the decoded current unit by upsampling the decoded current unit. |
| D10 | The method of any one of D7 to D9, wherein the ML decoder network is a convolutional neural network having a U-Net architecture. |
| D11 | The method of any one of D7 to D10, wherein the decoding is performed using a video decoder for a codec standard or format, and wherein the ML decoder network has been trained for the codec standard or format. |
| D12 | The method of any one of D7 to D10, wherein the ML decoder network is trained for a target level of quality and/or bitrate. |
| D13 | The method of any one of D7 to D12, wherein the current unit of input video is a frame, a slice, or a tile. |
| D14 | The method of any one of D7 to D13, further comprising: storing, in a decoded video buffer, the decoded current unit for use in providing temporal feedback to the ML decoder network. |
| D15 | The method of any one of D7 to D13, further comprising: retrieving, from a decoded video buffer, a given decoded previous unit; warping the given decoded previous unit to spatially align sample values of the given decoded previous unit with locations in the decoded current unit, thereby producing a given warped, decoded previous unit; providing the given warped, decoded previous unit to the ML encoder network, wherein the transforming the current unit is based at least in part on the given warped, decoded previous unit; and providing the given warped, decoded previous unit to the ML decoder network, wherein the enhancing the decoded current unit is based at least in part on the given warped, decoded previous unit. |
| D16 | The method of D15, wherein the warping uses motion estimation and/or forward projection of motion from the given decoded previous unit. |
| D17 | The method of D15, further comprising, for each of one or more additional decoded previous units as the given decoded previous unit, repeating the retrieving, the warping, the providing to the ML encoder network, and the providing to the ML decoder network. |
| D18 | The method of any one of D7 to D17, further comprising: storing, in an enhanced video buffer, the enhanced current unit for use in providing temporal feedback to the ML encoder network and the ML decoder network. |
| D19 | The method of any one of D7 to D17, further comprising: retrieving, from an enhanced video buffer, a given enhanced previous unit; warping the given enhanced previous unit to spatially align sample values of the given enhanced previous unit with expected locations in the decoded current unit, thereby producing a given warped, enhanced previous unit; providing the given warped, enhanced previous unit to the ML encoder network, wherein the transforming the current unit is based at least in part on the given warped, enhanced previous unit; and providing the given warped, enhanced previous unit to the ML decoder network, wherein the enhancing the decoded current unit is based at least in part on the given warped, enhanced previous unit. |
| D20 | The method of D19, wherein the warping uses motion estimation and/or forward projection of motion from the given enhanced previous unit. |

-continued

| | Feature |
|---|---|
| D21 | The method of D19, further comprising, for each of one or more additional enhanced previous units as the given enhanced previous unit, repeating the retrieving, the warping, the providing to the ML encoder network, and the providing to the ML decoder network. |
| D22 | The method of any one of D1 to D6, further comprising, for each of one or more subsequent units as the current unit, repeating the receiving, the transforming, and the encoding. |
| D23 | The method of D22, wherein at least some operations for the transforming and the encoding are performed in parallel for different units. |
| D24 | The method of any one of D7 to D21, further comprising, for each of one or more subsequent units as the current unit, repeating the receiving, the transforming, the encoding, the decoding, and the enhancing. |
| D25 | The method of D24, wherein at least some operations for the transforming, the encoding, the decoding, and the enhancing are performed in parallel for different units. |
| D26 | The method of any one of D1 to D12, wherein the current unit of input video is a group of pictures or a sequence. |
| D27 | One or more computer-readable media having stored thereon computer-executable instructions for causing a processor system, when programmed thereby, to perform operations of the method of any one of D1 to D26. |
| D28 | A server computer system comprising a processor system and memory, wherein the server computer system is configured to perform operations of the method of any one of D1 to D26. |
| E1 | In a client computer system, a method of using a machine learning ("ML") decoder network in hybrid decompression of video, the method comprising:<br>receiving encoded data for a current unit;<br>decoding the encoded data, thereby producing a decoded current unit; and<br>with an ML decoder network, enhancing the decoded current unit to compensate for transformations applied by an ML encoder network and mitigate compression artifacts, thereby producing an enhanced current unit. |
| E2 | The method of E1, wherein the enhancing the decoded current unit also partially decompresses the decoded current unit. |
| E3 | The method of E2, wherein the enhancing the decoded current unit partially decompresses the decoded current unit by upsampling the decoded current unit. |
| E4 | The method of any one of E1 to E3, wherein the ML decoder network is a convolutional neural network having a U-Net architecture. |
| E5 | The method of any one of E1 to E4, wherein the decoding is performed using a video decoder for a codec standard or format, and wherein the ML decoder network has been trained for the codec standard or format. |
| E6 | The method of any one of E1 to E4, wherein the ML decoder network is trained for a target level of quality and/or bitrate. |
| E7 | The method of any one of E1 to E6, wherein the current unit of input video is a frame, a slice, or a tile. |
| E8 | The method of any one of E1 to E7, further comprising:<br>storing, in a decoded video buffer, the decoded current unit for use in providing temporal feedback to the ML decoder network. |
| E9 | The method of any one of E1 to E7, further comprising:<br>retrieving, from a decoded video buffer, a given decoded previous unit;<br>warping the given decoded previous unit to spatially align sample values of the given decoded previous unit with locations in the decoded current unit, thereby producing a given warped, decoded previous unit; and<br>providing the given warped, decoded previous unit to the ML decoder network, wherein the enhancing the decoded current unit is based at least in part on the given warped, decoded previous unit. |
| E10 | The method of E9, wherein the warping uses motion estimation and/or forward projection of motion from the given decoded previous unit. |
| E11 | The method of E9, further comprising, for each of one or more additional decoded previous units as the given decoded previous unit, repeating the retrieving, the warping, and the providing. |
| E12 | The method of any one of E1 to E11, further comprising:<br>storing, in an enhanced video buffer, the enhanced current unit for use in providing temporal feedback to the ML decoder network. |
| E13 | The method of any one of E1 to E11, further comprising:<br>retrieving, from an enhanced video buffer, a given enhanced previous unit;<br>warping the given enhanced previous unit to spatially align sample values of the given enhanced previous unit with expected locations in the decoded current unit, thereby producing a given warped, enhanced previous unit; and<br>providing the given warped, enhanced previous unit to the ML decoder network, wherein the enhancing the decoded current unit is based at least in part on the given warped, enhanced previous unit. |
| E14 | The method of E13, wherein the warping uses motion estimation and/or forward projection of motion from the given enhanced previous unit. |
| E15 | The method of E13, further comprising, for each of one or more additional enhanced previous units as the given enhanced previous unit, repeating the retrieving, the warping, and the providing to the ML decoder network. |

-continued

| | Feature |
|---|---|
| E16 | The method of any one of E1 to E15, further comprising, for each of one or more subsequent units as the current unit, repeating the receiving, the decoding, and the enhancing. |
| E17 | The method of E16, wherein at least some operations for the decoding and the enhancing are performed in parallel for different units. |
| E18 | The method of any one of E1 to E6, wherein the current unit of input video is a group of pictures or a sequence. |
| E19 | The method of any one of E1 to E18, further comprising: processing the enhanced current unit for display; and outputting results of the processing the enhanced current unit for display. |
| E20 | One or more computer-readable media having stored thereon computer-executable instructions for causing a processor system, when programmed thereby, to perform operations of the method of any one of E1 to E19. |
| E21 | A computer system comprising a processor system and memory, wherein the computer system is configured to perform operations of the method of any one of E1 to E19. |

III. Example Computer Systems.

Figure 11:
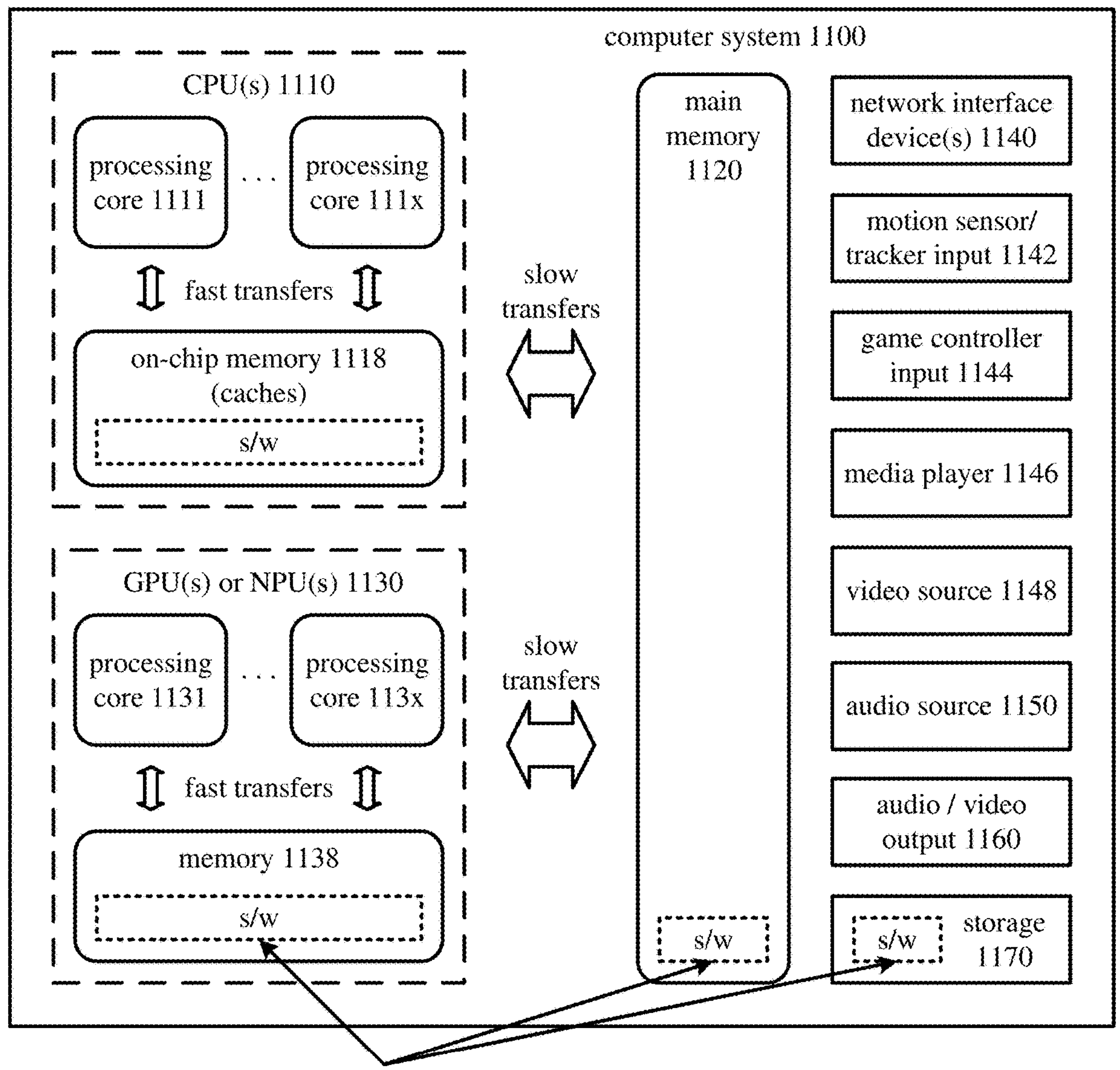
FIG. 11 is a diagram illustrating an example computer system in which some described embodiments can be implemented.

FIG. 11 illustrates a generalized example of a suitable computer system (1100) in which several of the described innovations may be implemented. The innovations described herein relate to use of ML networks in video processing scenarios. The computer system (1100) is not intended to suggest any limitation as to scope of use or functionality, as the innovations may be implemented in diverse computer systems, including special-purpose computer systems.

With reference to FIG. 11, the computer system (1100) includes one or more processing cores (1111 . . . 111*x*) and local memory (1118) of a central processing unit ("CPU") (1110) or multiple CPUs. The processing core(s) (1111 . . . 111*x*) are, for example, processing cores on a single chip, and execute computer-executable instructions. The number of processing core(s) (1111 . . . 111*x*) depends on implementation and can be, for example, 4 or 8. The local memory (1118) may be volatile memory (e.g., registers, cache, random access memory ("RAM")), non-volatile memory (e.g., read-only memory ("ROM"), electrically erasable programmable ROM ("EEPROM"), flash memory), or some combination of the two, accessible by the respective processing core(s) (1111 . . . 111*x*). Alternatively, the processing cores (1111 . . . 111*x*) can be part of a system-on-a-chip ("SoC"), application-specific integrated circuit ("ASIC"), or other integrated circuit.

The local memory (1118) can store software (1180) implementing aspects of the innovations for use of ML networks in video processing scenarios, for operations performed by the respective processing core(s) (1111 . . . 111*x*), in the form of computer-executable instructions. In FIG. 11, the local memory (1118) is on-chip memory such as one or more caches, for which access operations, transfer operations, etc. with the processing core(s) (1111 . . . 111*x*) are fast.

The computer system (1100) also includes processing cores (1131 . . . 113*x*) and local memory (1138) of a graphics processing unit ("GPU") or neural processing unit ("NPU") (1130), or multiple GPUs or NPUs. The number of processing cores (1131 . . . 113*x*) of the GPU or NPU depends on implementation. For a GPU, the processing cores (1131 . . . 113*x*) are, for example, part of single-instruction, multiple data ("SIMD") units of the GPU. The SIMD width n, which depends on implementation, indicates the number of elements (sometimes called lanes) of a SIMD unit. For an NPU, the processing cores (1131 . . . 113*x*) include, for example, specialized ML hardware blocks for operations such as matrix multiplication and convolution. The memory (1138) may be volatile memory (e.g., registers, cache, RAM), non-volatile memory (e.g., ROM, EEPROM, flash memory), or some combination of the two, accessible by the respective processing cores (1131 . . . 113*x*). The memory (1138) can store software (1180) implementing aspects of the innovations for use of ML networks in video processing scenarios, for operations performed by the respective processing cores (1131 . . . 113*x*), in the form of computer-executable instructions such as shader code (for a GPU) or specialized code for ML hardware blocks (for an NPU).

The computer system (1100) includes main memory (1120), which may be volatile memory (e.g., RAM), non-volatile memory (e.g., ROM, EEPROM, flash memory), or some combination of the two, accessible by the processing core(s) (1111 . . . 111*x*, 1131 . . . 113*x*). The main memory (1120) stores software (1180) implementing aspects of the innovations for use of ML networks in video processing scenarios, in the form of computer-executable instructions. In FIG. 11, the main memory (1120) is off-chip memory, for which access operations, transfer operations, etc. with the processing cores (1111 . . . 111*x*, 1131 . . . 113*x*) are slower.

More generally, the term "processor" refers generically to any device that can process computer-executable instructions and may include a microprocessor, microcontroller, programmable logic device, digital signal processor, and/or other computational device. A processor may be a processing core of a CPU, other general-purpose unit, GPU, or NPU. A processor may also be a specific-purpose processor implemented using, for example, an ASIC or a field-programmable gate array ("FPGA"). A "processor system" is a set of one or more processors, which can be located together or distributed across a network.

The term "control logic" refers to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU, other graphics hardware, or an NPU), or by special-purpose hardware (e.g., in an ASIC).

The computer system (1100) includes one or more network interface devices (1140). The network interface device(s) (1140) enable communication over a network to another computing entity (e.g., server, other computer system). The network interface device(s) (1140) can support wired connections and/or wireless connections, for a wide-area network, local-area network, personal-area network, or other network. For example, the network interface device(s)

can include one or more Wi-Fi® transceivers, an Ethernet® port, a cellular transceiver and/or another type of network interface device, along with associated drivers, software, etc. The network interface device(s) (1140) convey information such as computer-executable instructions, audio or video input or output, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (1100) optionally includes a motion sensor/tracker input (1142) for a motion sensor/tracker, which can track the movements of a user and objects around the user. For example, the motion sensor/tracker allows a user (e.g., player of a game) to interact with the computer system (1100) through a natural user interface using gestures and spoken commands. The motion sensor/tracker can incorporate gesture recognition, facial recognition and/or voice recognition.

The computer system (1100) optionally includes a game controller input (1144), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (1100) optionally includes a media player (1146) and video source (1148). The media player (1146) can play DVDs, Blu-ray™ discs, other disc media and/or other formats of media. The video source (1148) can be a camera input that accepts video input in analog or digital form from a video camera, which captures natural video. Alternatively, the video source (1148) can be a screen capture module (e.g., a driver of an operating system, or software that interfaces with an operating system) that provides screen capture content as input. Or, as another alternative, the video source (1148) can be a graphics engine that provides texture data for graphics in a computer-represented environment. Or, as another alternative, the video source (1148) can be a video card, TV tuner card, or other video input that accepts input video in analog or digital form (e.g., from a cable input, High-Definition Multimedia Interface ("HDMI") input or other input).

An optional audio source (1150) accepts audio input in analog or digital form from a microphone, which captures audio, or other audio input.

The computer system (1100) optionally includes a video output (1160), which provides video output to a display device. The video output (1160) can be an HDMI output or other type of output. An optional audio output (1160) provides audio output to one or more speakers.

The storage (1170) may be removable or non-removable, and includes magnetic media (such as magnetic disks, magnetic tapes or cassettes), optical disk media and/or any other media which can be used to store information, and which can be accessed within the computer system (1100). The storage (1170) stores instructions for the software (1180) implementing aspects of the innovations for use of ML networks in video processing scenarios.

The computer system (1100) may have additional features. For example, the computer system (1100) includes one or more other input devices and/or one or more other output devices. The other input device(s) may be a touch input device such as a keyboard, mouse, pen, or trackball, a scanning device, or another device that provides input to the computer system (1100). The other output device(s) may be a printer, CD-writer, or another device that provides output from the computer system (1100).

An interconnection mechanism (not shown) such as a bus, controller, or network interconnects the components of the computer system (1100). Typically, operating system software (not shown) provides an operating environment for other software executing in the computer system (1100), and coordinates activities of the components of the computer system (1100).

The computer system (1100) of FIG. 11 is a physical computer system. A virtual machine can include components organized as shown in FIG. 11.

The term "application" or "program" refers to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random-access memory ("DRAM"). Common forms of computer-readable media include, for example, a solid-state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU, NPU, or special-purpose hardware to provide functionality described herein, instructions executable on processing cores of a GPU or NPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and a computer system can include any combination of special-purpose hardware and/or hardware with software implementing the functionality described herein.

Numerous examples are described in this disclosure and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and a computer system can include any combination of special-purpose hardware and/or hardware with software implementing the functionality described herein.

The respective techniques and tools described herein may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and they may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

As used herein, the term "set," when used as a noun to indicate a group of elements, indicates a non-empty group, unless context clearly indicates otherwise. That is, the "set" has one or more elements, unless context clearly indicates otherwise.

As used herein, the term "based on" or "based at least in part on" indicates a dependence. A value or output X that is "based on" (or "based at least in part on") a value or input Y depends on Y but can also depend on additional information or factors. Y can be directly or indirectly used when determining, assigning, generating, calculating, or creating X "based on" (or "based at least in part on") Y. Thus, for example, the language determining or assigning X "based on" Y can indicate determining or assigning X using Y.

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps or stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and these terms should not be confused with acts performed by a human being. The actual computer operations corresponding to these terms vary depending on implementation.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A server computer system comprising a processor system and memory, wherein the server computer system is configured to perform operations comprising:

receiving a current unit of input video;

retrieving a given previous unit;

warping the given previous unit to spatially align sample values of the given previous unit with expected locations in a version of the current unit, thereby producing a given warped previous unit;

providing the given warped previous unit to a machine learning ("ML") encoder network;

with the ML encoder network, transforming the current unit to facilitate preservation of image quality, thereby producing a transformed current unit, wherein, as part of a temporal feedback loop, the transforming the current unit is based at least in part on the given warped previous unit;

encoding the transformed current unit, thereby producing encoded data for the transformed current unit; and outputting the encoded data as part of a bitstream.

2. The server computer system of claim 1, wherein the transforming the current unit also partially compresses the current unit by downsampling the current unit.

3. The server computer system of claim 1, wherein the ML encoder network is a convolutional neural network having a U-Net architecture.

4. The server computer system of claim 1, wherein the operations further comprise:

decoding the encoded data, thereby producing a decoded current unit; and with an ML decoder network, enhancing the decoded current unit to compensate for transformations applied by the ML encoder network and mitigate compression artifacts, thereby producing an enhanced current unit.

5. The server computer system of claim 4, wherein the enhancing the decoded current unit also partially decompresses the decoded current unit by upsampling the decoded current unit.

6. The server computer system of claim 4, wherein the ML decoder network is a convolutional neural network having a U-Net architecture.

7. The server computer system of claim 4, wherein the operations further comprise:

storing, in a decoded video buffer, the decoded current unit for use in providing temporal feedback to the ML decoder network.

8. The server computer system of claim 4, wherein the given previous unit is a given decoded previous unit retrieved from a decoded video buffer, wherein the given warped previous unit is a given warped, decoded previous unit, and wherein the operations further comprise:

providing the given warped, decoded previous unit to the ML decoder network, wherein the enhancing the decoded current unit is based at least in part on the given warped, decoded previous unit.

9. The server computer system of claim 4, wherein the operations further comprise:

storing, in an enhanced video buffer, the enhanced current unit for use in providing temporal feedback to the ML encoder network and the ML decoder network.

10. The server computer system of claim 4, wherein the given previous unit is a given enhanced previous unit retrieved from an enhanced video buffer, wherein the given warped previous unit is a given warped, enhanced previous unit, and wherein the operations further comprise:

providing the given warped, enhanced previous unit to the ML decoder network, wherein the enhancing the decoded current unit is based at least in part on the given warped, enhanced previous unit.

11. A computer system comprising a processor system and memory, wherein the computer system is configured to perform operations comprising:

receiving encoded data for a current unit;

decoding the encoded data, thereby producing a decoded current unit;

retrieving a given previous unit;

warping the given previous unit to spatially align sample values of the given previous unit with expected locations in a version of the current unit, thereby producing a given warped previous unit;

providing the given warped previous unit to a machine learning ("ML") decoder network; and with the ML decoder network, enhancing the decoded current unit to compensate for transformations applied by an ML encoder network and mitigate compression artifacts, thereby producing an enhanced current unit, wherein, as part of a temporal feedback loop, the enhancing the decoded current unit is based at least in part on the given warped previous unit.

12. The computer system of claim 11, wherein the enhancing the decoded current unit also partially decompresses the decoded current unit by upsampling the decoded current unit.

13. The computer system of claim 11, wherein the ML decoder network is a convolutional neural network having a U-Net architecture.

14. The computer system of claim 11, wherein the current unit is a frame, a slice, or a tile.

15. The computer system of claim 11, wherein the operations further comprise:

storing, in a decoded video buffer, the decoded current unit for use in providing temporal feedback to the ML decoder network.

16. The computer system of claim 11, wherein the given previous unit is a given decoded previous unit retrieved from a decoded video buffer, and wherein the given warped previous unit is a given warped, decoded previous unit.

17. The computer system of claim 11, wherein the operations further comprise:

storing, in an enhanced video buffer, the enhanced current unit for use in providing temporal feedback to the ML decoder network.

18. The computer system of claim 11, wherein the given previous unit is a given enhanced previous unit retrieved from an enhanced video buffer, and wherein the given warped previous unit is a given warped, enhanced previous unit.

19. The computer system of claim 11, wherein the operations further comprise:

processing the enhanced current unit for display; and outputting results of the processing the enhanced current unit for display.

20. In a computer system, a method of training a machine learning ("ML") encoder network and an ML decoder network for hybrid compression of video and corresponding decompression, the method comprising:

receiving a current unit of input video;

with an ML encoder network, transforming the current unit to facilitate preservation of image quality, thereby producing a transformed current unit;

encoding the transformed current unit, thereby producing encoded data for the transformed current unit;

decoding the encoded data, thereby producing a decoded current unit;

with an ML decoder network, enhancing the decoded current unit to compensate for transformations applied by the ML encoder network and mitigate compression artifacts, thereby producing an enhanced current unit;

determining feedback based at least in part on differences between the current unit of input video and the enhanced current unit; and adjusting at least one of the ML encoder network and the ML decoder network based at least in part on the feedback.

* * * * *